(12) United States Patent
Yoshizawa et al.

(10) Patent No.: US 8,155,346 B2
(45) Date of Patent: Apr. 10, 2012

(54) AUDIO SOURCE DIRECTION DETECTING DEVICE

(75) Inventors: Shinichi Yoshizawa, Osaka (JP);
Yoshihisa Nakatoh, Kyoto (JP)

(73) Assignee: Panasonic Corpration, Osaka (JP)

( * ) Notice: Subject to any disclaimer, the term of this patent is extended or adjusted under 35 U.S.C. 154(b) by 473 days.

(21) Appl. No.: 12/446,499

(22) PCT Filed: Sep. 10, 2008

(86) PCT No.: PCT/JP2008/002497
§ 371 (c)(1),
(2), (4) Date: Apr. 21, 2009

(87) PCT Pub. No.: WO2009/044509
PCT Pub. Date: Apr. 9, 2009

(65) Prior Publication Data
US 2010/0303254 A1    Dec. 2, 2010

(30) Foreign Application Priority Data
Oct. 1, 2007  (JP) .................................. 2007-258084

(51) Int. Cl.
*H04R 3/00* (2006.01)
(52) U.S. Cl. ........................................................ 381/92
(58) Field of Classification Search ............... 381/92, 381/122, 26, 56; 704/238, 239
See application file for complete search history.

(56) References Cited

U.S. PATENT DOCUMENTS

| | | | |
|---|---|---|---|
| 6,453,283 B1 | 9/2002 | Gigi | |
| 6,760,450 B2 * | 7/2004 | Matsuo | 381/92 |
| 7,123,727 B2 * | 10/2006 | Elko et al. | 381/92 |
| 7,561,701 B2 * | 7/2009 | Fischer | 381/92 |
| 7,680,667 B2 * | 3/2010 | Sonoura et al. | 704/270 |
| 7,760,248 B2 * | 7/2010 | Marks et al. | 348/231.4 |

(Continued)

FOREIGN PATENT DOCUMENTS

JP            5-273326        10/1993

(Continued)

OTHER PUBLICATIONS

Bhiksha Raj et al., "*Missing-Feature Approaches in Speech Recognition*", IEEE Signal Processing Magazine, Sep. 2005, pp. 101-116.

*Primary Examiner* — Hai Phan
(74) *Attorney, Agent, or Firm* — Wenderoth, Lind & Ponack, L.L.P.

(57) ABSTRACT

A sound source direction detector comprises FFT analysis sections (103(1) to 103(3)) for generating a frequency spectrum in at least one frequency band of acoustic signals for each of the acoustic signals collected by two or more microphones arranged apart from one another, detection sound identifying sections (104(1) to 104(3)) for identifying a time portion of the frequency spectrum of a detection sound which obtains a sound source direction from the frequency spectrum in the frequency band, and a direction detecting section (105) for obtaining the difference between the times at which the detection sound reaches the microphones, obtaining the sound source direction from the time difference, the distance between the microphones, and the sound velocity, and outputting it depending on the degree of coincidence between the microphones of the frequency spectrum in the time portion identified by the detection sound identifying sections (104(1) to 104(3)) in a time interval which is the time unit to detect the sound source direction.

6 Claims, 60 Drawing Sheets

U.S. PATENT DOCUMENTS

| | | | |
|---|---|---|---|
| 7,809,145 B2 * | 10/2010 | Mao | 381/92 |
| 7,817,805 B1 * | 10/2010 | Griffin | 381/92 |
| 7,889,873 B2 * | 2/2011 | Sorensen | 381/92 |
| 2002/0011939 A1 | 1/2002 | Mizushima | |
| 2002/0048376 A1 | 4/2002 | Ukita | |
| 2006/0146648 A1 | 7/2006 | Ukita | |
| 2006/0204019 A1 * | 9/2006 | Suzuki et al. | 381/92 |
| 2008/0089531 A1 * | 4/2008 | Koga et al. | 381/92 |
| 2008/0317260 A1 * | 12/2008 | Short | 381/92 |

FOREIGN PATENT DOCUMENTS

| | | |
|---|---|---|
| JP | 8-229039 | 9/1996 |
| JP | 9-159744 | 6/1997 |
| JP | 2000-266832 | 9/2000 |
| JP | 2001-100800 | 4/2001 |
| JP | 2002-8189 | 1/2002 |
| JP | 2002-62348 | 2/2002 |
| WO | 99/59139 | 11/1999 |

* cited by examiner

FIG. 22A Acoustic signal (sinusoidal wave)

| Time | Real part: COS (solid line) | Imaginary part: -SIN (broken line) |
|---|---|---|
| t1 | +1 | ±0 |
| t1 to t2 | + | + |
| t2 | ±0 | +1 |
| t2 to t3 | - | + |
| t3 | -1 | ±0 |
| t3 to t4 | - | - |
| t4 | ±0 | -1 |
| t4 to t5 | + | - |
| t5 | +1 | ±0 |

FIG. 53
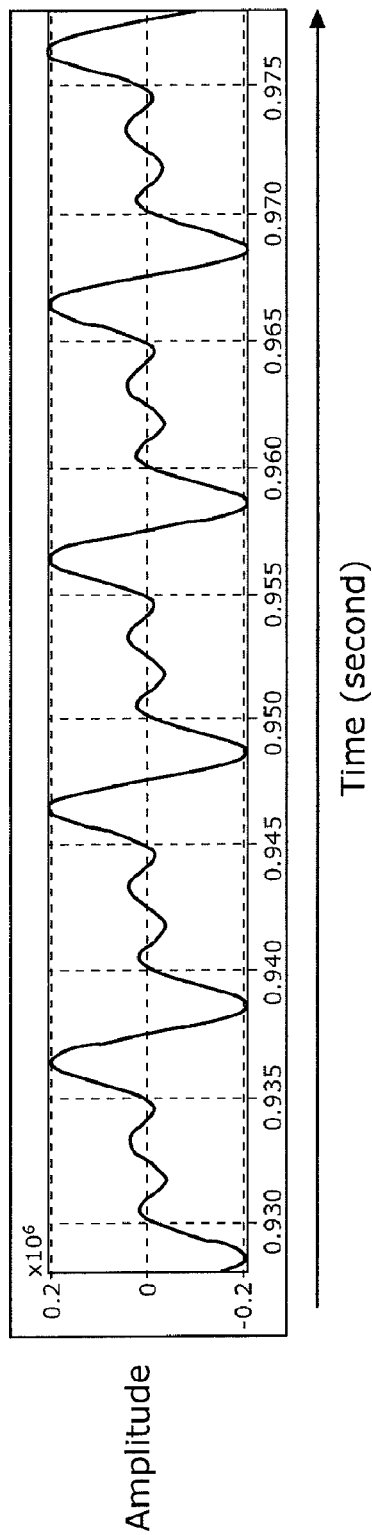
(a)
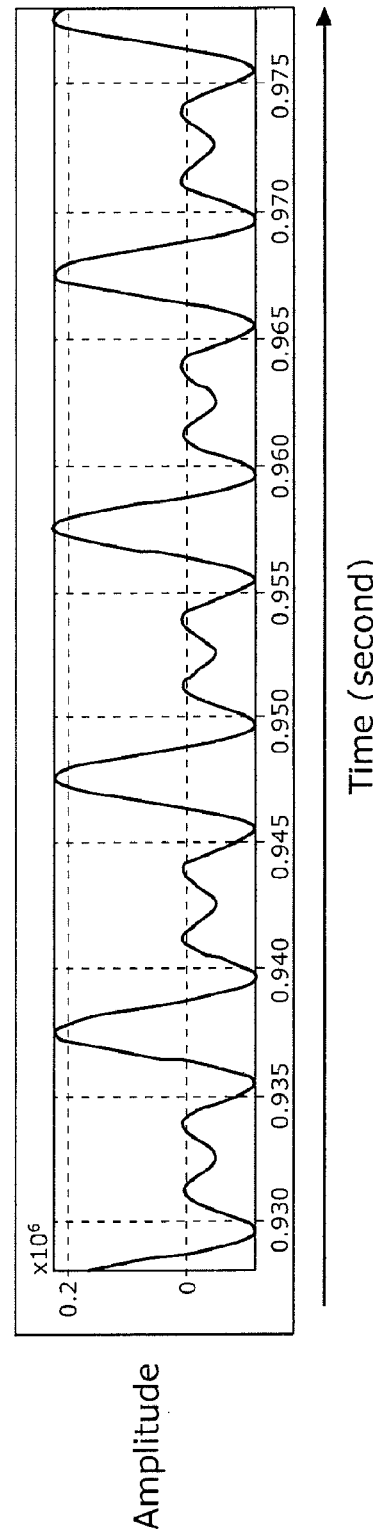
(b)

FIG. 54
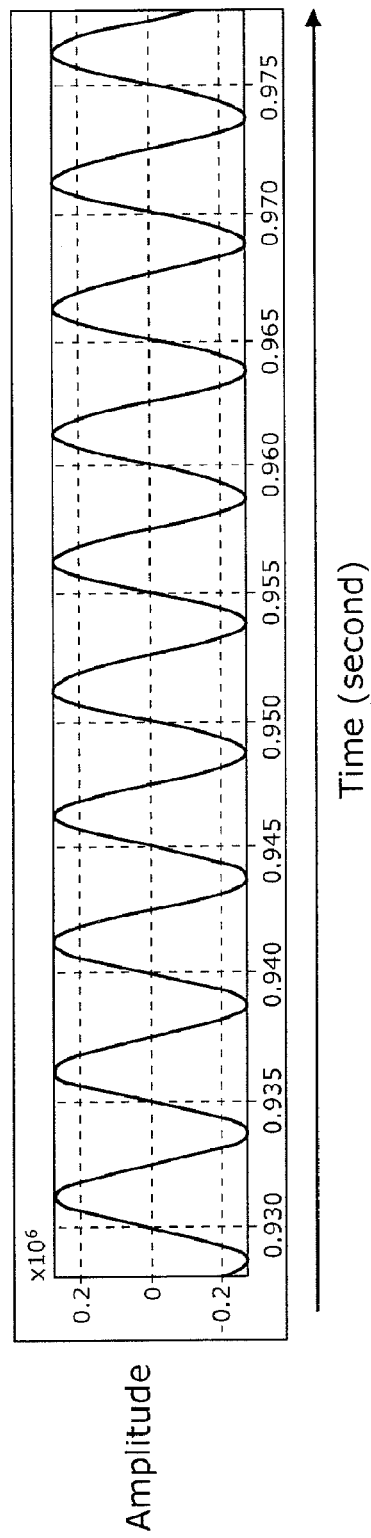
(a)
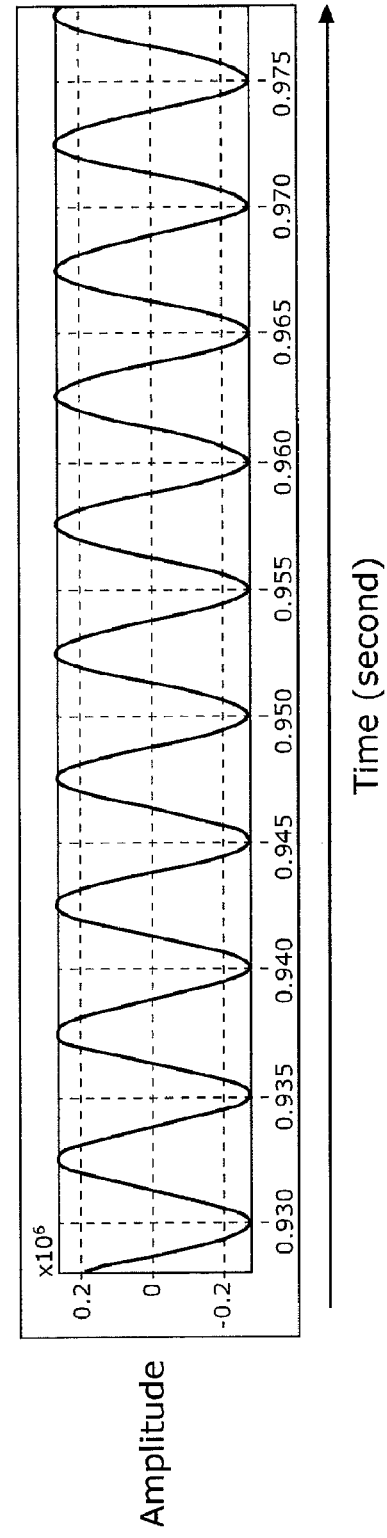
(b)

FIG. 56
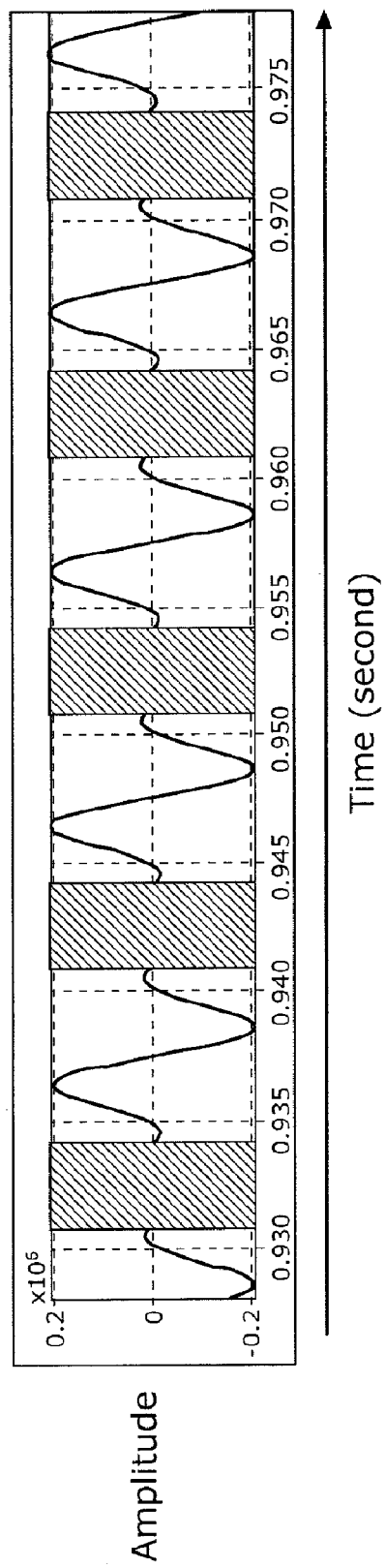
(a)
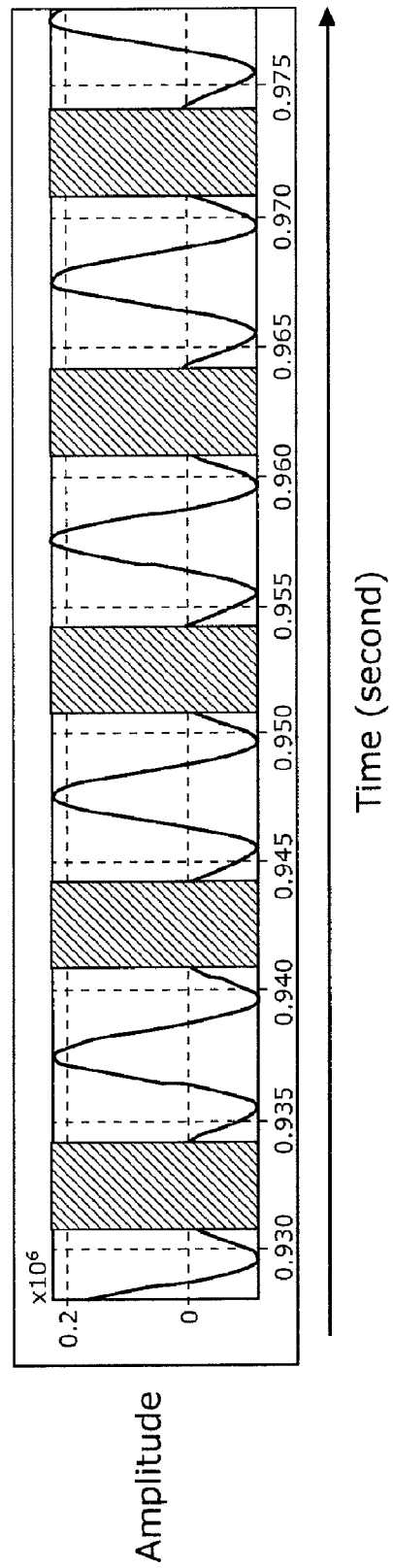
(b)

FIG. 59
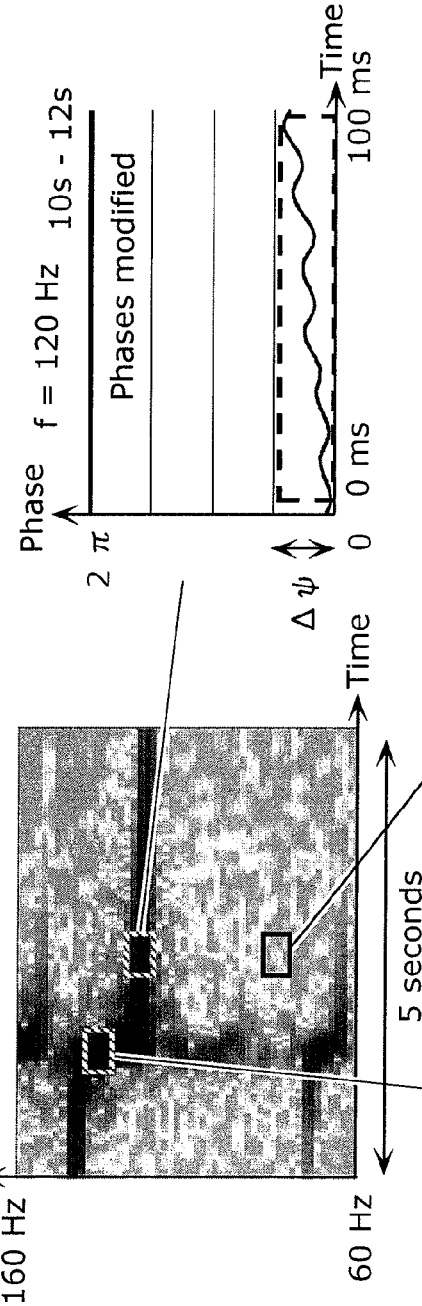
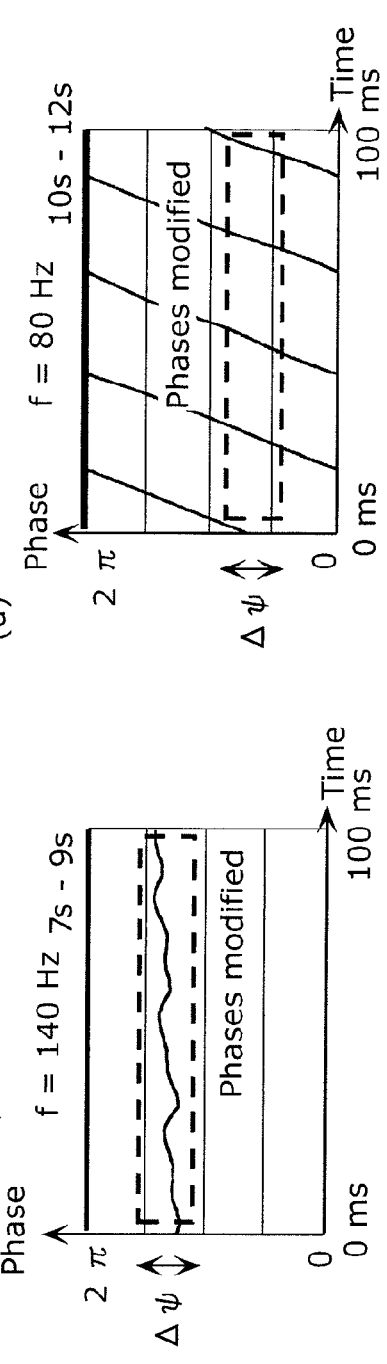

AUDIO SOURCE DIRECTION DETECTING DEVICE

TECHNICAL FIELD

The present invention relates to audio source direction detecting devices which determine audio source directions under noisy circumstances, and in particular to an audio source direction detecting device which is capable of preventing output of erroneous direction as an adverse effect of noise removal.

BACKGROUND ART

Conventional noise removal methods include methods for determining time-point portions of frequency spectra of detected audios with small noise influence from among frequency spectra of acoustic signals containing the detected audios and noises (for example, see Non-patent Reference 1).

Such time-point portions of the frequency spectra of the detected audios with small noise influence are determined based on time portions each having an SN ratio equal to or greater than 0 dB. An SN ratio is a power ratio in a frequency spectrum of a sound (S) and noises (N) (the ratio of the power of the frequency spectrum of the sound (S) and the power of the frequency spectrum of the noises (N)). Here, the power of the frequency spectrum of the noises is calculated based on a time segment not containing the detected audio, and then the power of the frequency spectrum of the detected audio is calculated by subtracting the power of the frequency spectrum of the noises from the frequency spectrum in which the detected audio and noises are mixed. As a post-processing, recognition of the detected audio (sound) is performed. In addition, some of the other methods for determining time-point portions of frequency spectra of detected audios include a method for determining time portions of the detected audios by calculating, based on data for learning, a probability distribution of detected audios inputted and a probability distribution of noises inputted, and then conducting Bayes Estimation. Here, the probability distributions use variations such as an SN ratio which is a power ratio of a frequency spectrum of a sound (S) and a frequency spectrum of noises (N), and waveform information of frequency spectra of the detected audio and noises. In this way, it is possible to accurately determine time-point portions of frequency spectra of detected audios, based on SN ratios and other information.

Conventional audio source direction detecting methods include a method for calculating an audio source direction by: segmenting each of acoustic signals received by a corresponding one of first and second microphones arranged at an interval into signals having different frequency bands (obtaining the frequency spectrum of each of the segmented signals); calculating a difference between the arrival time of the acoustic signal at the first microphone and the arrival time of the acoustic signal at the second microphone, based on the cross-correlations (the degrees of similarity) of the signals each received by a corresponding one of the first and second microphones and segmented into different frequency bands; and calculating an audio source direction based on the arrival time differences and the distance between the microphones (for example, see Patent Reference 1).

[Non-patent Reference 1] "Missing-Feature Approaches in Speech Recognition", Bhiksha Raj and Richard M. Stern, IEEE SIGNAL PROCESSING MAGAZINE, pp. 101-pp. 116, 2005

[Patent Reference 1] Japanese Unexamined Patent Application Publication 2002-62348 (Claim 1, FIG. 1)

DISCLOSURE OF INVENTION

Problems that Invention is to Solve

However, when considering calculation of an audio source direction of detected audios, based on the frequency spectra, of the detected audios, lacking some time-point portions removed as including noises and calculated according to the method disclosed in the Non-patent Reference 1, it is necessary to additionally consider how to handle the portions corresponding to the time points removed as including the noises, and the influence of the removal of the portions including noises on the result of the detection of the audio source direction, in the calculation of cross-correlation values according to the method disclosed in the Non-patent Reference 1.

For this, the present invention has an aim to provide an audio source direction detecting device which is capable of preventing output of an erroneous direction as an adverse effect of noise removal.

Means to Solve the Problems

The audio source direction detecting device according to the present invention includes a generating unit configured to generate, for each of acoustic signals each representing a detected audio received by a corresponding one of at least two microphones arranged apart from each other, a frequency spectrum in at least one frequency band of the acoustic signal; a detected audio determining unit configured to determine, from the frequency spectra in the frequency bands, time-point portions of each of the frequency spectra of the respective detected audios of which an audio source direction is to be detected; and a detecting unit configured to (i) calculate an arrival time difference between the detected audios arrived at the at least two microphones, based on the degree of similarity between frequency spectra which are time-point portions among the time point portions determined by the detected audio determining unit, (ii) calculate the audio source direction based on the arrival time difference, the distance between the at least two microphones, and acoustic velocities of the acoustic signals, and (iii) output the detected audio source direction, the time-point portions having the degree of similarity used to calculate the arrival time difference being present at time points included in a time segment which is a time unit on the basis of which the audio source direction is detected, wherein the detecting unit (i) adjusts the time axes of the frequency spectra of the acoustic signals received by the at least two microphones such that the arrival time difference becomes zero, (ii) calculates the percentage of the same time-point portions determined for one of the at least two microphones and present at the time points at which the same time-point portions determined for the other microphone are present respectively with respect to the time segment, and (iii) outputs the audio source direction when the percentage is greater than a predetermined threshold, the same time-point portions being included in the time-point portions determined by the detected audio determining unit.

With this structure, the detecting unit calculates the percentage of the same time-point portions determined for one of microphones and present at the time points at which the same time-point portions determined for the other microphone are present respectively with respect to the predetermined time segment used to calculate cross correlation values, and outputs the audio source direction only for frequency spectra having a percentage greater than the predetermined threshold. In other words, the detecting unit (i) adjusts the time axes of the frequency spectra of the acoustic signals received by the at least two microphones such that the arrival time difference becomes zero, (ii) calculates the degree of similarity between the same time-point portions determined for one of the at least two microphones and the same time-point portions determined for the other microphone, (iii) calculates an audio source direction based on the degree of similarity, and (iv) outputs the audio source direction only when the percentage of the same time-point portions is greater than the predetermined threshold. This makes it possible to prevent output of an erroneous direction due to influence of noises The increase in the number of time-segment portions removed as including noises reduces reliability in detection of an audio source direction and deteriorates the detection accuracy, which results in obtainment of an erroneous direction.

Preferably, the detecting unit adjusts the time axes of the frequency spectra of the acoustic signals received by the at least two microphones such that the arrival time difference becomes zero, calculates, so as to obtain one of candidate audio source directions, the percentage of the same time-point portions determined for one of the at least two microphones and present at the time points at which the same time-point portions determined for the other microphone are present respectively with respect to a time segment, and outputs the audio source direction only when the percentages calculated to obtain all the candidate audio source directions are greater than the predetermined threshold.

With this structure, it becomes possible to calculate, so as to obtain one of candidate audio source directions, a percentage of the same time-point portions determined for one of the at least two microphones and present at time points at which the same time-point portions determined for the other microphone are present respectively with respect to a time segment, and output the audio source direction only when the percentages calculated to obtain all the candidate audio source directions are greater than the predetermined threshold. This makes it possible to prevent output of an erroneous audio source direction even when the audio source is present in the direction in which no candidate audio direction can be outputted because the percentage of the same time-point portions is less than the predetermined threshold.

It is to be noted that the present invention can be implemented not only as an audio source direction detecting device including unique units as mentioned above, but also as an audio source direction detecting method having steps corresponding to the unique units included in the audio source direction detecting device, and a program causing a computer to execute these unique steps included in the audio source direction detecting method. As a matter of course, such program can be distributed through recording media such as CD-ROMs (Compact Disc-Read Only Memory) and communication networks such as the Internet.

Effects of the Invention

With the audio source direction detecting device according to the present invention, it becomes possible to (i) adjust the time axes of the frequency spectra of the acoustic signals received by the at least two microphones such that the arrival time difference becomes zero, (ii) calculate the degree of similarity between the same time-point portions determined for one of the at least two microphones and the same time-point portions determined for the other microphone, (iii) calculate an audio source direction based on the degree of similarity, and (iv) output the audio source direction only when the percentage of the same time-point portions is greater than the predetermined threshold, thereby preventing output of an erroneous direction due to influence of noises The increase in the number of time-segment portions removed as including noises reduces reliability in detection of an audio source direction and deteriorates the detection accuracy, which results in obtainment of an erroneous direction. Further, it becomes possible to output, for each of all the candidate audio source directions forming angles of −90 to +90 degrees, an audio source direction only when the percentage of the same time-point portions determined for one of microphones and present at the time points at which the same time-point portions determined for the other microphone are present respectively is greater than the predetermined threshold. This makes it possible to prevent output of an erroneous audio source direction even when the audio source is present in the direction in which no candidate audio direction can be outputted because the percentage of the same time-point portions is less than the predetermined threshold.

BRIEF DESCRIPTION OF DRAWINGS

FIG. 22A is a diagram illustrating a mechanism of how phases shift counterclockwise as time shifts.

FIG. 53 is a diagram showing the temporal waveforms of frequency spectra around 200 Hz of acoustic signals 2401.

FIG. 54 is a diagram showing the temporal waveforms of frequency spectra of 200-Hz sinusoidal waves used in the generation of the acoustic signals 2401.

FIG. 56 is a diagram showing the temporal waveforms of frequency spectra in 200 Hz extracted from the acoustic signals 2401.

FIG. 59 is a diagram showing the result of analysis of an audio from an autobicycle.

NUMERICAL REFERENCES 100, 2401 Acoustic signal
101a Computer
101, 2800 Audio source direction detecting device
102(k) (k=1 to 3), 4101(1), 4101(2) Microphone
103(k) (k=1 to 3) FFT analyzing unit
104(k) (k=1 to 3), 104(k, j) (k=1 to 3, j=1 to M), 113(j),
302(k, j) (k=1 to 3, j=1 to M), 3002(k, j) (k=1 to 3, j=1 to M),
2802(k) (k=1 to 3), 2802(k, j) (k=1 to 3, j=1 to M) Detected audio determining unit
105, 400(1), 400(2), 400(3), 401, 400(1, j) (j=1 to M) Direction detecting unit
106 Audio source direction
110 Noise removal device
300(k, j) (k=1 to 3, j=1 to M), 3000(k, j) (k=1 to 3, j=1 to M) Frequency spectrum determining unit
301(k, j) (k=1 to 3, j=1 to M), 3001(k, j) (k=1 to 3, j=1 to M) Degree-of-similarity calculating unit
500(1, j) (j=1 to M) Percentage determining unit
501(1, j) (j=1 to M) Correlation calculating unit
502(1, j) (j=1 to M) Direction determining unit
503(1, j) (j=1 to M) Time segment determining unit
1100 Audio
1101 to 1103 White noises
1106 DFT analysis unit
2408 Output spectrum 2801 (k) (k=1 to 3), 2801(k, j) (k=1 to 3, j=1 to M) Phase modifying unit
4100 Audio source

BEST MODE FOR CARRYING OUT THE INVENTION

An embodiment of the present invention is described below with reference to the drawings.

First Embodiment

Figure 1:
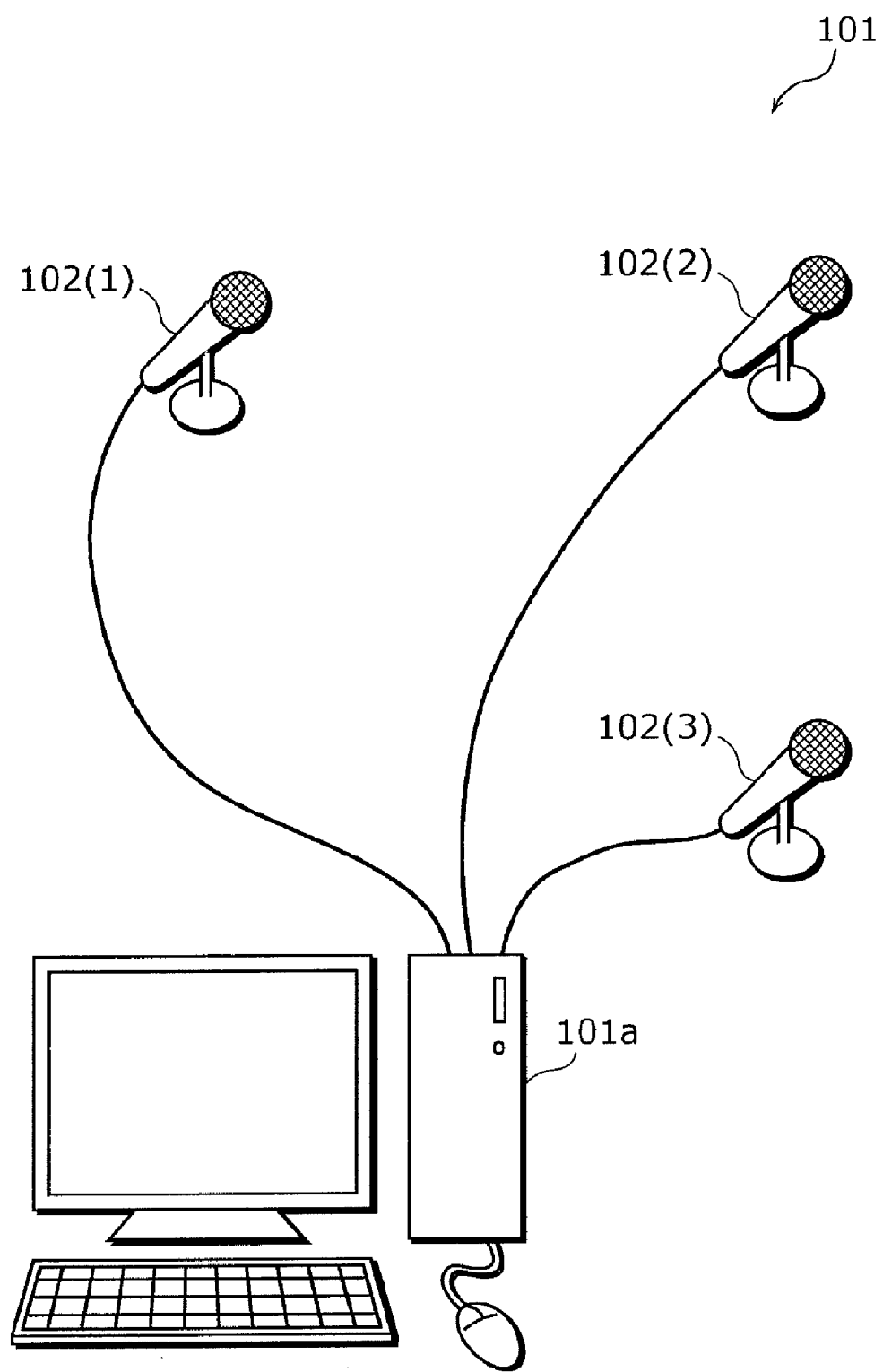
FIG. 1 is an external view of an audio source direction detecting device in a first embodiment of the present invention.

FIG. 1 is an external view of an audio source direction detecting device in a first embodiment of the present invention.

The audio source direction detecting device is structured with a computer 101a to which three microphones 102(k) (k=1 to 3) are connected.

Each of FIG. 2 to FIG. 6 is a block diagram showing the structure of the audio source direction detecting device in the first embodiment of the present invention.

Figure 2:
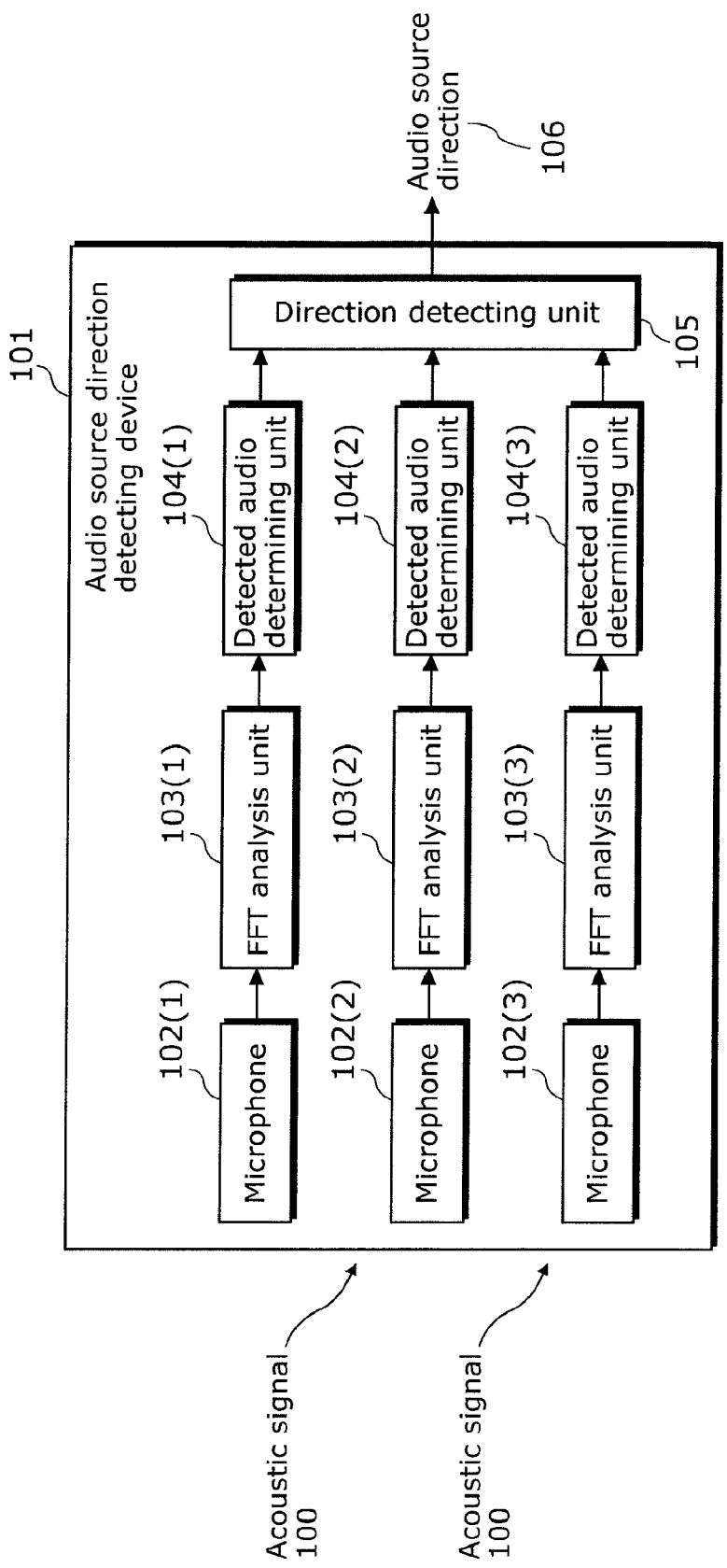
FIG. 2 is a block diagram showing the overall structure of the audio source direction detecting device in the first embodiment of the present invention.

In FIG. 2, the audio source direction detecting device 101 is structured with three microphones 102(k) (k=1 to 3), three FFT analysis units 103(k) (k=1 to 3) (corresponding to analysis units) provided for the respective microphones, three detected audio determining units 104(k) (k=1 to 3) (corresponding to detected audio determining units) provided for the respective microphones, and a direction detecting unit 105 (corresponding to a detecting unit). The FFT analysis units 103(k) (k=1 to 3), the detected audio determining units 104(k) (k=1 to 3), and the direction detecting unit 105 are implemented by executing the program for performing functions of the respective processing units on the processor of the computer 101a. In addition, various data items are stored in a memory on the computer 101a.

Each of the microphones 102(k) (k=1 to 3) receives an input of an acoustic signal 100.

Each of the FFT analysis units 103(k) (k=1 to 3) executes fast Fourier transform on the acoustic signal 100 inputted through the corresponding one of the microphones (having the above-mentioned value) to calculate a frequency spectrum (corresponding to a frequency signal) including phase components of the acoustic signal 100. Hereinafter, it is assumed that the number of frequency bands in the frequency spectrum obtained by the FFT analysis unit 103(k) (k=1 to 3) is M, and that the numbers specifying the respective frequency bands are represented as symbols of j (j=1 to M).

Figure 3:
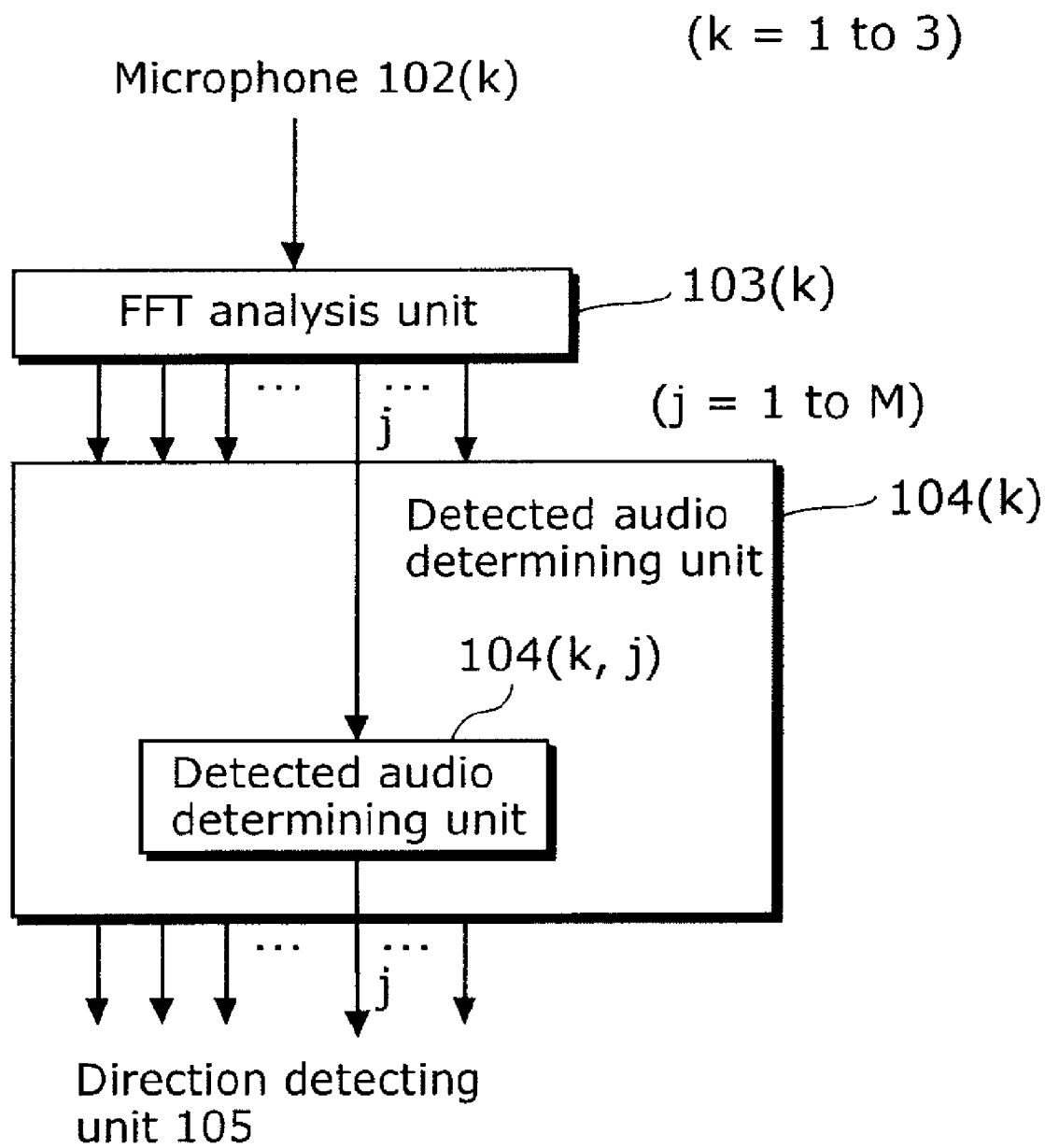
FIG. 3 is a block diagram showing a detected audio determining unit $104(k)$ of the audio source direction detecting device in the first embodiment of the present invention.

As shown in FIG. 3, each of the detected audio determining units 104(k) (k=1 to M) is structured with M detected audio determining units 104(k, j) (j=1 to M). Each of the detected audio determining units 104(k) (k=1 to 3) determines time-point portions of frequency spectra calculated by a corresponding one of the FFT analysis units 103(k) (having the above-mentioned value) of detected audio using detected audio determining units 104(k, j) (k=1 to 3, j=1 to M) for the respective frequency bands j (j=1 to M). The following describes a case where the i-th frequency band is f (for example, the center frequency is f).

Each of the detected audio determining units 104(k, j) calculates the sum of degrees of similarity between a frequency spectra at a time point as an analysis target among plural time points selected from time points of the time interval 1/f and frequency spectra at time points different from the target time point. In addition, each of the detected audio determining units 104(k, j) determines time-point portions of the detected audio by determining the target time point that yields the sum of degrees of similarity equal to or greater than a first threshold value.

The direction detecting unit 105 determines a time segment for the detected audios obtained through the microphones 102(1) to 102(3) to calculate an audio source direction (the time segment is used to calculate an audio source direction averaged temporally), and calculates the degrees of similarity between the frequency spectra corresponding to the time-point portions, which are present at the same time points of the detected audios, determined in association with all the respective possible pairs of the three microphones (that is, the microphone 102(1) and the microphone 102(2), the microphone 102(2) and the microphone 102(3), and the microphone 102(1) and the microphone 102(3)). Here, the degrees of similarity are cross-correlation values. The direction detecting unit 105 calculates an arrival time difference for each of all the possible pairs of the microphones, based on the local maximum value of the cross-correlation values. The direction detecting unit 105 calculates an audio source direction, based on the calculated arrival time difference and the interval between the microphones. For each of the possible combinations of microphones, the direction detecting unit 105 (i) adjusts the time axes of the frequency spectra of the acoustic signals received by the at least two microphones such that the arrival time difference becomes zero, (ii) calculates a percentage of same time-point portions determined for one of the at least two microphones and present at time points at which same time-point portions determined for the other microphone are present respectively with respect to a time segment used to determine an audio source direction, and (iii) outputs information indicating an audio source direction 106 when the percentage is greater than a predetermined threshold. The same time-point portions are included in the time-point portions determined by the detected audio determining unit.

The degrees of similarity used in this example are cross-correlation values. However, differential errors between frequency spectra may be used as degrees of similarity. In addition, in this example, an arrival time difference is calculated based on the local maximum value in the cross-correlation values. However, an arrival time difference may be calculated based on one of the following: the maximum value in the cross-correlation values; the local maximum value or the maximum value in cross-correlation values equal to or greater than a threshold value; the local minimum value in the differential errors; the minimum value in the differential errors; and the local minimum value or the minimum value in the differential errors equal to or less than a threshold value.

Figure 4:
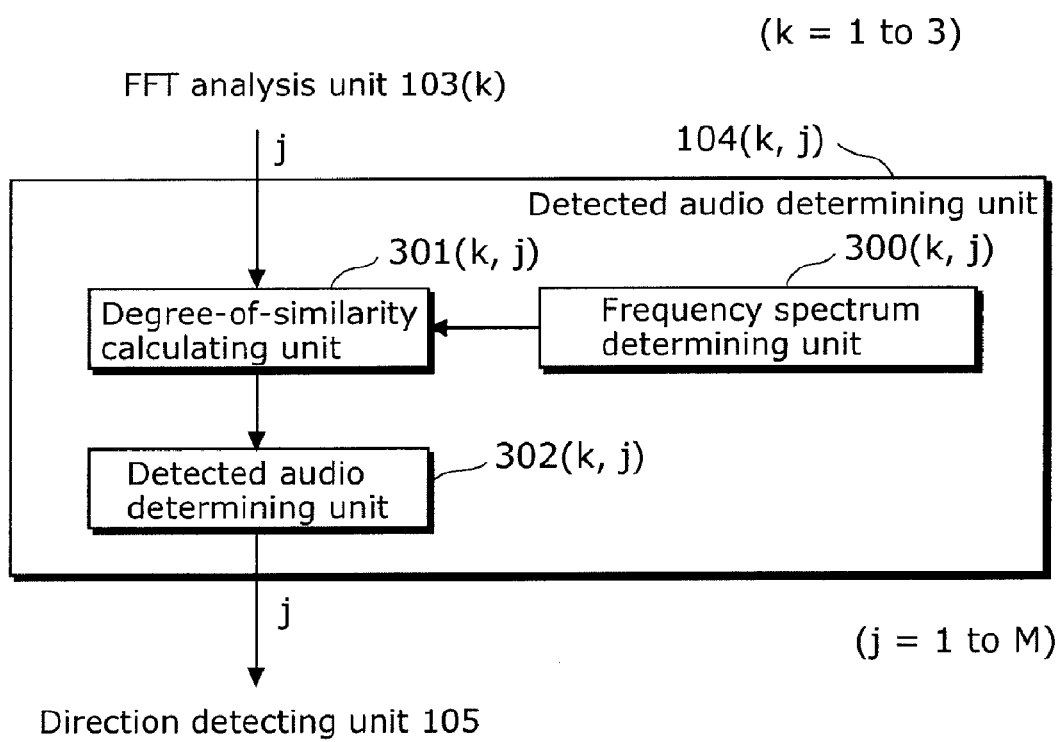
FIG. 4 is a block diagram showing a detected audio determining unit $104(k, j)$ of the audio source direction detecting device in the first embodiment of the present invention.

FIG. 4 is a block diagram showing the structure of one of the detected audio determining units 104($k, j$) ($k=1$ to 3, $j=1$ to M) having the same structure. Each of the detected audio determining units 104($k, j$) ($k=1$ to 3, $j=1$ to M) is structured with a corresponding one of: frequency spectrum determining units 300($k, j$) ($k=1$ to 3, $j=1$ to M); degree-of-similarity calculating units 301($k, j$) ($k=1$ to 3, $j=1$ to M); and detected audio determining units 302($k, j$) ($k=1$ to 3, $j=1$ to M).

Figure 7A:
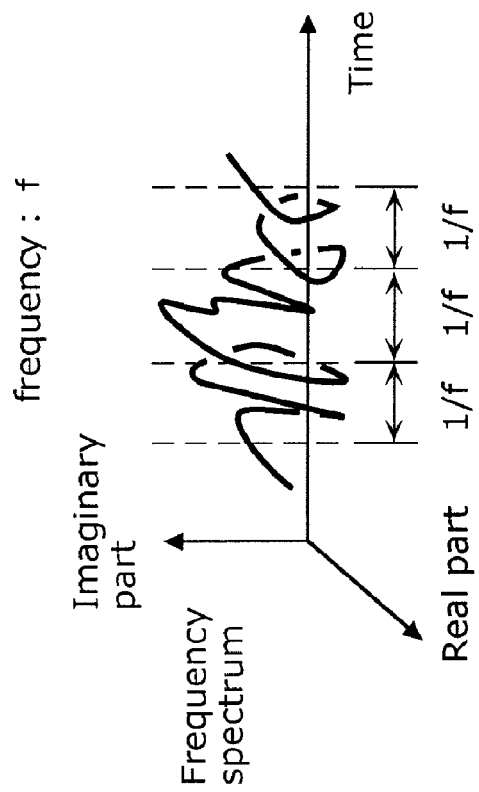
FIG. 7A is a schematic diagram of a result of frequency analysis using frequency f of an audio from an autobicycle (a detected audio).
Figure 7B:
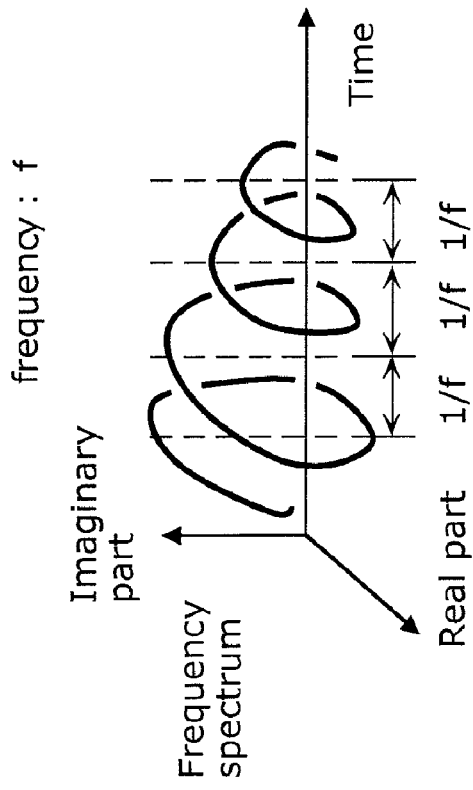
FIG. 7B is a schematic diagram of a result of frequency analysis using frequency f of a background audio (background noises).
Figure 8:
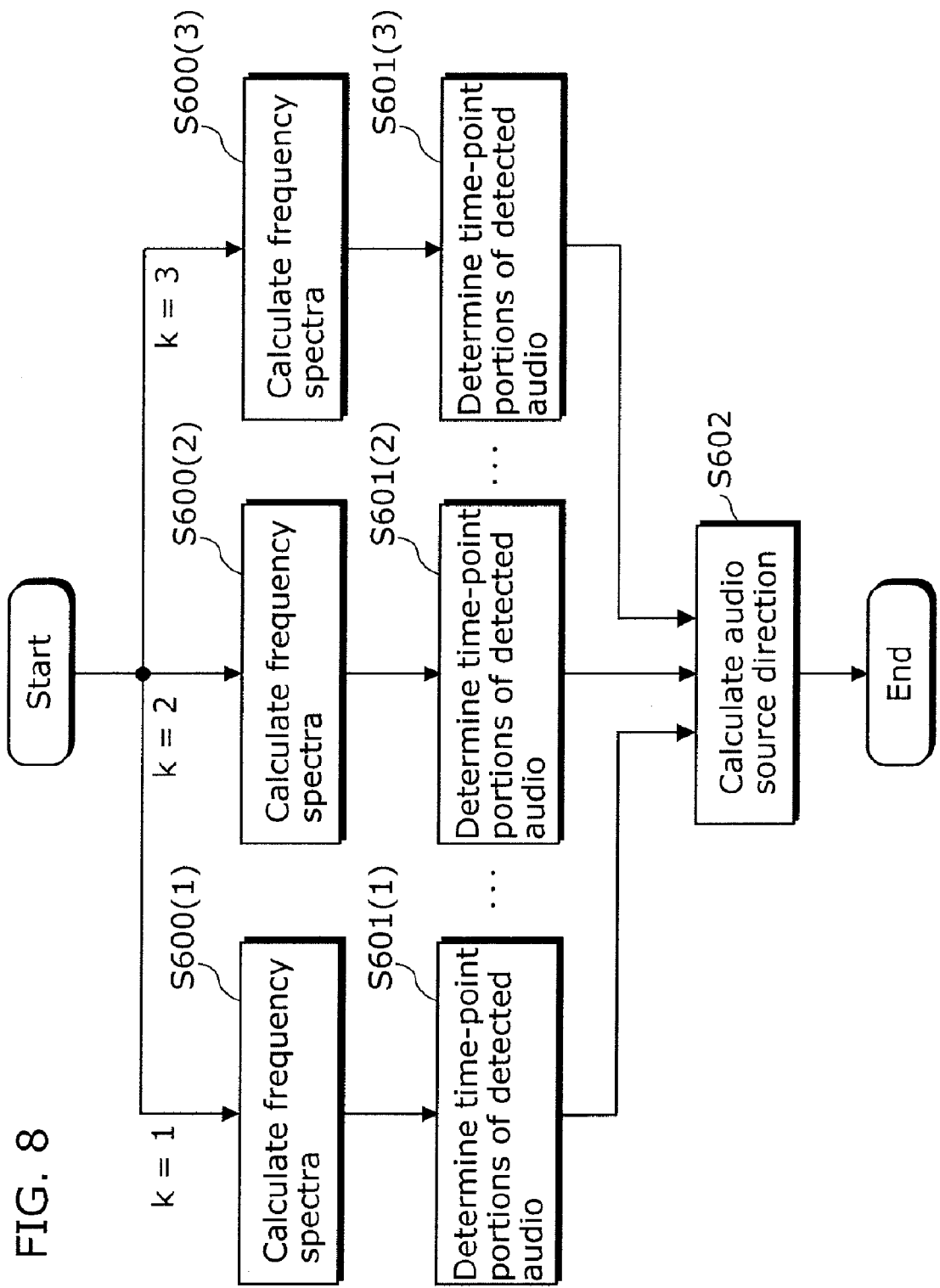
FIG. 8 is a flowchart indicating the procedure of an operation performed by the audio source direction detecting device in the first embodiment of the present invention.
Figure 9:
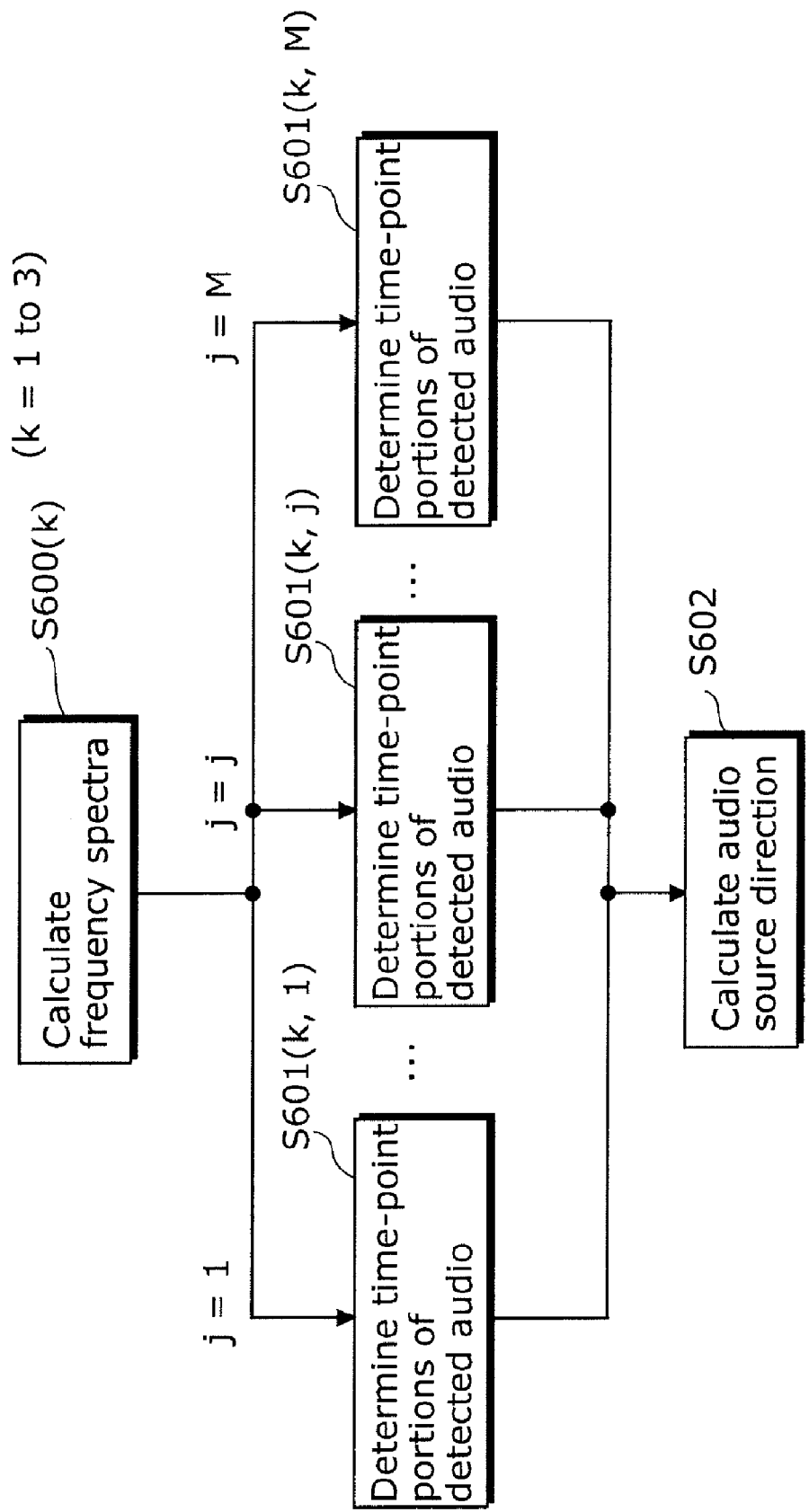
FIG. 9 is a flowchart indicating an operation procedure of Step $S601(k)$ of determining time-point portions of the detected audio. The operation is performed by the audio source direction detecting device in the first embodiment of the present invention.
Figure 10:
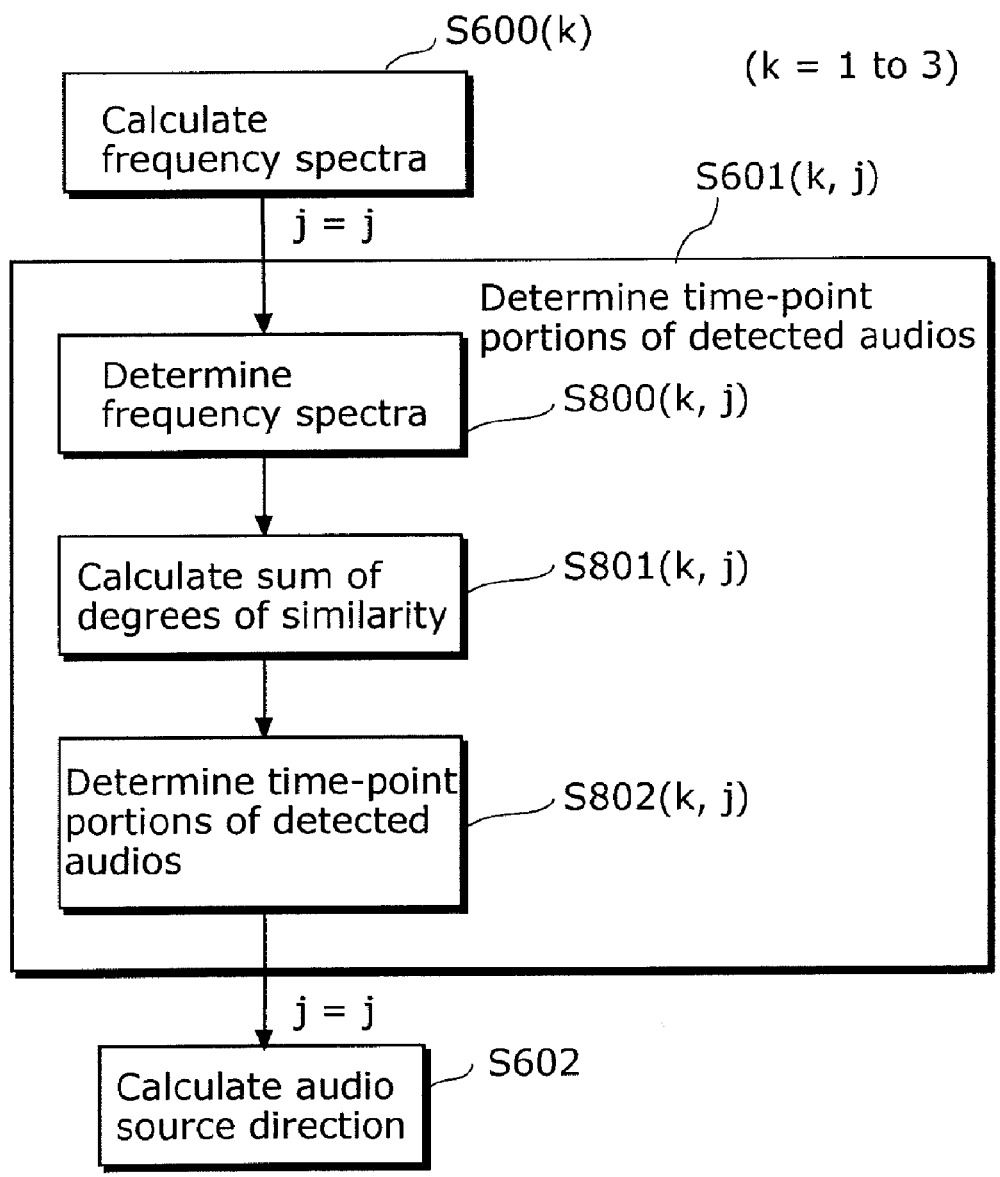
FIG. 10 is a flowchart indicating an operation procedure of Step $S601(k, j)$ of determining time-point portions of the detected audio in Step $S601(k)$ of determining the portions of the detected audio corresponding to the time points. The operation is performed by the audio source direction detecting device in the first embodiment of the present invention.
Figure 11:
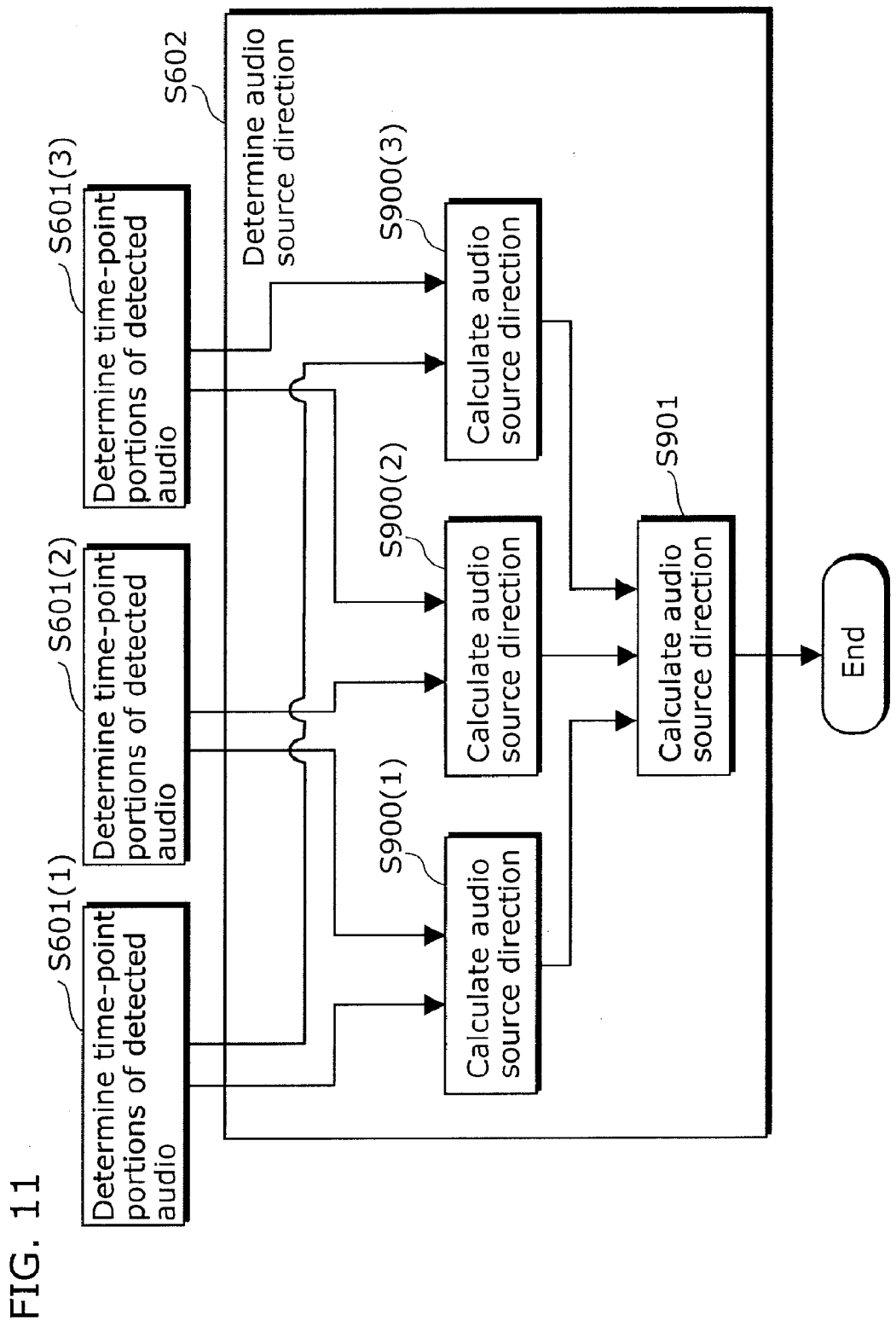
FIG. 11 is a flowchart indicating an operation procedure of Step S602 of determining an audio source direction performed by the audio source direction detecting device in the first embodiment of the present invention.
Figure 12:
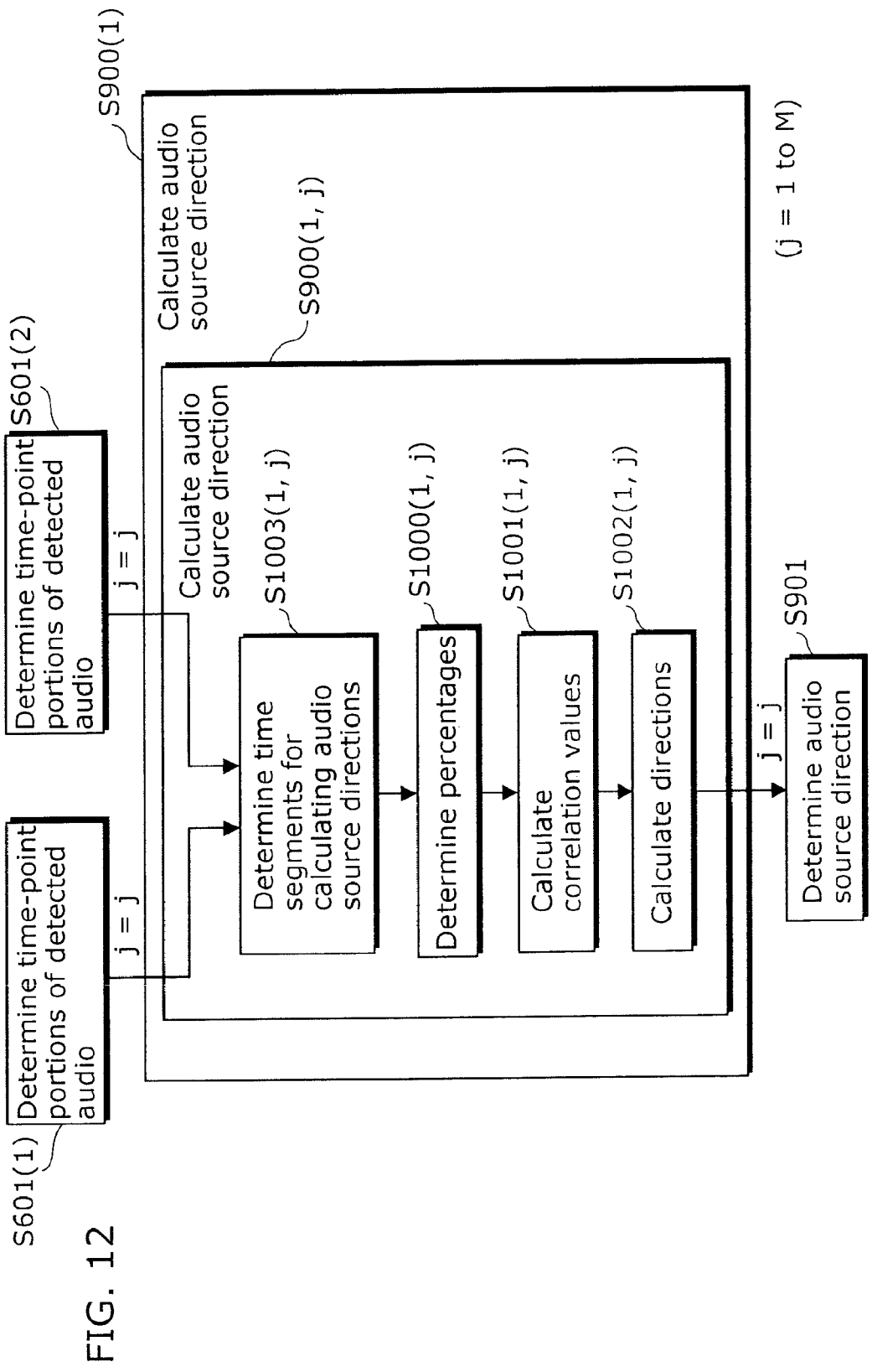
FIG. 12 is a flowchart indicating an operation procedure of Step S900(1, j) of determining an audio source direction in Step S900(1) of determining the audio source direction. The operation is performed by the audio source direction detecting device in the first embodiment of the present invention.

Each of FIGS. 7A and 7B is a conceptual diagram illustrating the key points in the method for determining time-point portions of the detected audio in this embodiment. FIG. 7A is a schematic diagram showing the result of frequency analysis performed on an audio from an autobicycle (corresponding to a detected audio) using frequency f. FIG. 7B is a schematic diagram showing the result of frequency analysis performed on a background audio (corresponding to a background noise) using frequency f. In each of the diagrams, the horizontal axis represents time, and the vertical axis represents frequency. FIG. 7A shows that the magnitude of the amplitude of the frequency waveform vary due to the influence of variation in the frequency of the audio from the autobicycle, and that the phases of the frequency waveform shift regularly and repeatedly as time shifts such that the phase shifts from 0 to 360 degrees at an constant angle velocity and at the time interval 1/f which is a cycle corresponding to the frequency f used for the analysis. For example, the phase of the waveform having a 100-Hz frequency rotates by 360 degrees at an interval of 10 ms, and the phase of the waveform having a 200-Hz rotates by 360 degrees at an interval of 5 ms. On the other hand, as shown in FIG. 7B, the phases of frequency waveforms of white noises such as background noises shift irregularly. In addition, noise portions distorted due to a mixed audio make irregular the temporal shifts of the phases. In this way, it is possible to remove noises by removing areas defined based on time and frequency as exhibiting irregular temporal shifts of the phases of the frequency waveforms. This processing can be performed in the same manner irrespective of whether or not an audio to be extracted has a cyclical waveform in the temporal waveform before the frequency analysis.

Each of the frequency spectrum determining units 300($k, j$) determines frequency spectra used in the calculation of the degrees of similarity. Each of the degree-of-similarity calculating units 301($k, j$) calculates the sum of degrees of similarity based on the frequency spectra determined by the frequency spectrum determining units 300($k, j$). Each of the detected audio determining units 302($k, j$) determines, as time-point portions of the frequency spectra of the detected audio, the time-point portions that make the sum of degrees of similarity calculated by the degree-of-similarity calculating units 301($k, j$) equal to or greater than the first threshold value.

Figure 5:
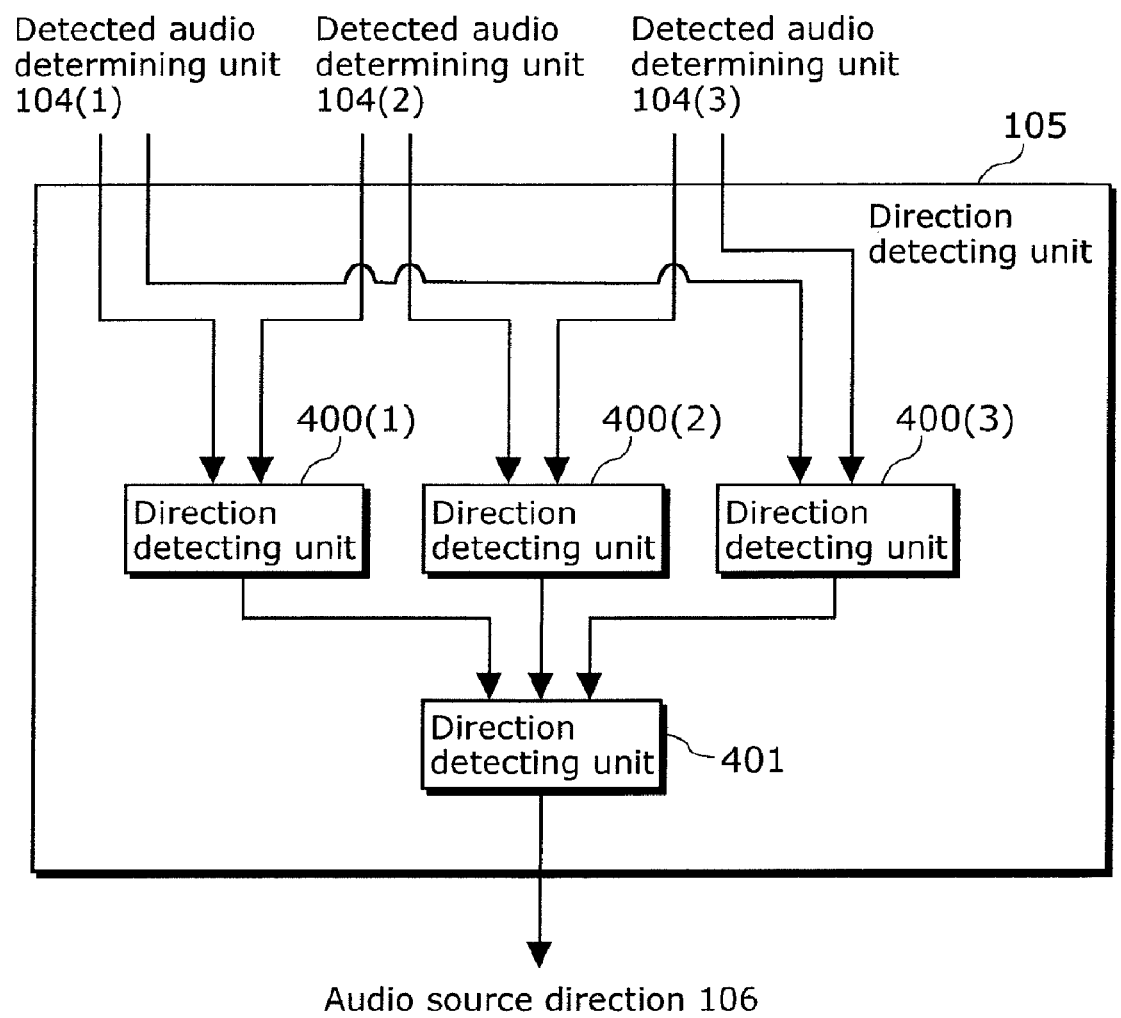
FIG. 5 is a block diagram showing a direction detecting unit 105 of the audio source direction detecting device in the first embodiment of the present invention.

FIG. 5 is a block diagram showing the structure of the direction detecting unit 105. The direction detecting unit 105 is structured with a direction detecting unit 400(1), a direction detecting unit 400(2), a direction detecting unit 400(3), and a direction detecting unit 401.

The direction detecting unit 400(1) determines the audio source directions of the acoustic signals inputted through the microphone 102(1) and microphone 102(2), based on the frequency spectra of the time-point portions determined by the detected audio determining unit 104(1) and the frequency spectra of the time-point portions determined by the detected audio determining unit 104(2).

The direction detecting unit 400(2) determines the audio source directions of the acoustic signals inputted through the microphone 102(2) and microphone 102(3), based on the frequency spectra of the time-point portions determined by the detected audio determining unit 104(2) and the frequency spectra of the time-point portions determined by the detected audio determining unit 104(3).

The direction detecting unit 400(3) determines the audio source directions of the acoustic signals inputted through the microphone 102(1) and microphone 102(3), based on the frequency spectra of the time-point portions determined by the detected audio determining unit 104(1) and the frequency spectra of the time-point portions determined by the detected audio determining unit 104(3).

For each of all the possible pairs of the microphones, the direction detecting unit 401 (i) adjusts the time axes of the frequency spectra of the acoustic signals received by the at least two microphones such that the arrival time difference becomes zero, and (ii) calculates the percentage of the same time-point portions determined for one of the at least two microphones and present at the time points at which the same time-point portions determined for the other microphone are present respectively with respect to the time segment used to determine an audio source direction (Here, the same time-point portions are included in the time-point portions determined by the detected audio determining unit.) When the percentage is greater than the predetermined threshold, the direction detecting unit 401 (i) calculates an audio source direction based on the three candidate audio source directions calculated by the direction detecting unit 400(1), the direction detecting unit 400(2), and the direction detecting unit 400(3), and (ii) outputs information indicating an audio source direction 106.

Figure 6:
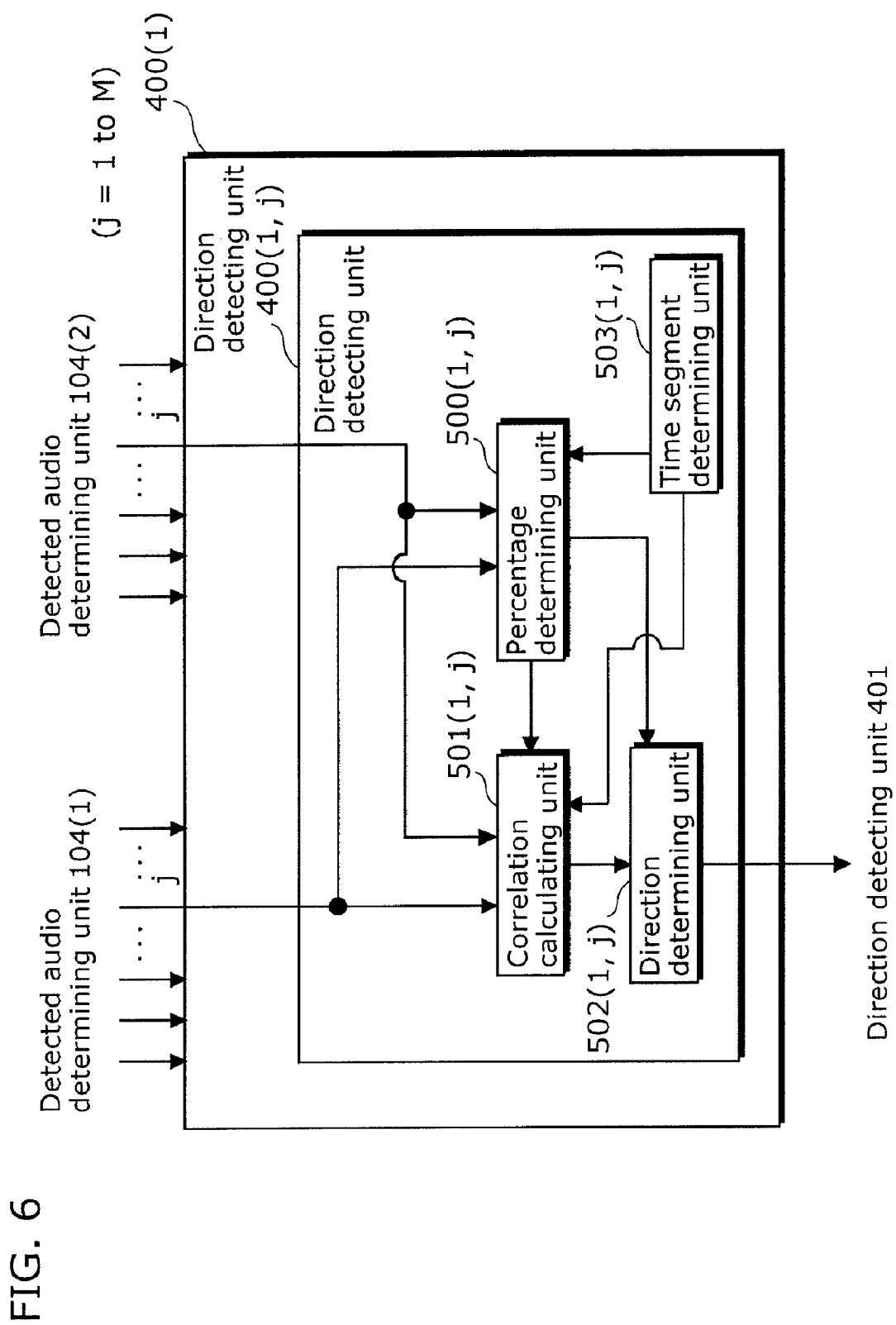
FIG. 6 is a block diagram showing a direction detecting unit 400(1) in the direction detecting unit 105 of the audio source direction detecting device in the first embodiment of the present invention.

FIG. 6 is a block diagram showing the structure of the direction detecting unit 400(1). The direction detecting unit 400(1) is structured with direction detecting units 400(1, j) (j=1 to M). Each of the direction detecting units 400(1, j) is structured with the corresponding ones of: time segment determining units 503(1, j); percentage determining units 500(1, j); correlation calculating units 501(1, j); and direction determining units 502(1, j). The direction detecting unit 400(2) and the direction detecting unit 400(3) are structured in the same manner as the direction detecting unit 400(1), and thus the same descriptions are not repeated.

Each of the time segment determining units 503(1, j) determines a time segment in which an audio source direction is calculated (this time segment is used to calculate the audio source direction averaged temporally).

Each of the percentage determining units 500(1, j) judges whether or not the percentage of the time-point portions determined in association with the respective microphones with respect to the time segment is smaller than a second threshold value, based on the time-point portions determined by the detected audio determining unit 104(1) of the frequency spectra in the j-th frequency band and the time-point portions determined by the detected audio determining unit 104(2) of the frequency spectra in the j-th frequency band. Here, the time segment is determined by the time segment determining units 503(1, j) as the time segment used to calculate cross-correlation values, and the time-point portions are present at the same time points of the frequency spectra of detected audios.

When each of the percentage determining units 500(1, j) judges that the percentage is greater than the second threshold value, the corresponding one of the correlation calculating units 501(1, j) calculates a cross-correlation value between each pair of the frequency spectra, based on time-point portions determined by the detected audio determining unit 104(1) of the frequency spectrum in the j-th frequency band and time-point portions determined by the detected audio determining unit 104(2) in the time segment determined by the time segment determining unit 503(1, j) of the frequency spectrum in the j-th frequency band.

Each of the direction determining units 502(1, j) calculates an arrival time difference, based on the local maximum value in the cross-correlation values calculated by the correlation calculating units 501(1, j), and calculates an audio source direction, based on the calculated arrival time difference and the interval between the microphones. Here, however, each of the percentage determining units 500(1, j) transmits a direction determination signal to the corresponding one of the direction determining units 502(1, j) such that the audio source direction is determined only when the percentage with respect to the cross-correlation value corresponding to each of all the candidate audio source directions forming angles of −90 to +90 degrees is equal to or greater than the second threshold value. Each of the direction determining units 502 (1, j) calculates the audio source direction on receiving a direction determination signal from the corresponding one of the percentage determining units 500(1, j).

The following describes operations performed by the audio source direction detecting device 101 structured like this.

Each of FIG. 8 to FIG. 12 is a flowchart indicating the procedure of operations performed by the audio source direction detecting device 101.

Figure 13:
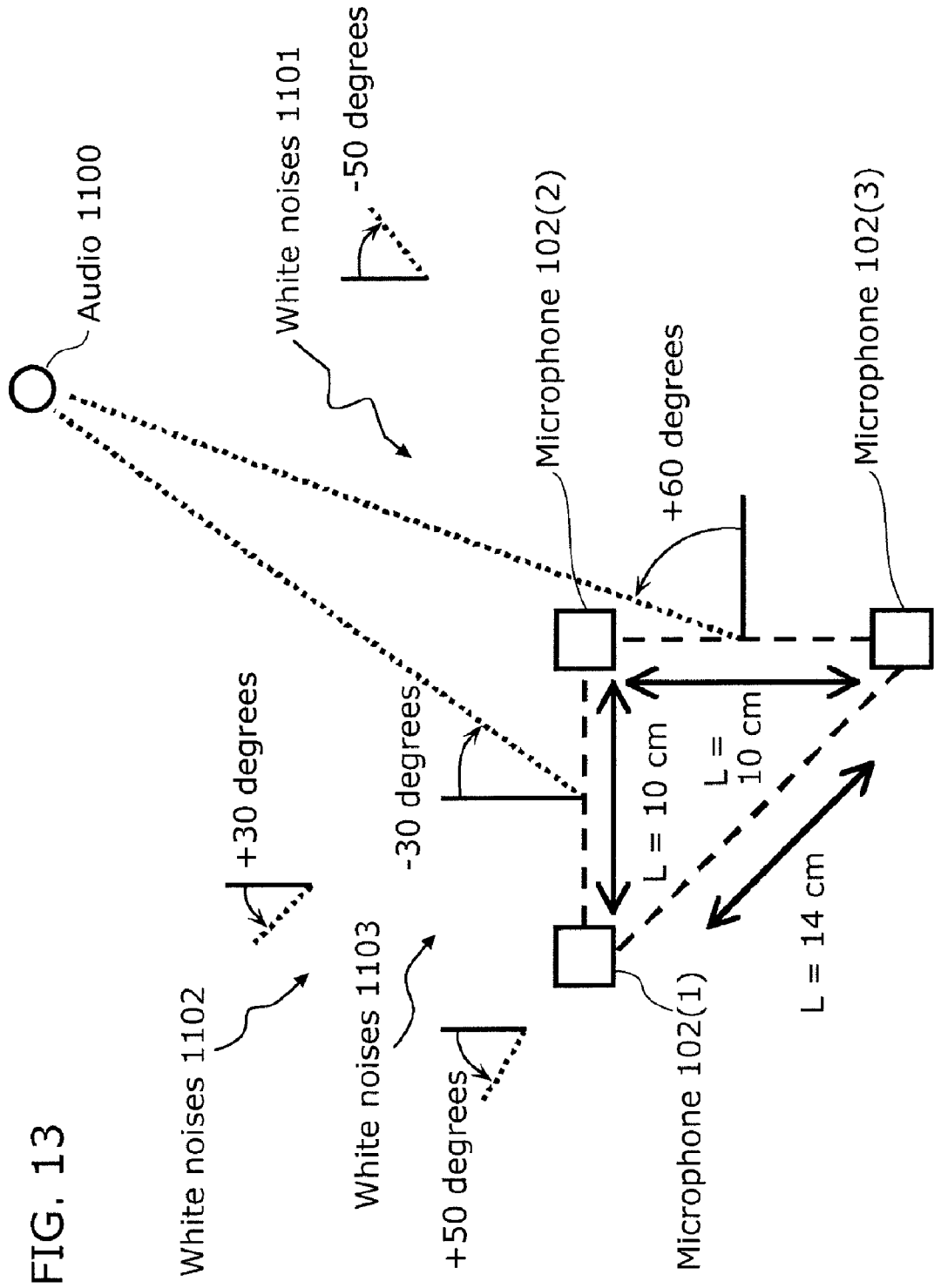
FIG. 13 is a diagram showing the positional relationship between an acoustic signal 100 and the arrangement of the microphones of the audio source direction detecting device in the first embodiment of the present invention.

FIG. 13 shows the arrangement of the three microphones used in this embodiment and the directions of the acoustic signals 100. Here, a description is given of an exemplary case where each of the acoustic signals 100 is a mixed audio of an audio 1100 and white noises (the audio 1100 corresponds to a detected audio, the white noises correspond to a white noise 1101, a white noise 1102, and a white noise 1103, and the mixed audio is obtained by mixing the audio 1100 and the white noises on a computer).

These three microphones are arranged such that the microphone 102(1) and the microphone 102(2) are arranged at an interval of L=10 cm, the microphone 102(1) and the microphone 102(3) are arranged at an interval of L=10 cm, and the microphone so 102(1) and the microphone 102(3) are arranged at an interval of L=14 cm. The straight line between the microphone 102(1) and the microphone 102(2) vertically crosses the line between the microphone 102(2) and the microphone 102(3).

When it is assumed that the microphone 102(1) side is a plus angle, the audio source direction of the audio 1100 (detected audio) is in the direction forming an angle of −30 degrees with respect to the straight line vertically crossing the straight line between the microphone 102(1) and the microphone 102(2). In addition, when it is assumed that the microphone 102(1) side is a plus angle, the audio source direction of the audio 1100 is in the direction forming an angle of +60 degrees with respect to the straight line vertically crossing the straight line between the microphone 102(2) and the microphone 102(3).

When it is assumed that the microphone 102(1) side is a plus angle, the audio source direction of the white noise 1101 (noise) is in the direction forming an angle of −50 degrees with respect to the straight line vertically crossing the straight line between the microphone 102(1) and the microphone 102(2). When it is assumed that the microphone 102(1) side is a plus angle, the audio source direction of the white noise 1102 (noise) is in the direction forming an angle of +30 degrees with respect to the straight line vertically crossing the straight line between the microphone 102(1) and the microphone 102(2). When it is assumed that the microphone 102(1) side is a plus angle, the audio source direction of the white noise 1103 (noise) is in the direction forming an angle of +50 degrees with respect to the straight line vertically crossing the straight line between the microphone 102(1) and the microphone 102(2).

An object here is to determine the audio source direction of the audio 1100 by removing, from each of the acoustic signals 100, the white noise 1101, the white noise 1102, and the white noise 1103.

Figure 14:
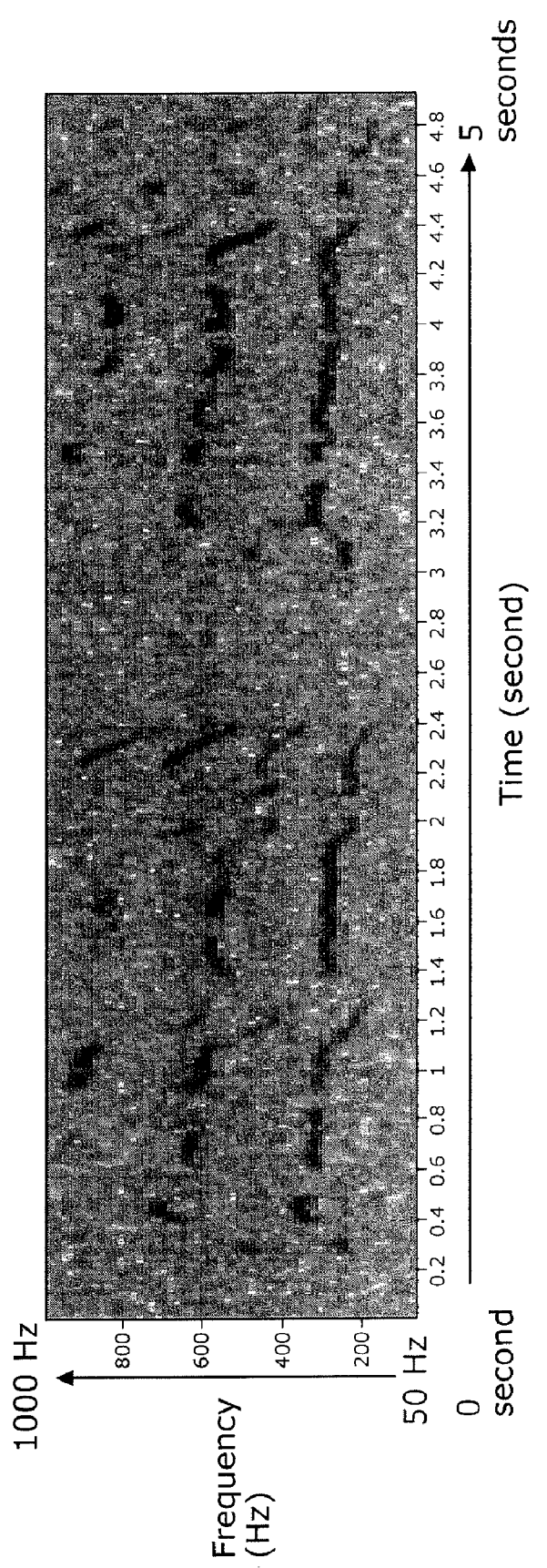
FIG. 14 is a diagram showing an exemplary spectrogram of the acoustic signal 100.

FIG. 14 shows an example of a spectrogram of the acoustic signal 100 in the microphone 102(1) in this exemplary case. The horizontal axis is the time axis (second) and the vertical axis is the frequency axis (Hz). The gray scale represents the magnitudes of the frequency spectra such that the gray becomes darker as the magnitudes become greater. The spectrogram displayed here covers a range of 50 Hz to 1000 Hz in frequency and 0 to 5 seconds in time. Here, phase components of the frequency spectra are not shown.

Figure 15:
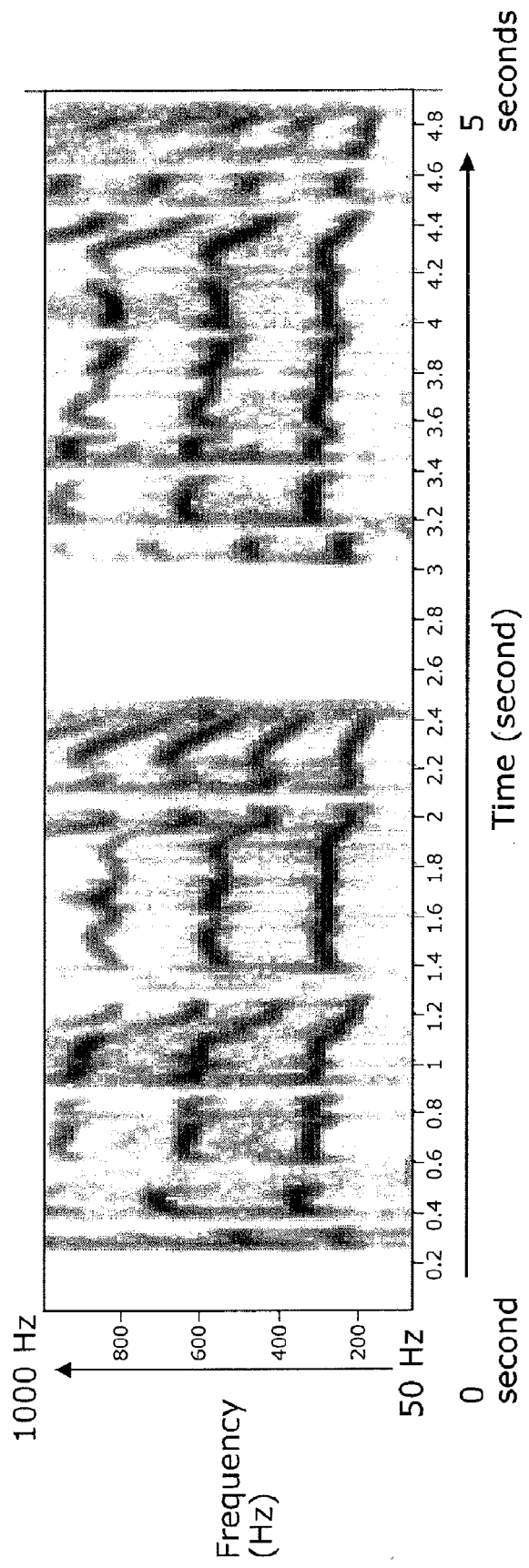
FIG. 15 is a diagram showing an exemplary spectrogram of an audio 1100 used in the generation of the acoustic signal 100.

FIG. 15 shows a spectrogram of the audio 1100 used when generating the acoustic signal 100 shown in FIG. 14. The spectrogram is displayed in the similar manner as FIG. 14, and thus the same descriptions are not repeated here.

In each of FIG. 14 and FIG. 15, the audio 1100 can be observed only in the parts of frequency spectra having great magnitude in the acoustic signal 100. It is further shown that the magnitudes of the frequency spectra of the white noises (obtained by adding the white noise 1101, the white noise 1102, and the white noise 1103) have greater values compared with those of the frequency spectra of the audio 1100.

First, each of the FFT analysis units 103(k) (k=1 to 3) performs fast Fourier transform on the acoustic signal 100 inputted by the corresponding microphone 102(k) (having the above-mentioned value), and calculates frequency spectra including phase components of the acoustic signal 100 (Step S600(k) (k=1 to 3). In this example, the frequency spectra on a complex space are calculated through the fast Fourier transform. In this example, the fast Fourier transform is performed such that a Hanning window of $\Delta T=64$ ms (1024 pt) is used as a time window for the acoustic signal 100 having a sampling frequency of 16000 Hz. In addition, these frequency spectra of plural time points are calculated with time shifts of 1 pt (0.0625 ms) in the time axis direction. FIG. 14 shows only the magnitudes of the frequency spectra in the microphone 102 (1) as a result of the processing.

Next, each of the detected audio determining units 104(k) (k=1 to 3) causes the corresponding one of the detected audio determining units 104(k, j) (k=1 to 3, j=1 to M) to determine time-point portions of the detected audios for each of the frequency bands j (j=1 to M) of the frequency spectra calculated by the corresponding one of the FFT analysis units 103(k) (having the above-mentioned value) (Step S601(k), and Step S601(k, j) (k=1 to 3, j=1 to M). The following descriptions are given of j-th frequency band only. In this example, the frequency of the j-th frequency band is f.

Each of the detected audio determining units 104(k, j) determines the target time point such that the sum of degrees of similarity between the frequency spectrum at the time point as the analysis target among plural time points selected from the time points of the time interval 1/f and frequency spectra at time points different from the target time point is greater than the first threshold value (Step S601(k, j) (j=1 to M)). Here, a description is given of an exemplary case where the frequency f is 500 Hz.

Figure 16:
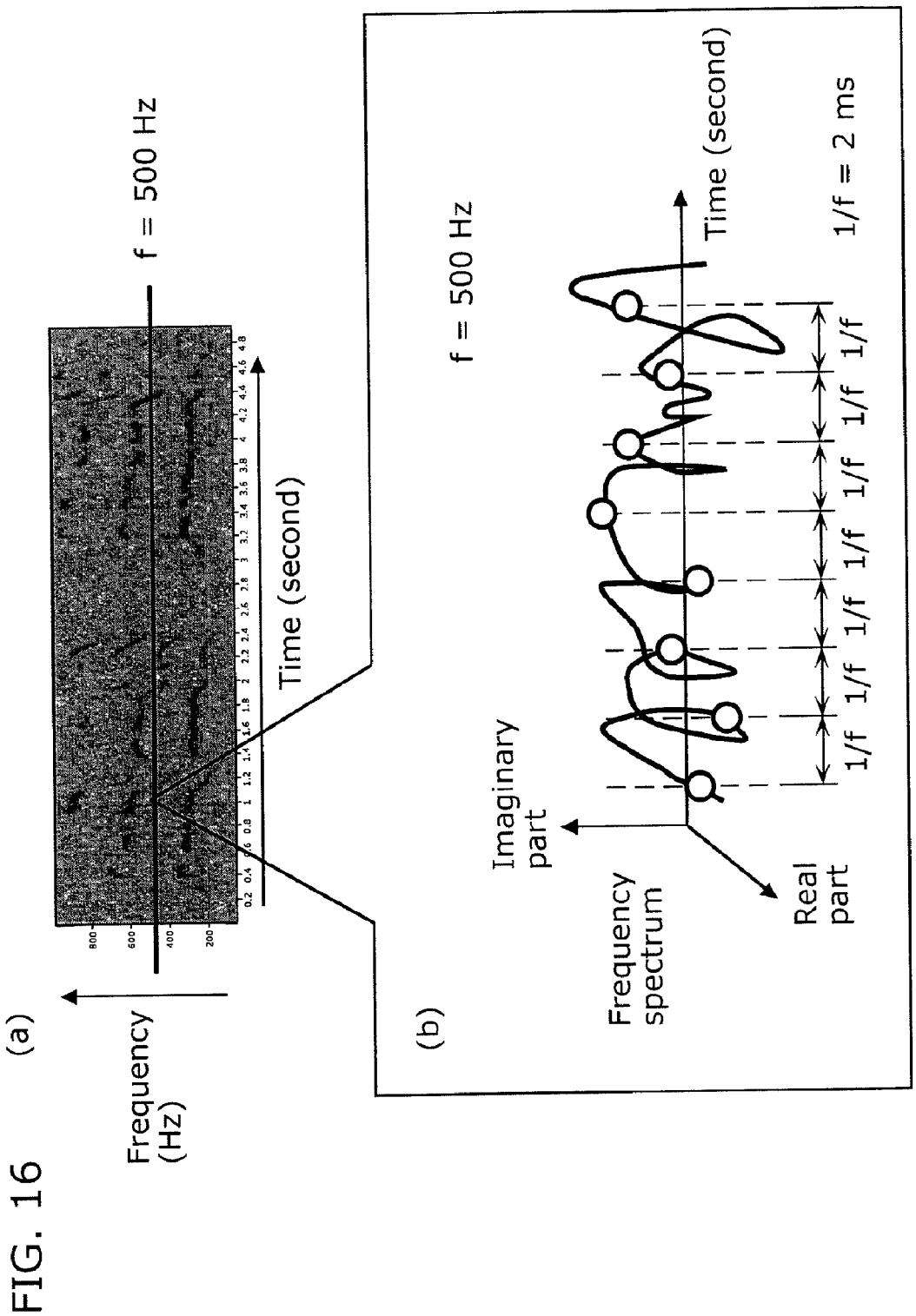
FIG. 16 is a diagram illustrating an exemplary method for determining frequency spectra.

FIG. 16(b) schematically shows frequency spectra including phase components when the frequency f is 500 Hz in the acoustic signal 100 shown in FIG. 16(a). FIG. 16(a) is similar to FIG. 14. In FIG. 16(b), the horizontal axis is the time axis (second), and the two-axis on the vertical plane shows the real part and imaginary part of the frequency spectra. Since the frequency f is 500 Hz in this example, 1/f is 2 ms.

First, each of the frequency spectrum determining units 300(k, j) determines the frequency spectra of the plural time points selected from among the time points of the time interval 1/f (Step S800(k, j)).

In FIG. 16(b), white circles show the positions of the frequency spectra at the plural time points determined from among the time points of the time interval 1/f. Here, as shown in FIG. 16(b), the frequency spectra of all the time points selected from among the time points of the time interval 1/f=2 ms are determined. In other words, the frequency spectra of the time points of the time interval 1/f=2 ms are determined.

Figure 17A:
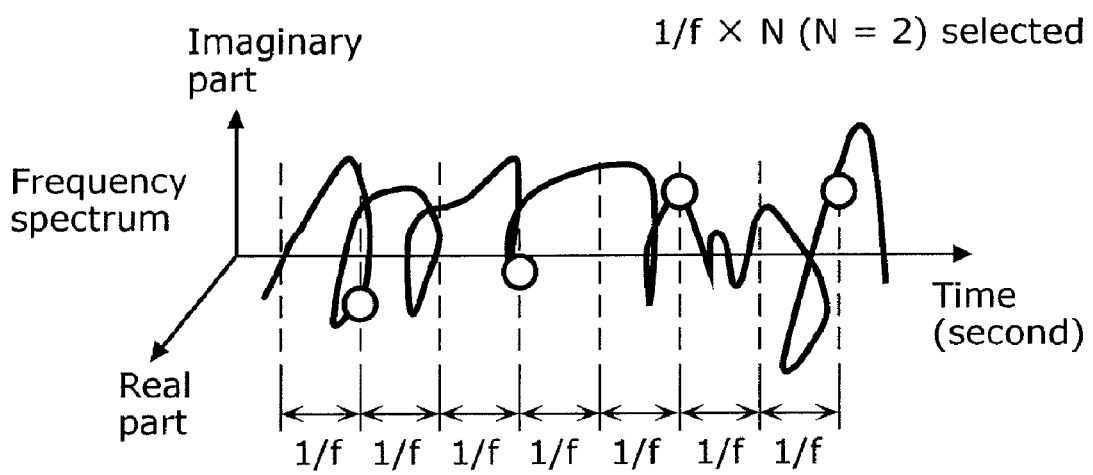
FIG. 17A is a diagram illustrating an exemplary method for determining frequency spectra.
Figure 17B:
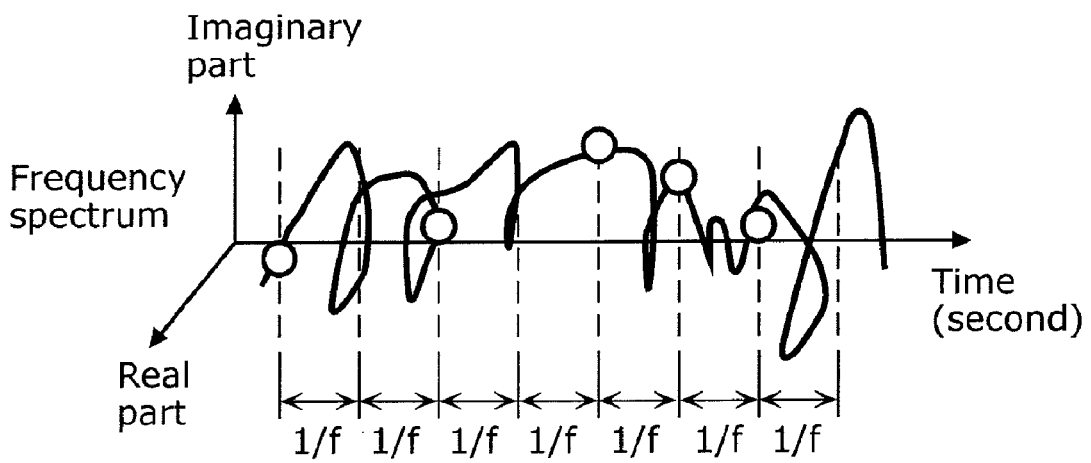
FIG. 17B is a diagram illustrating an exemplary method for determining frequency spectra.

Here, each of FIGS. 17A and 17B shows another method for determining frequency spectra. The spectrogram is displayed in the similar manner as FIG. 16(b), and thus the same descriptions are not repeated here. FIG. 17A shows an example of determining frequency spectra of time points of a time interval 1/f×N (N=2) from among the time points of the time interval 1/f. In addition, FIG. 17B shows an example of determining frequency spectra of the time points selected at random from among time points of the time interval 1/f.

Here, each of the frequency spectrum determining units 300(k, j) determines the time range of the frequency spectra that a corresponding one of the degree-of-similarity calculating units 301(k, j) uses to calculate the sum of degrees of similarity. However, a description of the method for determining the time range is included in a later-given description of the degree-of-similarity calculating units 301(k, j).

Next, each of the degree-of-similarity calculating units 301(k, j) calculates the sum of degrees of similarity based on the frequency spectra determined by the corresponding one of the frequency spectrum determining units 300(k, j) (Step S801(k, j)). Here, the degrees of similarity used here are cross-correlation values.

Figure 18:
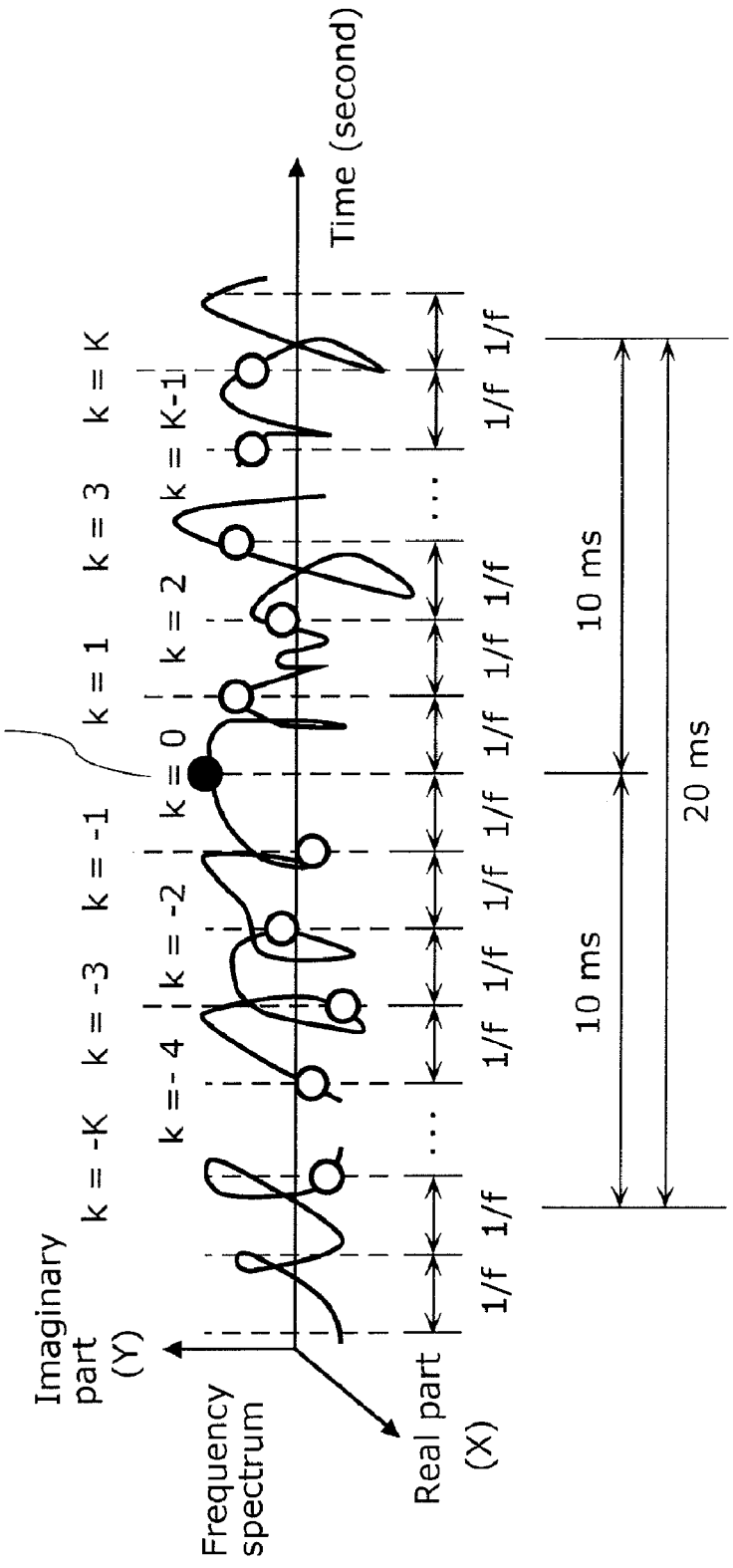
FIG. 18 is a diagram illustrating an example of calculation of the sum of degrees of similarity.

FIG. 18 shows an example of calculation of the sum of degrees of similarity. As for display in FIG. 18, the same descriptions as in the case of FIG. 16(b) are not repeated here. In FIG. 18, a black circle shows the frequency spectrum at the time point as the analysis target, and white circles show the frequency spectra at the plural time points different from the target time point.

The frequency spectra of which degrees of similarity with respect to the target frequency spectrum are calculated in this example are frequency spectra at time points (represented by white circles) obtained by subtracting the target time point from time points of the time interval 1/f (=2 ms) included in the time points (having a time width of 20 ms) within ±10 ms from the target time point (represented by the black circle). Here, the time range of frequency spectra used in the calculation of the sum of degrees of similarity is assumed to be the time points (having a time width of 20 ms) within ±10 ms from the target time point. This value is a value empirically obtained based on the characteristics of the audio which is the acoustic signal to be extracted.

The following describes a method for calculating the sum of degrees of similarity. It is assumed that the real part of a frequency spectrum is represented as Expression 1.

$$x_k (k=-K, \ldots, -2,-1,0,1,2, \ldots, K) \qquad \text{[Expression 1]}$$

It is also assumed that the imaginary part of the frequency spectrum is represented as Expression 2.

$$y_k (k=-K, \ldots, -2,-1,0,1,2, \ldots, K) \qquad \text{[Expression 2]}$$

The symbol "k" here represents the number for specifying a corresponding one of the frequency spectra. The frequency spectrum of k=0 represents the frequency spectrum at the target time point. The frequency spectra of k (k=-k, ..., -2, -1, 1, 2, ... k) other than zero represent frequency spectra for calculating degrees of similarity with respect to the frequency spectrum at the target time point (See FIG. 18). The sum of degrees of similarity S is calculated according to Expression 3.

$$S = \sum_{k=-K}^{k=-1} (x_0 \times x_k + y_0 \times y_k) + \sum_{k=1}^{k=K} (x_0 \times x_k + y_0 \times y_k) \qquad \text{[Expression 3]}$$

The following describes other methods for calculating the sum of degrees of similarity S. One of the methods is a method for normalization using the number of degrees of similarity summed up in calculation of cross-correlation values according to Expression 4.

$$S = \frac{1}{2K} \left( \sum_{k=-K}^{k=-1} (x_0 \times x_k + y_0 \times y_k) + \sum_{k=1}^{k=K} (x_0 \times x_k + y_0 \times y_k) \right)$$ [Expression 4]

One of the methods is a method for adding degrees of similarity with respect to the frequency spectrum at the target time point according to Expression 5.

$$S = \sum_{k=-K}^{k=K} (x_0 \times x_k + y_0 \times y_k)$$ [Expression 5]

One of the methods is a method using cross-correlation values normalized using the magnitudes of frequency spectra according to Expression 6.

$$S = \sum_{k=-K}^{k=-1} \frac{(x_0 \times x_k + y_0 \times y_k)}{\sqrt{x_0^2 + y_0^2}\sqrt{x_k^2 + y_k^2}} + \sum_{k=1}^{k=K} \frac{(x_0 \times x_k + y_0 \times y_k)}{\sqrt{x_0^2 + y_0^2}\sqrt{x_k^2 + y_k^2}}$$ [Expression 6]

One of the methods is a method using the inverse numbers of values representing the distances between frequency spectra according to Expression 7

$$S = 1 \Big/ \left( \sum_{k=-K}^{k=K} \sqrt{(x_0 - x_k)^2 + (y_0 - y_k)^2} + \alpha \right)$$ [Expression 7]

One of the methods is a method using the inverse numbers of values representing the distances between phase components according to Expression 8.

$$S = 1 \Big/ \left( \sum_{k=-K}^{k=K} \sqrt{(\arctan(y_0/x_0) - \arctan(y_k/x_k))^2} + \alpha \right)$$ [Expression 8]

Here, $$\alpha$$ [Expression 9]

is a predetermined small value used to prevent infinite divergence of S.

Lastly, each of the detected audio determining units 302(k, j) determines, as the time-point portions of the detected audios, time-point portions of the target frequency spectrum that yields the sum of degrees of similarity equal to or greater than the first threshold value (Step S802(k, j)).

When the first threshold value is represented as A, each of the detected audio determining units 302(k, j) determines frequency spectra at time points that satisfy the condition of Expression 10.

$$S \geq A$$ Expression [10]

In this example, the first threshold value A is assumed to be the value derived by the following Expression.

$$A = 10^{10.0}$$ [Expression 11]

This value is the value empirically obtained based on the acoustic pressure level of the acoustic signal 100. Methods for setting a threshold value A includes a method for setting the threshold value A such that only noises are removed based on the dynamic range of the audio to be extracted and the dynamic range of the noises. Another example is a method for setting, as the threshold value A, a value enabling complete removal of noises but allowing that an audio (slightly distorted) to be extracted is partly removed to some extent. Another example in contrast to this is a method for setting, as the threshold value A, a value enabling complete extraction of an audio (slightly distorted) to be extracted but allowing that noises cannot be completely removed. This processing is performed on the frequency spectra at all the time points calculated with time shifts of 1 pt (0.0625 ms) in the time axis direction.

Figure 19:
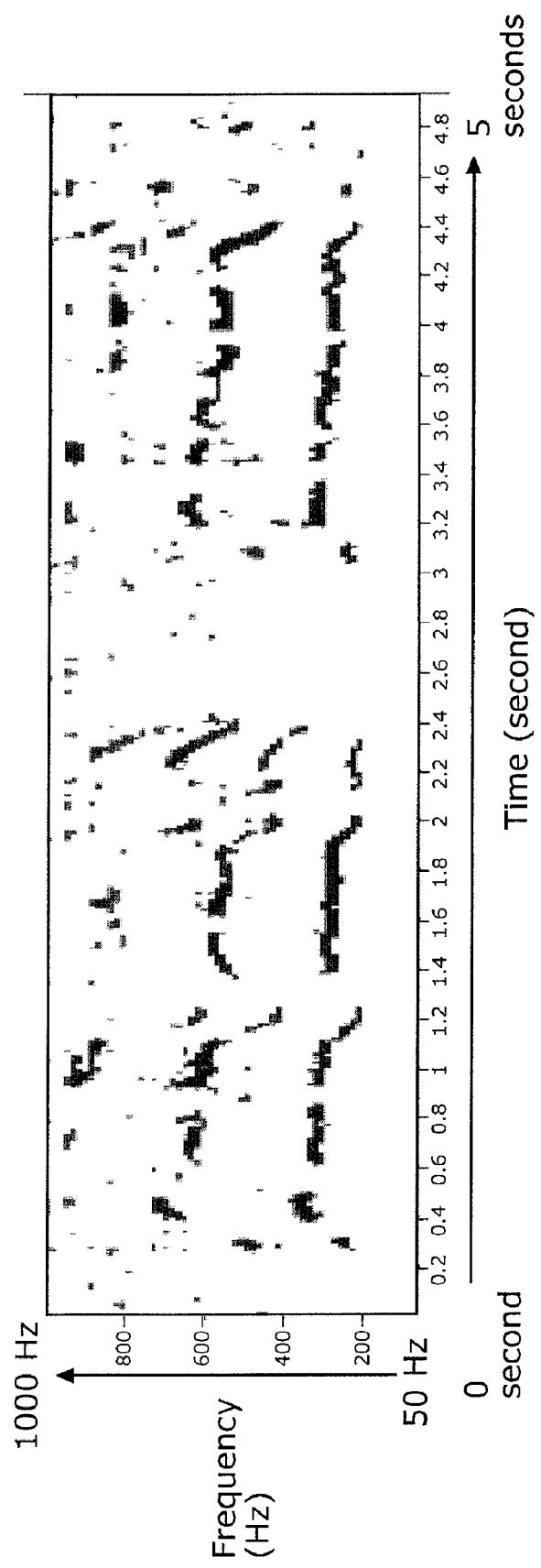
FIG. 19 is a diagram showing an exemplary spectrogram of an audio extracted from the acoustic signal 100.

FIG. 19 shows a spectrogram of the audio 1100 extracted from the acoustic signal 100 shown in FIG. 14. The spectrogram is displayed in the similar manner as FIG. 14, and thus the same descriptions are not repeated here. Comparison of FIG. 19 with FIG. 14 and FIG. 15 shows that the audio 1100 is extracted after noise portions greatly distorted due to the white noises and the mixed audio are removed from the acoustic signal 100 (the white noises include the white noise 1101, the white noise 1102, and the white noise 1103).

Figure 20A:
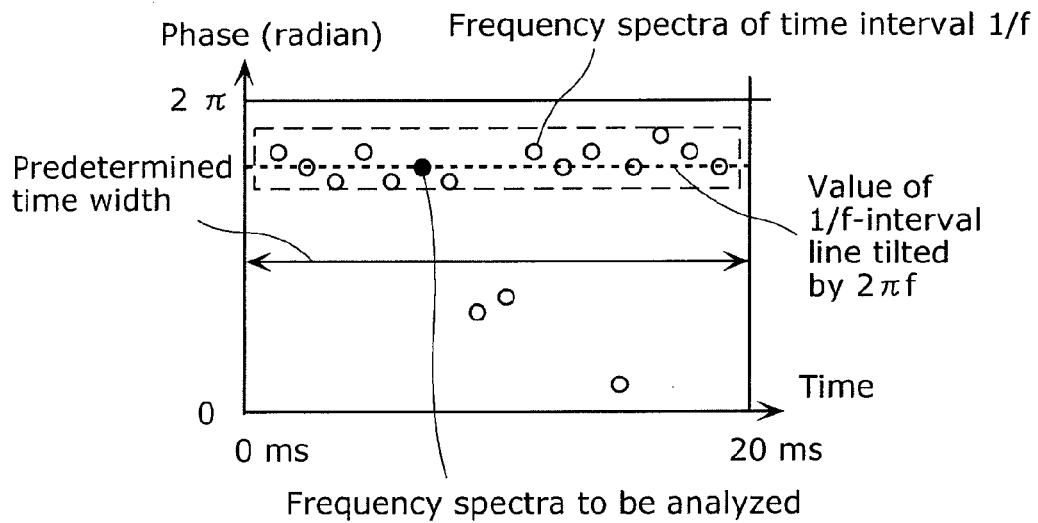
FIG. 20A is a schematic diagram showing the phases of frequency spectra of the acoustic signal in a time range (a predetermined time width) used to calculate the sum of degrees of similarity.
Figure 20B:
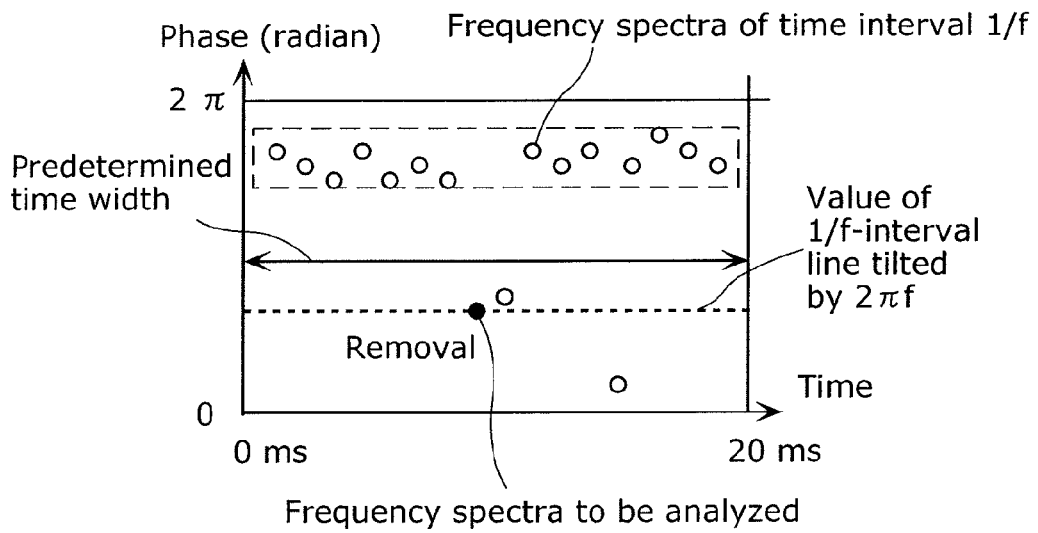
FIG. 20B is a schematic diagram showing the phases of the frequency spectra of the acoustic signal in the time range (the predetermined time width) used to calculate the sum of degrees of similarity.

Here, a consideration is made on the phases of the frequency spectra of the acoustic signal to be removed as noises. Each of FIG. 20A and FIG. 20B schematically shows the phases of the frequency spectra of the acoustic signal in the time range (the predetermined time width) used to calculate the sum of degrees of similarity. The horizontal axis represents time, and the vertical axis represents phases. A black circle represents the phase of the target frequency spectrum, and white circles represent the phases of the frequency spectra of which degrees of similarity with respect to the target frequency spectrum are calculated. The phases shown here are the phases of the frequency spectra at the time interval 1/f. As shown in FIG. 20A, calculating the sum of degrees of similarity is equivalent to calculating the sum of degrees of similarity of the time point corresponding to the phase of the target frequency spectrum with respect to a straight line tilted by 2πf (the straight line is configured with horizontal values when the time interval is 1/f). In FIG. 20A, the phases of the frequency spectra of which degrees of similarity are calculated are observed near the straight line. Thus, the sum of degrees of similarity is greater than the threshold A, and therefore the corresponding portions are not removed as noises. In addition, as in the case of FIG. 20B, when almost no frequency spectra of which degrees of similarity are calculated are present near the straight line tilted by 2πf with respect to the time point corresponding to the phase of the target frequency spectrum, the sum of degrees of similarity are equal to or less than the threshold value A, and thus the portion is removed as noises.

With the above-described structure, it is possible to accurately determine time-point portions of detected audios by means that the detected audio determining units 104(k) (k=1 to 3) determines noise portions with distorted phase components (portions of white noises such as background noises, or portions of noises distorted due to the mixed audio).

Further, the structure makes it unnecessary to modify any phase shifts because the sum of degrees of similarity is obtained based on frequency spectra at time points of the time interval 1/f that prevent time-dependent phase shifts, thereby obtaining an advantageous effect of reducing the amount of calculation. In other words, it is possible to calculate, using a space defined by ψ(t), degrees of similarity of phases in a space defined by ψ(t)−(2πft). This simplifies the method for calculating degrees of similarity, thereby providing the advantageous effect of reducing the amount of calculation necessary to modify the phases. Here, a description is given of "time-dependent phase shifts". As described with reference to FIG. 7A, it is assumed that the phases of the frequency spectra having a frequency f of the acoustic signal as an extraction target rotate by 360 degrees at a constant velocity per time interval 1/f. Thus, the phase shifts as time shifts.

Figures 21A, 21B:
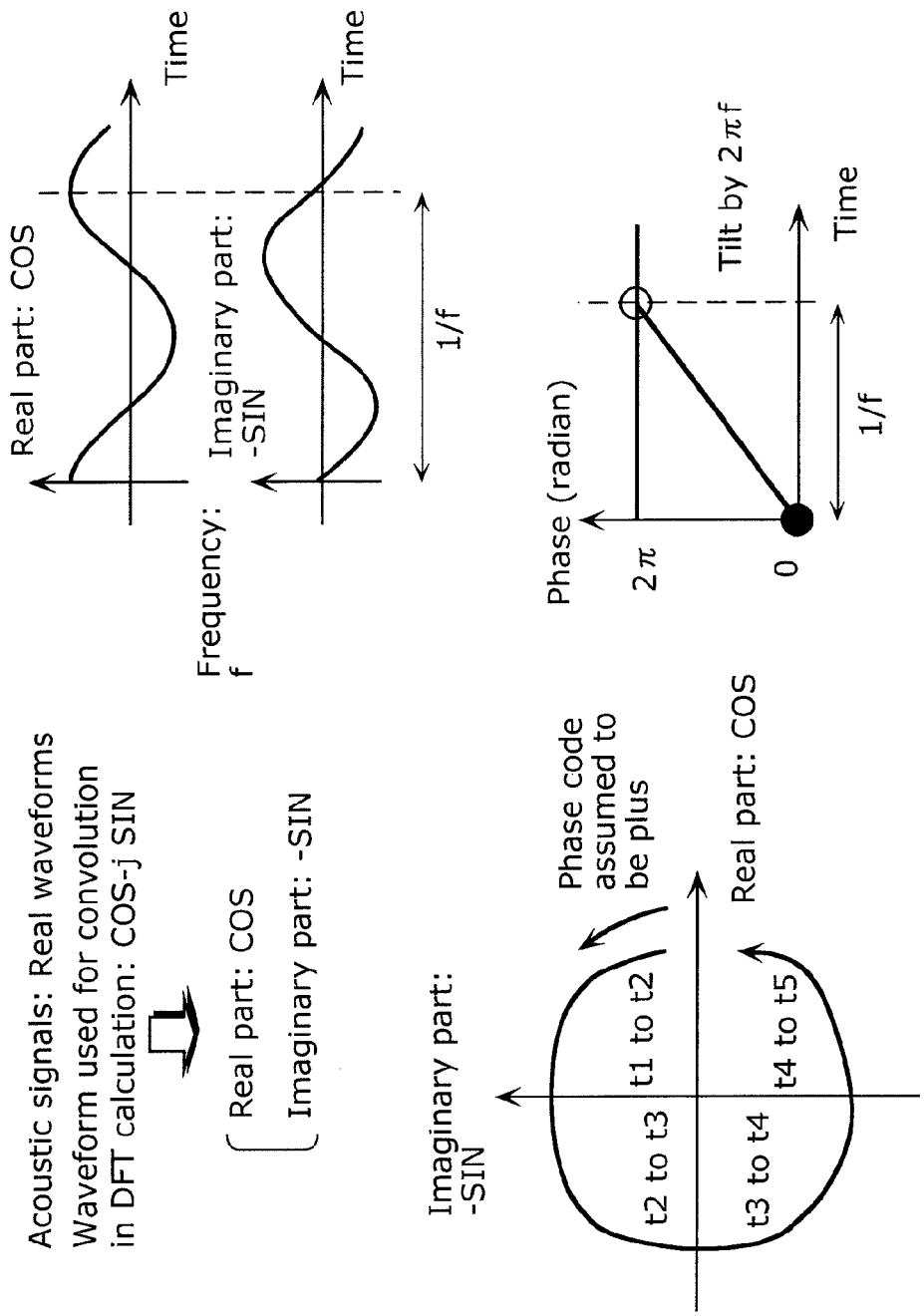
FIG. 21A is a diagram illustrating a "time-dependent phase shift".
FIG. 21B is a diagram illustrating the "time-dependent phase shift.
Figure 22B:
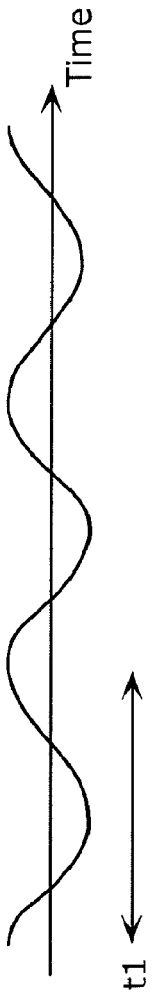
FIG. 22B is a diagram illustrating a mechanism of how phases shift counterclockwise as time shifts.
Figure 22C:
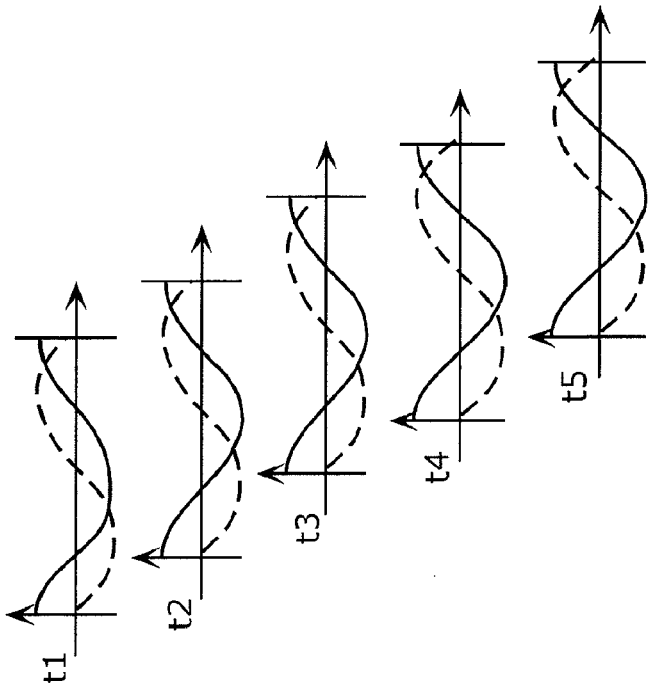
FIG. 22C is a diagram illustrating a mechanism of how phase shift counterclockwise as time shifts.

FIG. 21A shows a waveform of DFT (discrete Fourier transform) used for convolution on the acoustic signal in frequency analysis. The real part is a cosine waveform, and the imaginary part is a sine wave. Here, a signal of the frequency f is analyzed. When the acoustic signal is a sinusoidal wave of the frequency f, the phases of the frequency spectra in the frequency analysis shift counterclockwise as time shifts as shown in FIG. 21B. At this time, the horizontal axis represents the real part, and the vertical axis represents the imaginary part. When it is assumed that the phase rotating counterclockwise is plus, the phase increments by 2π (radian) per time 1/f. In other words, the phase tilts by 2πft with respect to time shifts. The mechanism that the phases rotate counterclockwise as time shifts is described with reference to FIGS. 22A to 22C. FIG. 22A shows the acoustic signal (the sinusoidal wave of the frequency f). Here, the magnitude of the acoustic signal is assumed to be 1. FIG. 22B shows waveforms of DFT (frequency f) used for convolution on the acoustic signal in frequency analysis. The solid lines represent cosine waveforms in the real parts, and the broken lines represent minus sine waves in the imaginary parts. FIG. 22C shows the codes of values after convolution of the acoustic signal in FIG. 22A and the DFT waveforms in FIG. 22B. FIG. 22C shows that the phases shift: to the first quadrant in FIG. 21B when the time is t1 to t2; to the second quadrant in FIG. 21B when the time is t2 to t3; to the third quadrant in FIG. 21B when the time is t3 to t4; and to the fourth quadrant in FIG. 21B when the time is t4 to t5. This shows that the phases shift counterclockwise as time shifts.

Figure 23A:
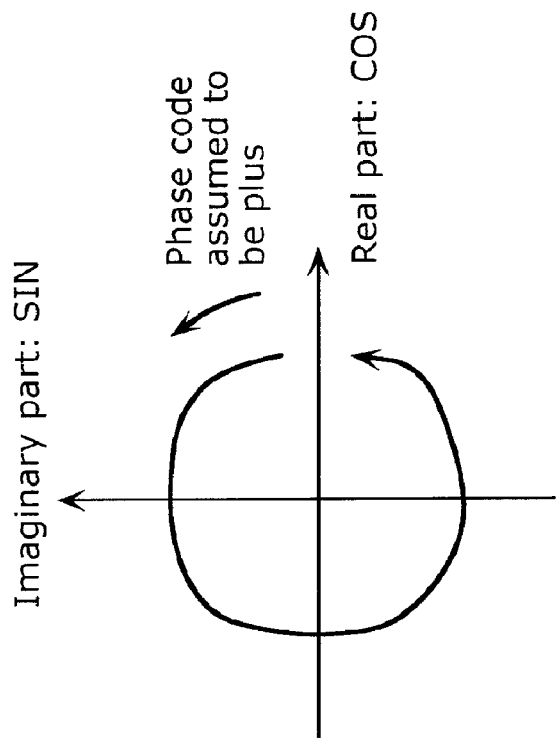
FIG. 23A is a diagram illustrating "time-dependent phase shifts".
Figure 23B:
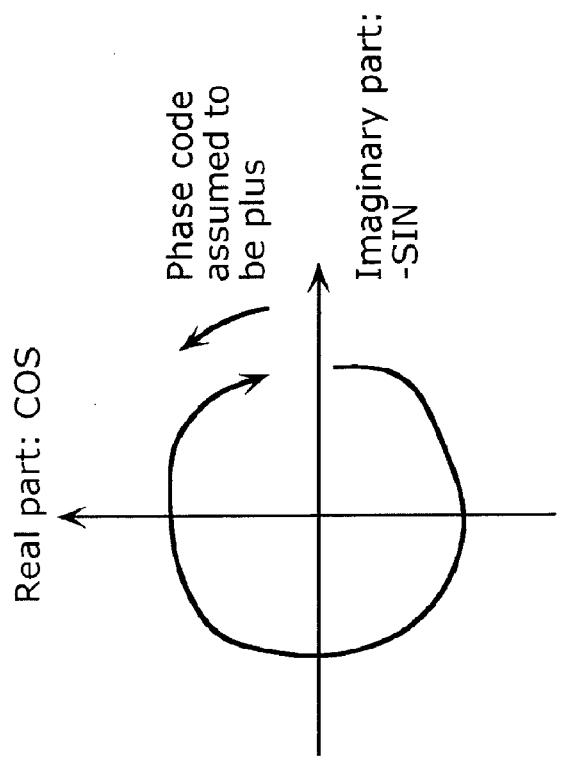
FIG. 23B is a diagram illustrating "time-dependent phase shifts".

It is noted that, as shown in FIG. 23A, when it is specifically assumed that the horizontal axis is the imaginary part, and the vertical axis is the real part, the increments and decrements in the phases are inverted and the phases tilt by −2πf as time shifts. Here, a description is given assuming that the axes are modified to the axes in FIG. 21B. It is further noted that, as shown in FIG. 23B, when it is specifically assumed that a cosine waveform is used for the real part of the waveform used for convolution performed in frequency analysis and a sine waveform is used for the imaginary part, the increments and decrements in the phases are inverted and the phases tilt by −2πf as time shifts. Here, a description is given assuming that the codes of the real part and imaginary part are modified according to the frequency analysis result shown in FIG. 21A.

This phenomenon is called "time-dependent phase shifts". Since the phases return per time interval 1/f, it can be considered that the frequency spectra of the acoustic signal at the time points of the time interval 1/f have the same phases. Therefore, it becomes unnecessary to modify phase shifts.

In addition, the use of cross-correlation values as degrees of similarity makes it possible to make a determination on phase shifts without focusing on the difference in magnitude between the frequency spectra. This provides an advantageous effect of determining noise portions including distorted phase components in the case of an acoustic signal including frequency spectra each having a small amplitude.

Next, the direction detecting unit 105 calculates, for the detected audios, values of cross-correlation between the time-point portions, which are present at the same time points as the time-points of the frequency spectra of the detected audios, determined in association with all the respective possible pairs of the three microphones, based on the frequency spectra from which noises in the time-point portions determined by each of the detected audio determining units 104(k) (k=1 to 3) have been removed (the possible pairs are the microphone 102(1) and microphone 102(2), the microphone 102(2) and the microphone 102(3), and the microphone 102(1) and the microphone 102(3)). For each of the possible pairs of the microphones, the direction detecting unit 105 (i) calculates an arrival time difference based on the local maximum value in the cross-correlation values, (ii) calculates an audio source direction based on the calculated arrival time difference and the intervals between these microphones, (iii) adjusts the time axes of the frequency spectra of the acoustic signals received by the at least two microphones such that the arrival time difference becomes zero, (iv) calculates the percentage of the same time-point portions determined for one of the at least two microphones and present at the time points at which the same time-point portions determined for the other microphone are present respectively with respect to the time segment used to determine an audio source direction, and (v) outputs information indicating an audio source direction 106 when the percentage is greater than a predetermined threshold (Step S602). Here, the same time-point portions are included in the time-point portions determined by the detected audio determining unit.

First, the direction detecting unit 105 calculates an audio source direction for each of the possible pairs of the three microphones (Step S900(1), Step S900(2), and Step S900(3)). Here, a description is given of a case of a pair of the microphone 102(1) and the microphone 102(2) (Step S900(1)). The other pairs perform the same processing, and thus the same descriptions are not repeated (the other pairs perform Step S900(2) and Step S900(3), respectively).

First, each of the time segment determining units 503(1, j) determines the time segment for which an audio source direction is calculated (this time segment is used to calculate the audio source direction averaged temporally) (Step S1003(1, j)). This time segment can be determined based on a moving velocity of the audio source of which an audio source direction is determined. In the case of a high moving velocity, there is a need to prepare a small time segment. In addition, preparation of a large time segment makes it possible to calculate a stable audio source direction because of an increase in the amount of data of the frequency spectra to calculate an audio source direction. For this reason, it is preferable that the time segment is large within an allowed range.

Next, each of the percentage determining units 500(1, j) judges whether or not the percentage of the time-point portions, which are present at the same time points and included in the j-th frequency band of the frequency spectra, determined in association with the respective microphones in the time segment determined by the time segment determining units 503(1, j) used to calculate cross-correlation values is smaller than the second threshold value, based on the frequency spectra of the time-point portions determined by the detected audio determining unit 104(1) and the frequency spectra of the time-point portions, which are present at the same time points and corresponding to the j-th frequency band of the frequency spectra, determined by the detected audio determining unit 104(2) in the j-th frequency band (Step S1000(1, j)).

Figure 24:
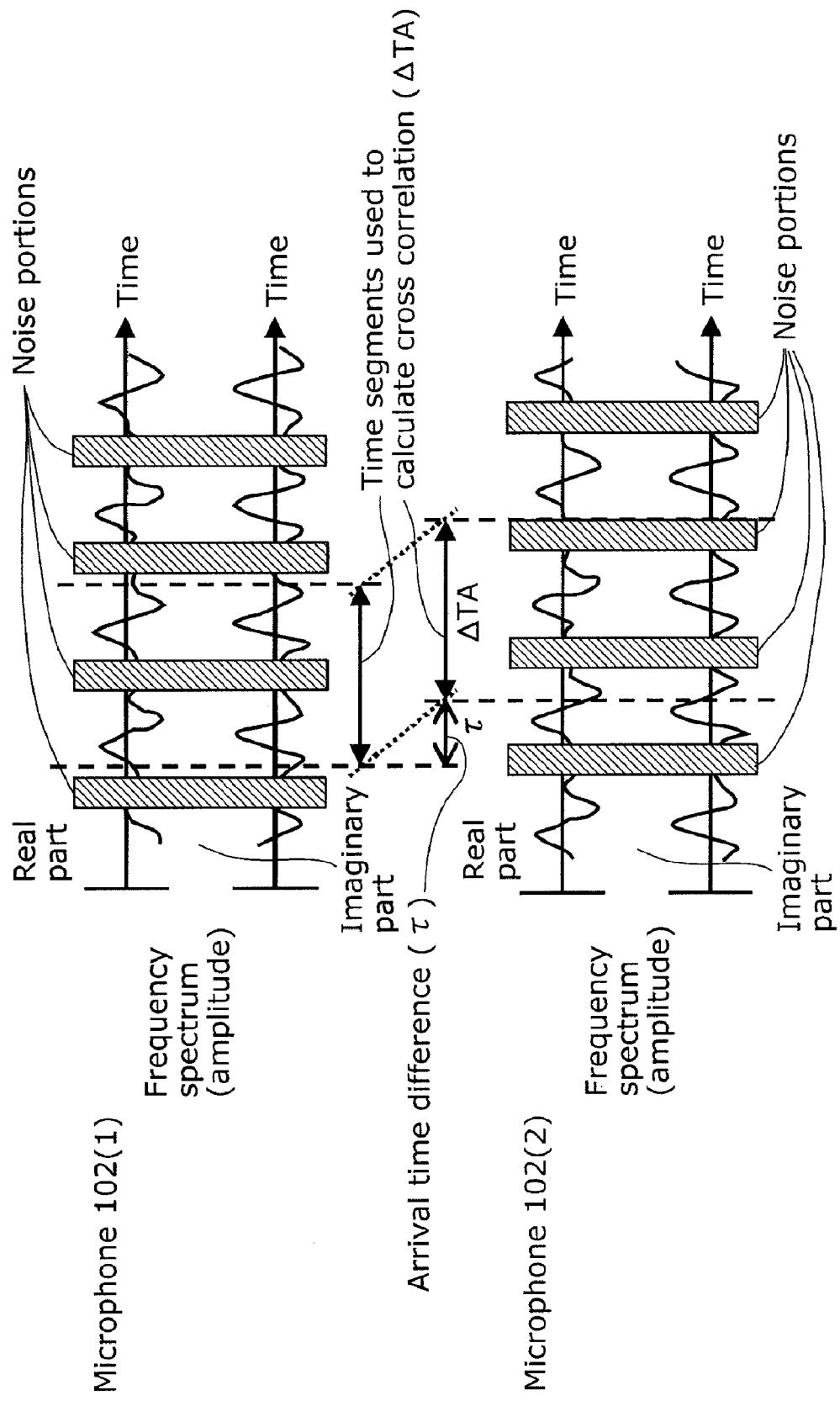
FIG. 24 is a diagram illustrating an exemplary method for calculating percentages of same time-point portions of frequency spectra with respect to a time segment in an operation performed by a percentage determining unit 500(1,j).
Figure 25:
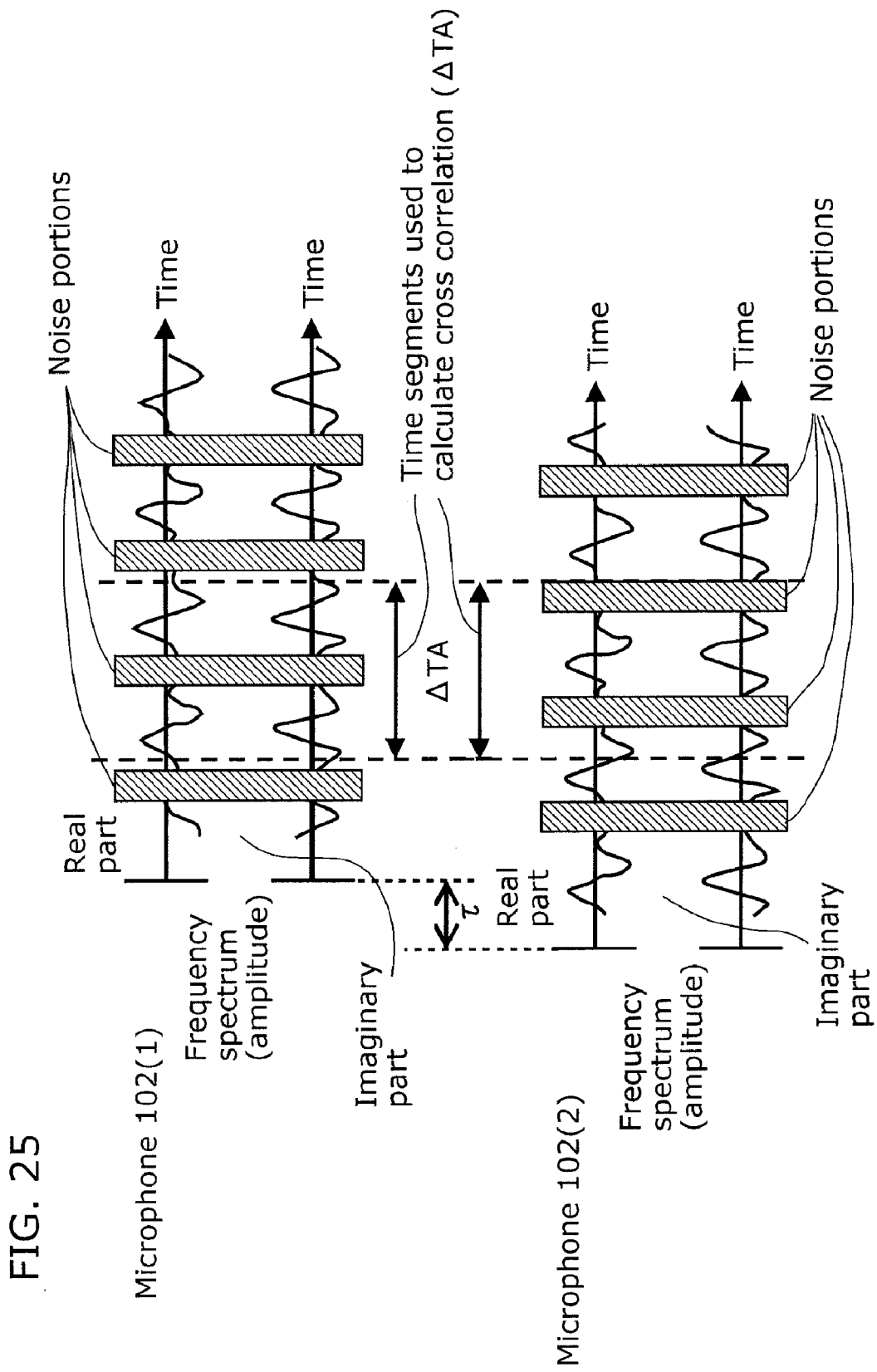
FIG. 25 is a diagram illustrating an exemplary method for calculating percentages of same time-point portions of frequency spectra with respect to a time segment in an operation performed by the percentage determining unit 500(1,j).
Figure 26:
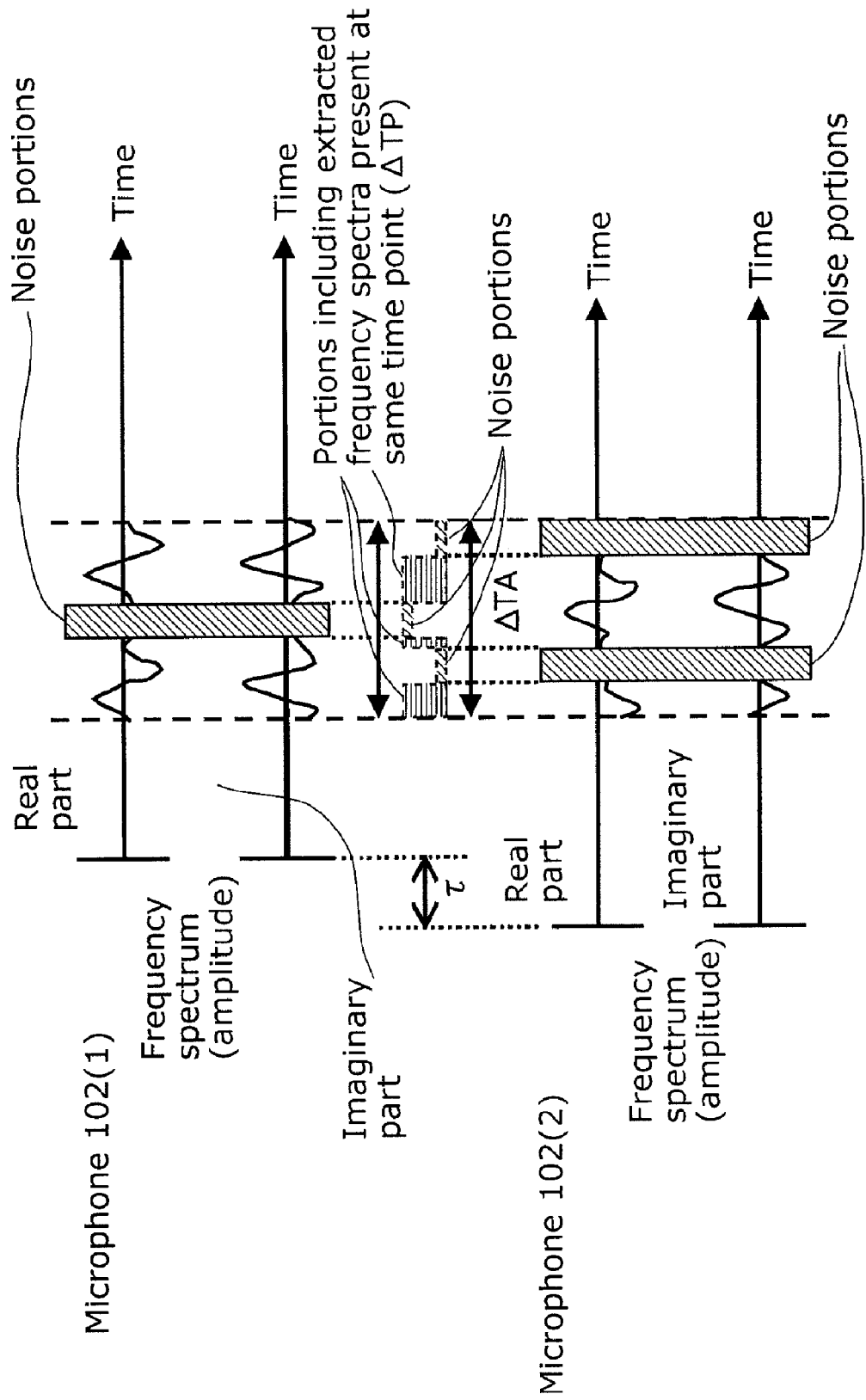
FIG. 26 is a diagram illustrating an exemplary method for calculating percentages of same time-point portions of frequency spectra with respect to a time segment in an operation performed by the percentage determining unit 500(1,j).

Each of FIG. 24 to FIG. 26 shows an exemplary method for determining whether or not the percentage of the time-point portions of frequency spectra associated with the respective microphones in the time segment used to calculate cross-correlation values is smaller than the second threshold value. In this example, the second threshold value is assumed to be 100%.

FIG. 24 schematically shows frequency spectra (present at the time-point portions of frequency spectra in the j-th frequency bands) determined in association with the microphone 102(1) by the detected audio determining unit 104(1) and frequency spectra at the time-point portions, in the j-th frequency band, determined in association with the microphone 102(2) by the detected audio determining unit 104(2). The horizontal axes represent time, and the vertical axes represent amplitude values in the real parts and imaginary parts of the frequency spectra. Shaded portions represent noise portions. Here, the time segment used in the calculation of cross-correlation values is assumed to be ΔTA. In addition, the arrival time difference of audios at each pair of the microphones is assumed to be τ.

In FIG. 25, the time axes of the frequency spectra generated for the microphone 102(1) and the time axes of the frequency spectra generated for the microphone 102(2) in FIG. 24 are shifted by the arrival time difference τ. The frequency spectra are displayed as in the same manner as FIG. 24, and thus the same descriptions are not repeated.

FIG. 26 shows, as ΔTP, the sum of the time-point portions at time points in the time segment included in the frequency spectra generated for the microphone 102(1) and the time-point portions at the same time points in the time segment included in the frequency spectra generated for the microphone 102(2) in FIG. 25. In FIG. 26, the sum of the shaded portions in the time segment is ΔTP. ΔTP is the sum of the time-point portions in the time segment for the frequency spectra generated for the microphone 102(1) and the frequency spectra generated for the microphone 102(2). These time-point portions are present at the same time points of the frequency spectra of the audios when the time axes are adjusted by the arrival time difference τ.

Each of the percentage determining units 500(1, j) judges whether or not the value obtained by (ΔTP/ΔTA)×100% is less than the second threshold value (=100%).

When each of the percentage determining units 500(1, j) judges that the (ΔTP/ΔTA)×100% is no less than the second threshold value (=100%), a corresponding one of the correlation calculating units 501(1, j) calculates values of cross-correlation between the frequency spectra of the time-point portions, which are present at the time points in the j-th frequency spectrum of the detected audio, determined by the detected audio determining unit 104(1) and the frequency spectra of the time-point portions, which are present at the same time points in the j-th frequency spectrum of the detected audio, determined by the detected audio determining unit 104(2). It is to be noted that the cross-correlation values are calculated with changes in arrival time differences τ.

It is assumed that the real part of the time-point portions of the frequency spectra generated for the microphone 102(1) is represented as Expression 12.

$$x_k^1 \quad \text{[Expression 12]}$$

It is further assumed that the imaginary part of the portions of the frequency spectra generated for the microphone 102(1) is represented as Expression 13.

$$y_k^1 \quad \text{[Expression 13]}$$

It is further assumed the real part of the time-point portions of the frequency spectra generated for the microphone 102(2) is represented as Expression 14.

$$x_k^2 \quad \text{[Expression 14]}$$

It is further assumed that the imaginary part of the portions of the frequency spectra generated for the microphone 102(2) is represented as Expression 15.

$$y_k^2 \quad \text{[Expression 15]}$$

The symbol "k" here represents the number for specifying a corresponding one of time points in the frequency spectrum. A cross-correlation value H is calculated according to Expression 16.

$$H = \sum_k (x_k^1 \times x_k^2 + y_k^1 \times y_k^2) \quad \text{[Expression 16]}$$

The following shows other methods for calculating a cross-correlation value H. One of the methods is a method for normalization using the number of summed time points K according to Expression 17.

$$H = 1/K \times \sum_k (x_k^1 \times x_k^2 + y_k^1 \times y_k^2) \quad \text{[Expression 17]}$$

One of the methods is a method for normalization using the magnitudes of the frequency spectra according to Expression 18.

$$H = \sum_k \frac{(x_k^1 \times x_k^2 + y_k^1 \times y_k^2)}{\sqrt{(x_k^1)^2 + (y_k^1)^2} \sqrt{(x_k^2)^2 + (y_k^2)^2}} \quad \text{[Expression 18]}$$

Lastly, each of the direction determining units 502(1, j) calculates an arrival time difference based on the local maximum value in the cross-correlation values regarding, as candidate audio source directions, the audio source directions corresponding to the cross-correlation values calculated by the corresponding one of the correlation calculating units 501(1, j), and calculates the audio source direction based on the calculated arrival time differences and the interval between each of all the possible pairs of the microphones. Here, however, each of the percentage determining units 500 (1, j) transmits a direction determination signal to the corresponding one of the direction determining units 502(1, j) such that the audio source direction is determined only when the percentage with respect to the cross-correlation value corresponding to each of all the audio source directions forming angles of −90 to +90 degrees is equal to or greater than the second threshold value. Each of the direction determining units 502(1, j) calculates the audio source direction on receiving a direction determination signal from the corresponding one of the percentage determining units 500(1, j).

Figure 27:
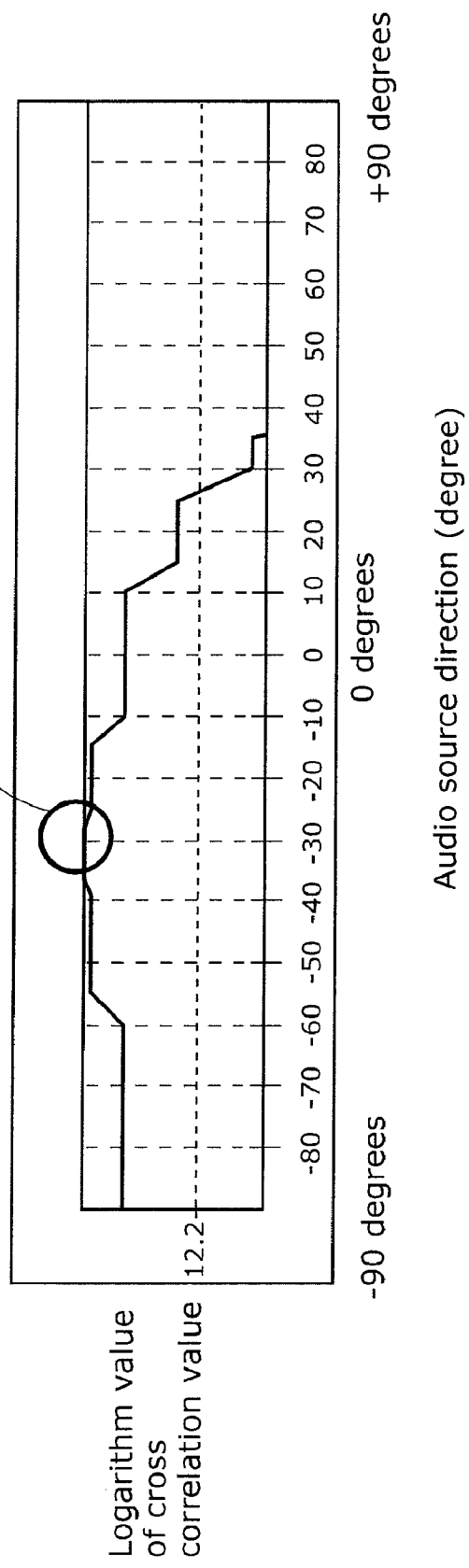
FIG. 27 is a diagram illustrating an example of a relationship of cross-correlation values with respect to candidate audio source directions.

FIG. 27 shows examples of cross-correlation values when it is assumed that the audio source directions are within a range from −90 to +90 and the audio source directions are shifted by 5 degrees. It is to be noted that, in reality, the cross-correlation values are calculated with changes in arrival time differences τ as described above. The horizontal axis represents the audio source directions (degrees), and the vertical axis represents the logarithm values of the cross-correlation values. In this example, the local maximum value is obtained in the direction of −30 degrees. In other words, the audio source direction calculated based on the arrival time difference corresponding to the local maximum value in the cross-correlation values and the interval between the microphones is −30 degrees. This means that the percentage with respect to each of all the directions divided by 5 degrees within the range of −90 to +90 is no less than the second threshold value, and thus all the cross-correlation values have been calculated.

Figure 28:
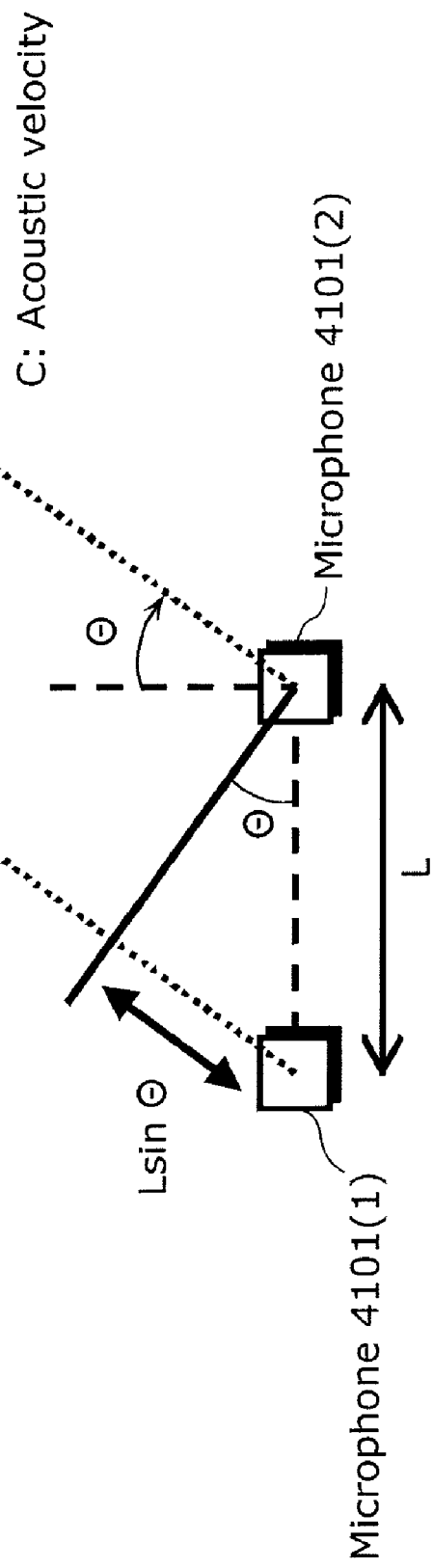
FIG. 28 is a schematic diagram showing a method for calculating an audio source direction.

The following shows a method for calculating an audio source direction Θ based on the arrival time difference τ and the interval L between the microphones. FIG. 28 is a diagram schematically showing a method for calculating an audio source direction. When it is assumed here that the acoustic velocity is C, and that an audio source direction is Θ, the relational Expression 19 is satisfied, thereby calculating the direction of an audio source 4100 based on the arrival time differences.

$$\Theta = \arcsin(\tau \times C/L) \qquad \text{[Expression 19]}$$

It is assumed here that "L" denotes the interval between the microphones (the distance between the microphone 4101(1) and the microphone 4101(2)), and that τ denotes the arrival time difference between the microphones.

Figure 29:
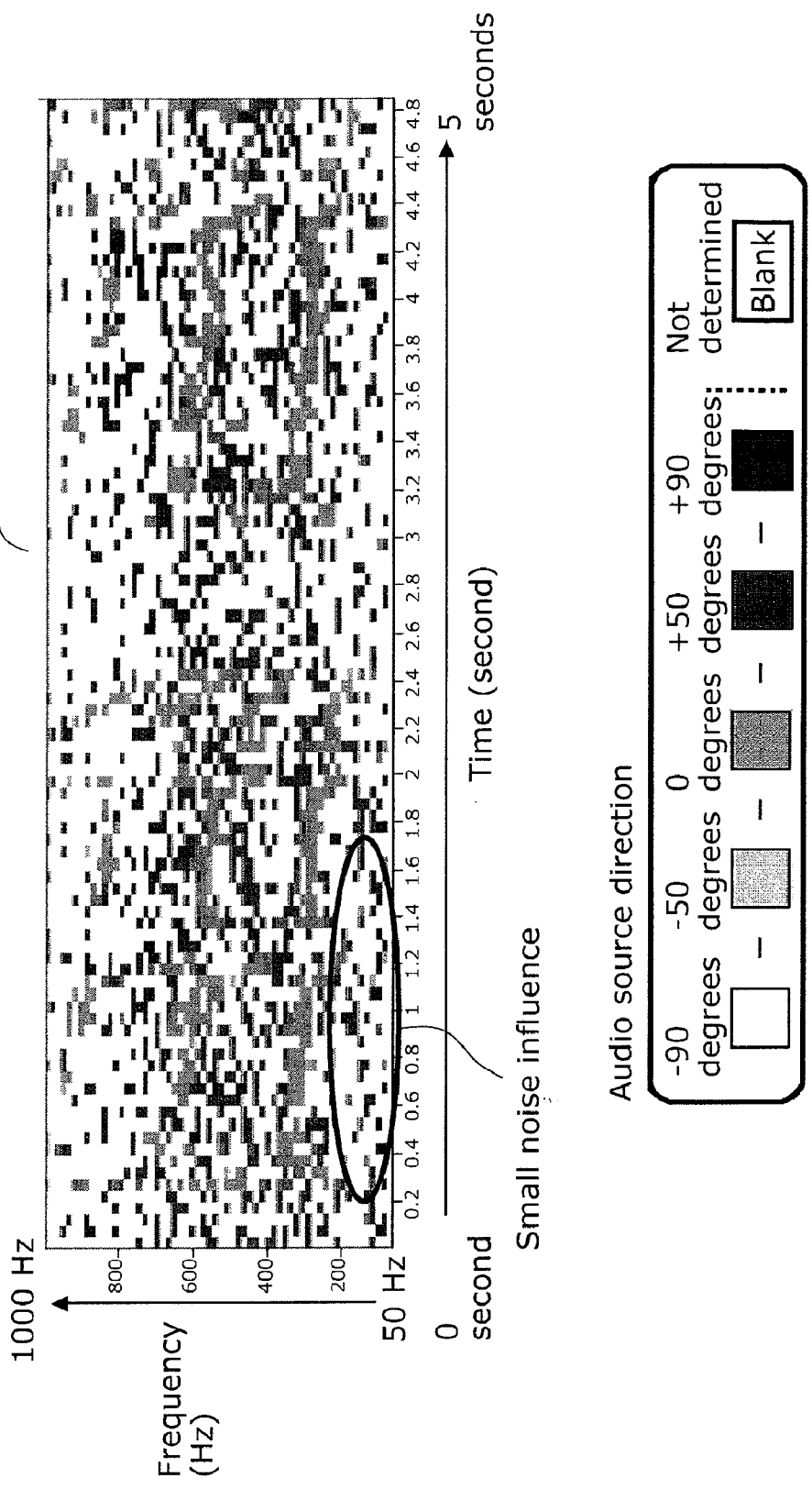
FIG. 29 is a diagram showing an example of the result of an audio source direction determination made by the audio source direction detecting device in the first embodiment of the present invention.

FIG. 29 shows a result of the determination of the audio source direction in this example. The horizontal axis is the time axis (second) and the vertical axis is the frequency axis (Hz). The gray scale represents an audio source direction. The lightest gray represents the direction of −90 degrees, and the darkest gray represent the direction of +90 degrees. The blank portions are portions of which an audio source direction is not determined. The relationship between the audio source directions and the gray scale is shown in the lower part of FIG. 29. The audio source direction shown here is the audio source direction within the frequency range of 50 Hz to 1000 Hz for 0 to 5 seconds.

Figure 30:
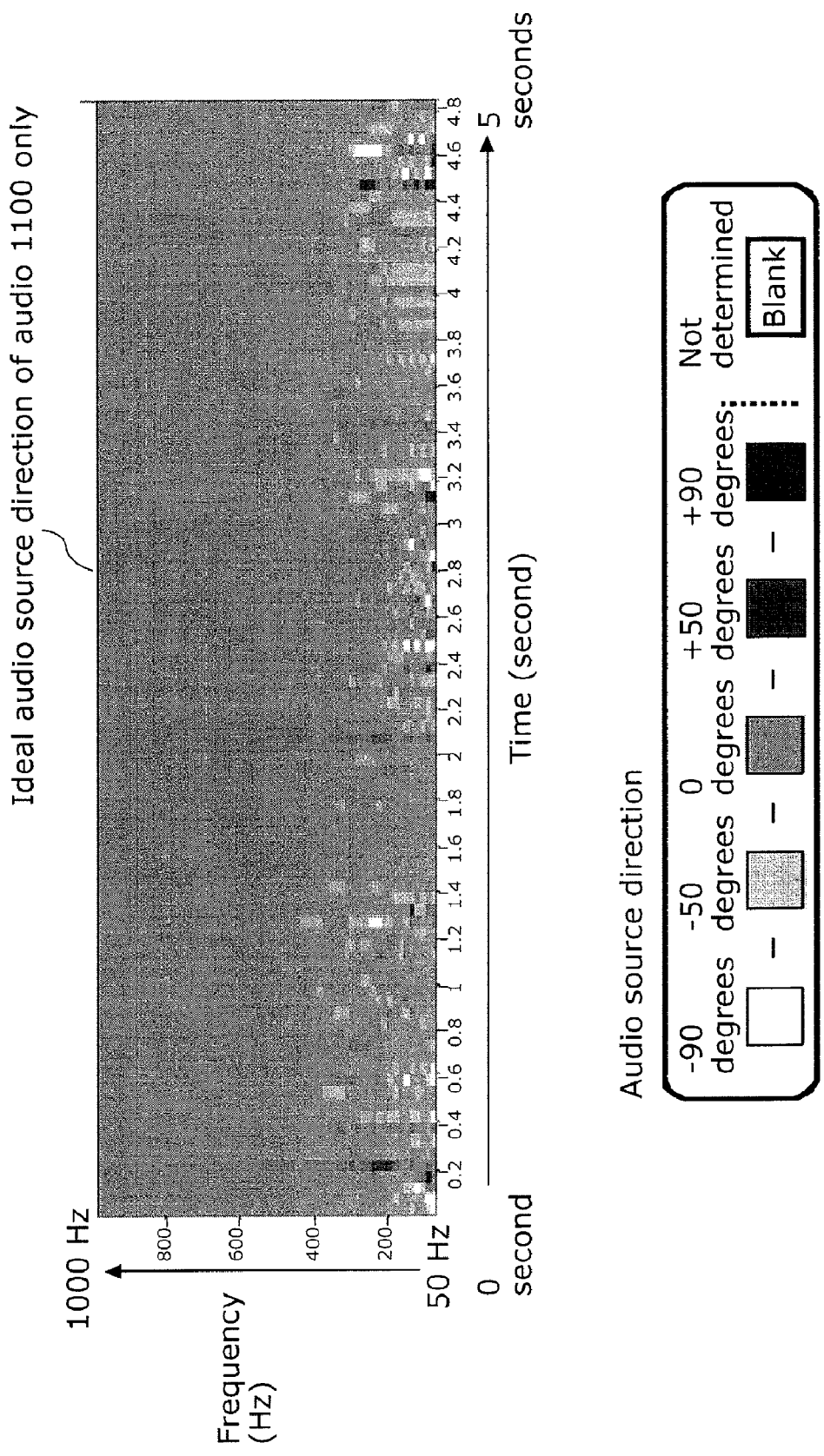
FIG. 30 is a diagram showing an ideal audio source direction of the audio 1100 only.

FIG. 30 shows an ideal audio source direction in the case of inputting and processing only the audio 1100 as the acoustic signal 100. The spectrogram is displayed in the similar manner as FIG. 29, and thus the same descriptions are not repeated here. Comparison of FIG. 30 with FIG. 15 shows that an audio source direction is displayed even in the portions of frequency spectra each having a small amplitude.

Figure 31:
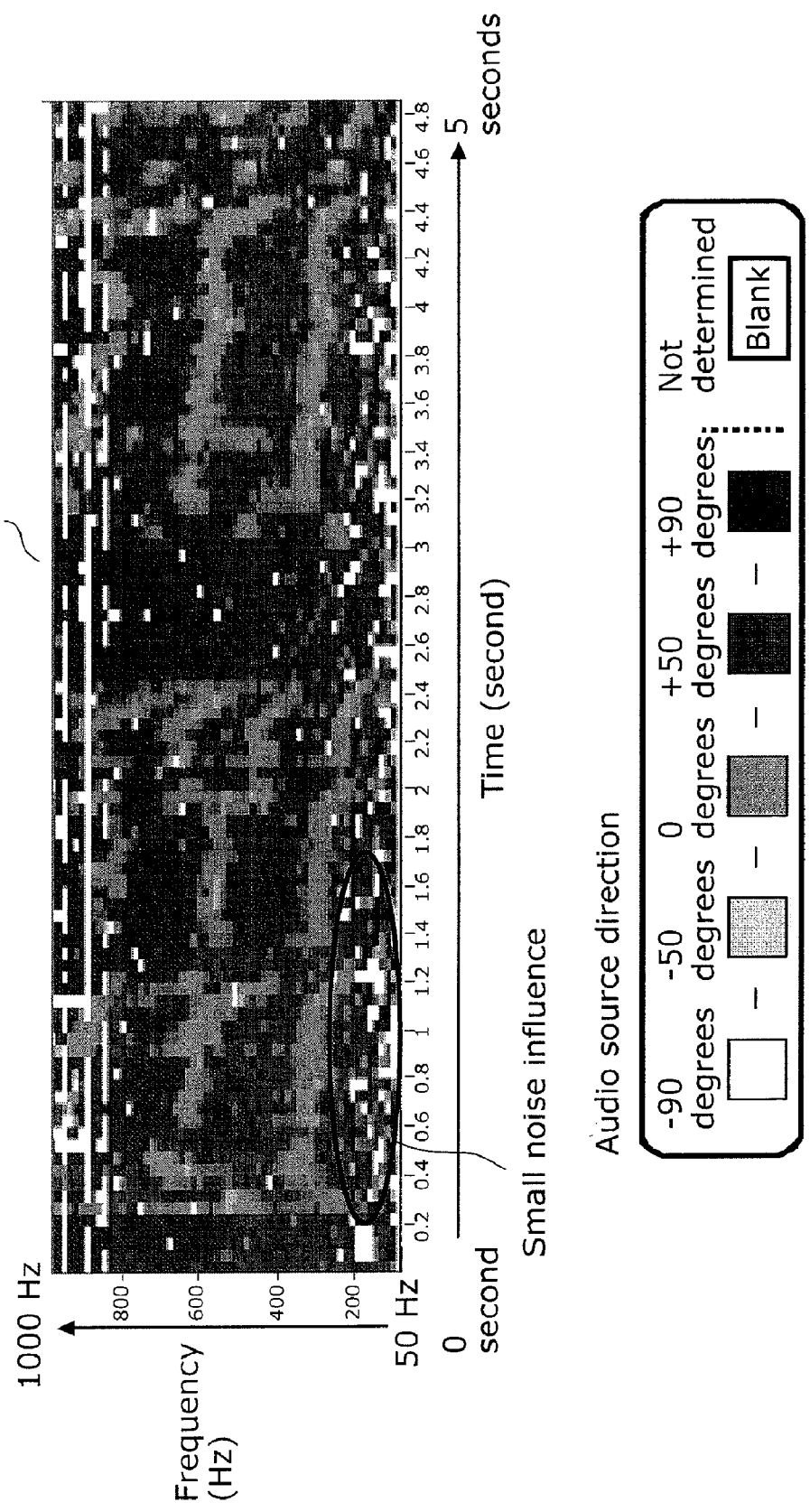
FIG. 31 is a diagram showing the result of an audio source direction determination made in the case of not using a percentage determining unit 500(1,j).

FIG. 31 shows an audio source direction obtained in the direction detecting unit 105 without the percentage determining units 500(1, j) (j=1 to M) and thus not considering the relationship between the percentage and the second threshold value. The frequency spectra are displayed in the similar manner as FIG. 29, and thus the same descriptions are not repeated here. Comparison of FIG. 31 with FIG. 30 shows that a great influence of noises is observed, and thus that a direction different from the actual audio source direction of the audio 1100 is determined.

FIG. 29, FIG. 30, and FIG. 31 show that it is possible to calculate the audio source direction of the audio 1100 by significantly reducing the influence of noise portions considering the relationship between the percentage and the second threshold value using the percentage determining units 500(1, j) (j=1 to M)).

Figure 32:
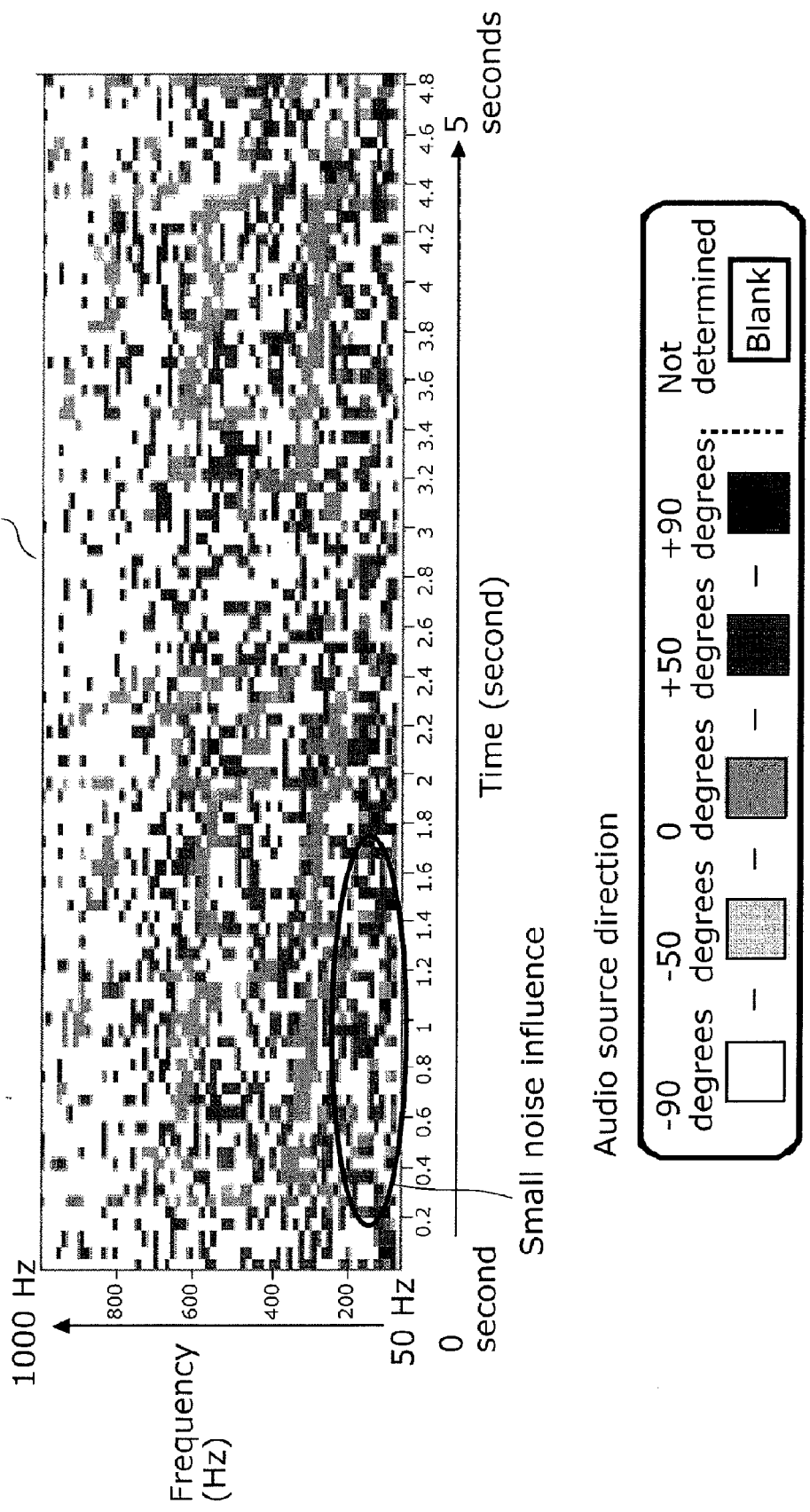
FIG. 32 is a diagram showing an example of the result in the case where the percentage determining unit 500(1,j) determines an audio source direction even when conditions for the percentages of same time-point portions of frequency spectra with respect to a time segment are not satisfied in all the directions.

FIG. 32 shows an audio source direction obtained according to the present invention, without a condition that each of the percentage determining units 500(1, j) (j=1 to M) of the direction detecting units 105 calculates an audio source direction only when the percentage with respect to the cross-correlation value corresponding to each of all the candidate audio source directions is no less than the second threshold value. The audio source direction is displayed in the similar manner as FIG. 29, and thus the same descriptions are not repeated here. Comparison of FIG. 32 with FIG. 31 shows that it is possible to calculate the audio source direction of the audio 1100 by significantly reducing the influence of noise portions considering the relationship between the percentage and the second threshold value using the percentage determining units 500(1, j) (j=1 to M)).

Comparison of FIG. 29 with FIG. 31 shows that it is possible to calculate the audio source direction of the audio 1100 by significantly reducing the influence of noise portions with a condition that each of the percentage determining units 500(1, j) (j=1 to M) of the direction detecting unit 105 calculates an audio source direction only when the percentage with respect to the cross-correlation value corresponding to each of all the audio source directions is no less than the second threshold value (See circled portions in FIG. 29 and FIG. 31).

Figure 33:
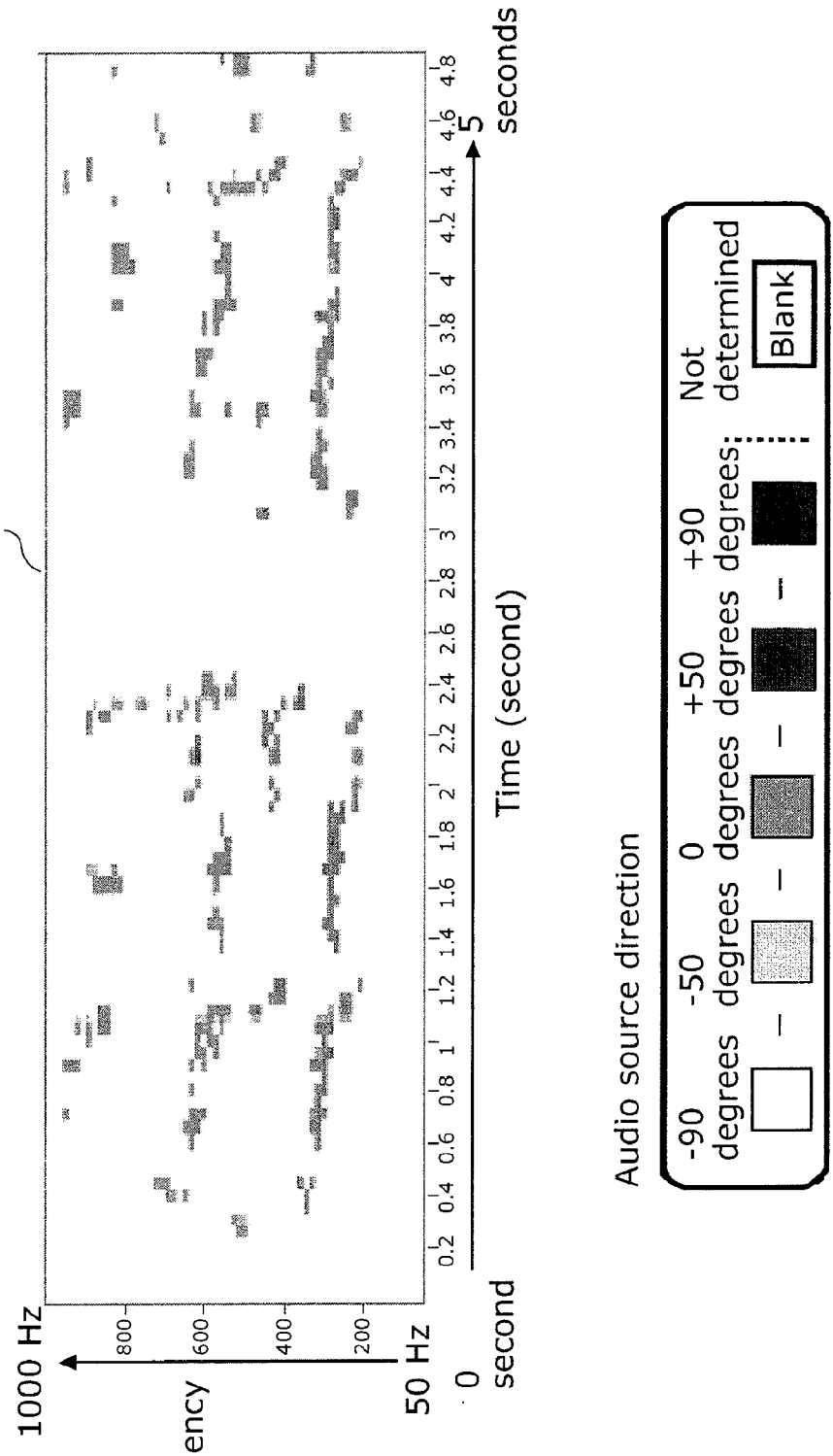
FIG. 33 is a diagram showing an example of the result of determining an audio source direction in the case of optimizing a first threshold value used by detected audio determining units 302(k, j).

FIG. 33 shows an audio source direction in the case where the first threshold value used by the detected audio determining units 302(k, j) of the detected audio determining unit 104(k) is optimized to the value obtained according to Expression 20.

$$A = 10^{11.5} \qquad \text{[Expression 20]}$$

The frequency spectra are displayed in the similar manner as FIG. 29, and thus the same descriptions are not repeated here. FIG. 33 shows that it is possible to calculate an audio source direction of the audio 1100 by further reducing the influence of the noise portions when the first threshold value can be optimized.

Lastly, the direction detecting unit 401 calculates an audio source direction based on the audio source direction calculated by the direction detecting unit 400(1), the audio source direction calculated by the direction detecting unit 400(2), and audio source direction calculated by the direction detecting unit 400(3) (Step S901). At this time, the direction detecting unit 401 calculates and outputs an audio source direction when each of the direction detecting unit 400(1), direction detecting unit 400(2), and direction detecting unit 400(3) calculates an audio source direction. As another method, the direction detecting unit 401 may calculate an audio source direction based on the audio source direction calculated by at least one of the direction detecting units 400(1) to 400(3). In addition, the direction detecting unit 401 may calculate an audio source direction based on the audio source direction calculated by at least one of the direction detecting units 400(1) to 400(3) even in the case where all the audio source directions have not been calculated.

Figure 34:
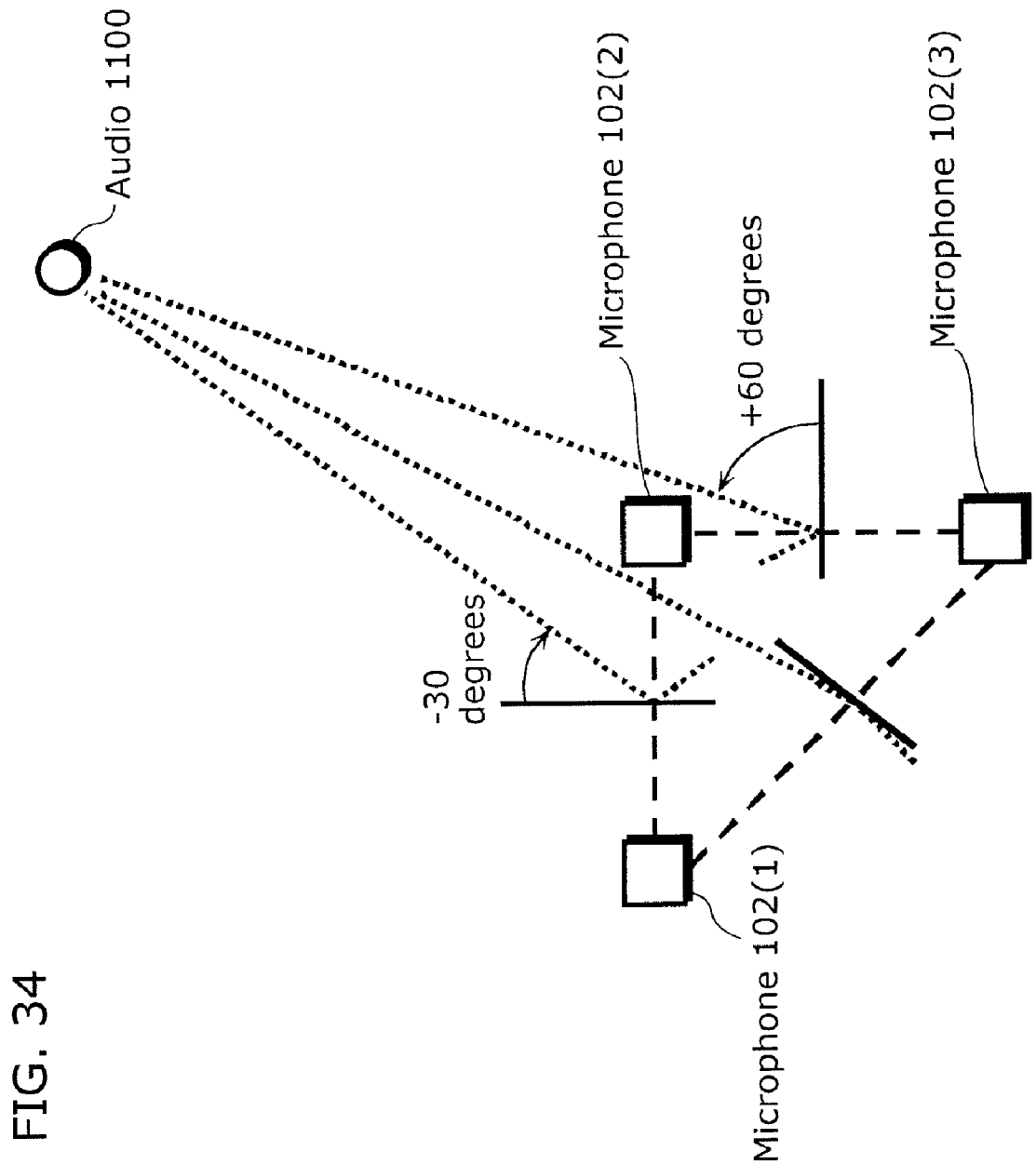
FIG. 34 is a diagram illustrating an exemplary method for determining an audio source direction, based on the candidate audio source directions determined by all the respective possible pairs of the microphones.

FIG. 34 shows an exemplary method for calculating an audio source direction based on the audio source direction calculated by the direction detecting unit 400(1), the audio source direction calculated by the direction detecting unit 400(2), and the audio source direction calculated by the direction detecting unit 400(3). The audio source direction can be calculated based on these determined audio source directions, and the arrangement of the microphone 102(1), microphone 102(2), and microphone 102(3).

With this structure, the direction detecting unit 105 can prevent determination of an erroneous audio source location due to influence of noises by excluding, from candidate audio source locations of the detected audio, the audio source locations that yield percentages of the time-point portions less than a predetermined threshold value. Here, the time-point portions are present at the same time points of frequency spectra and determined by the detected audio determining units of the audios received by the respective microphones in the time segment used to calculate arrival time differences in frequency signals which have been received by the respective microphones and of which the time axes have been adjusted.

In addition, it is possible to prevent determination of another erroneous audio source location from among the candidates even when one of audio source locations of which arrival time differences cannot be calculated due to influence of noises is the audio source direction of the detected audio by means that each of the percentage determining units 500(1, *j*) does not determine the audio source of the detected audio when one of the percentages of all the candidates is less than the predetermined threshold value.

In addition, the detected audio determining unit 104(*k*) determines an audio source direction by removing noise portions with distorted phase components. This makes it possible to determine an accurate audio source direction after removing the noise portions distorted due to the white noises such as background noises and the mixed audio.

In addition, the sum of degrees of similarity is calculated using the frequency spectra at time points of the time interval 1/f that prevent time-dependent phase shifts in determination of the time-point portions of the detected audio. This provides an advantageous effect of reducing calculation amount without necessity of modifying phase shifts. Here, a description is given of "time-dependent phase shifts". As described with reference to FIG. 7A, it is assumed that the phases of the frequency spectra having a frequency f of the acoustic signal as an extraction target rotate by 360 degrees per time interval 1/f at a constant velocity. Thus, the phase shifts as time shifts. This phenomenon is called "time-dependent phase shifts". Since the phases return per time interval 1/f, it can be considered that the frequency spectra of the acoustic signal at the time points of the time interval 1/f have the same phase. Therefore, it becomes unnecessary to modify phase shifts.

In addition, cross-correlation values are used as the degrees of similarity in determination of time-point portions of the detected audio. This makes it possible to make a determination on a phase shift without focusing on a difference in magnitude of frequency spectra. This provides an advantageous effect of determining noise portions with distorted phase components in the case of an acoustic signal including frequency spectra each having a small amplitude. In addition, the audio source direction is in conformity with the cross-correlation values in the direction detecting unit.

The concept relating to a determination of noise portions according to the present invention is based on an idea that noise portions distorted due to the white noises such as background noises or a mixed audio contain distorted phase components, and thus the sum S of degrees of similarity is less than the first threshold value A.

As a method for determining time-point portions of frequency spectra of detected audios of which an audio source direction is calculated, the detected audio determining unit may determine time-point portions having an SN ratio of 0 dB or more as the time-point portions of the detected audios (the SN ratio is a ratio between the power of the frequency spectra of the detected audios (S), and the power of the frequency spectra of the noises (N), and the power of the frequency spectra of the detected audios≧the power of frequency spectra of the noises). In addition, it is also good that time-point portions of the detected audios are determined by obtaining a probability distribution of inputted detected audios and a probability distribution of noises from data for learning, and performing the Bayes Estimation.

In this example, a time segment used to calculate an audio source direction is determined after a determination of time-point portions of the frequency spectra of the detected audios of which an audio source direction is calculated. However, it is also good to determine a time segment used to calculate an audio source direction first, and to determine time-point portions of the frequency spectra of the detected audios of which an audio source direction is calculated in the time segment.

In this embodiment, three FFT analysis units and three detected audio determining units are prepared for the respective three microphones. However, it is also good that each of these microphones processes an inputted acoustic signal using a single shared FFT analysis unit and detected audio determining unit.

In this embodiment, audio source directions are determined for each of the time points and frequency bands. However, it is also good to determine an audio source direction by preparing a histogram of audio source directions in the time-axis direction and takes the local maximum value. Further, it is also good to determine an audio source direction by averaging the audio source directions in the time-axis direction.

In this embodiment, audio source directions are determined for each of the time points and frequency bands. However, it is also good to determine an audio source direction by preparing a histogram of audio source directions in the frequency-axis direction and takes the local maximum value. Further, it is also good to determine an audio source direction by averaging the audio source directions in the frequency-axis direction.

Further, the number of microphones are three in this embodiment, but the number may be any as long as it is no less than 2.

In addition, it is also good to use DFT (discrete Fourier transform), cosine transform, wavelet transform, or band-pass filters, instead of FFT performed by the FFT analysis units.

In the processing using the frequency f performed by each of the detected audio determining units 104(*k*, *j*), the frequency spectra of all the time points of the time interval 1/f are determined. However, it is also good to determine frequency spectra by determining arbitrary time points among the time points of the time interval 1/f. In addition, it is also good to change methods for determining frequency spectra for each of the analysis time points.

The detected audio determining unit 104(*k*) determines an audio source direction by removing noises in the frequency spectra in all the (M) frequency bands calculated by the FFT analysis unit 103(*k*). However, it is also good to determine an audio source direction by selecting some of the frequency bands and removing noises in the selected frequency bands.

The FFT analysis units may calculate the frequency spectra from the acoustic signal on which a time window having a width of ΔT is applied. The detected audio determining unit may determine time-point portions of the detected audio based on the sum of degrees of similarity between the frequency spectra of the time point as the analysis target and the frequency spectra of the nearby time-point portions including plural time points apart from each other by more than the time interval ΔT. With this structure, it is possible to remove noises (distortions) due to frequency leakage of surrounding frequencies due to influence of fine segmentation of a temporal resolution (ΔT) using the sum of degrees of similarity with the frequency spectra at the nearby plural time points including the time points apart by more than the time interval ΔT (which is the width of the time window used to calculate the frequency spectra).

Figure 35:
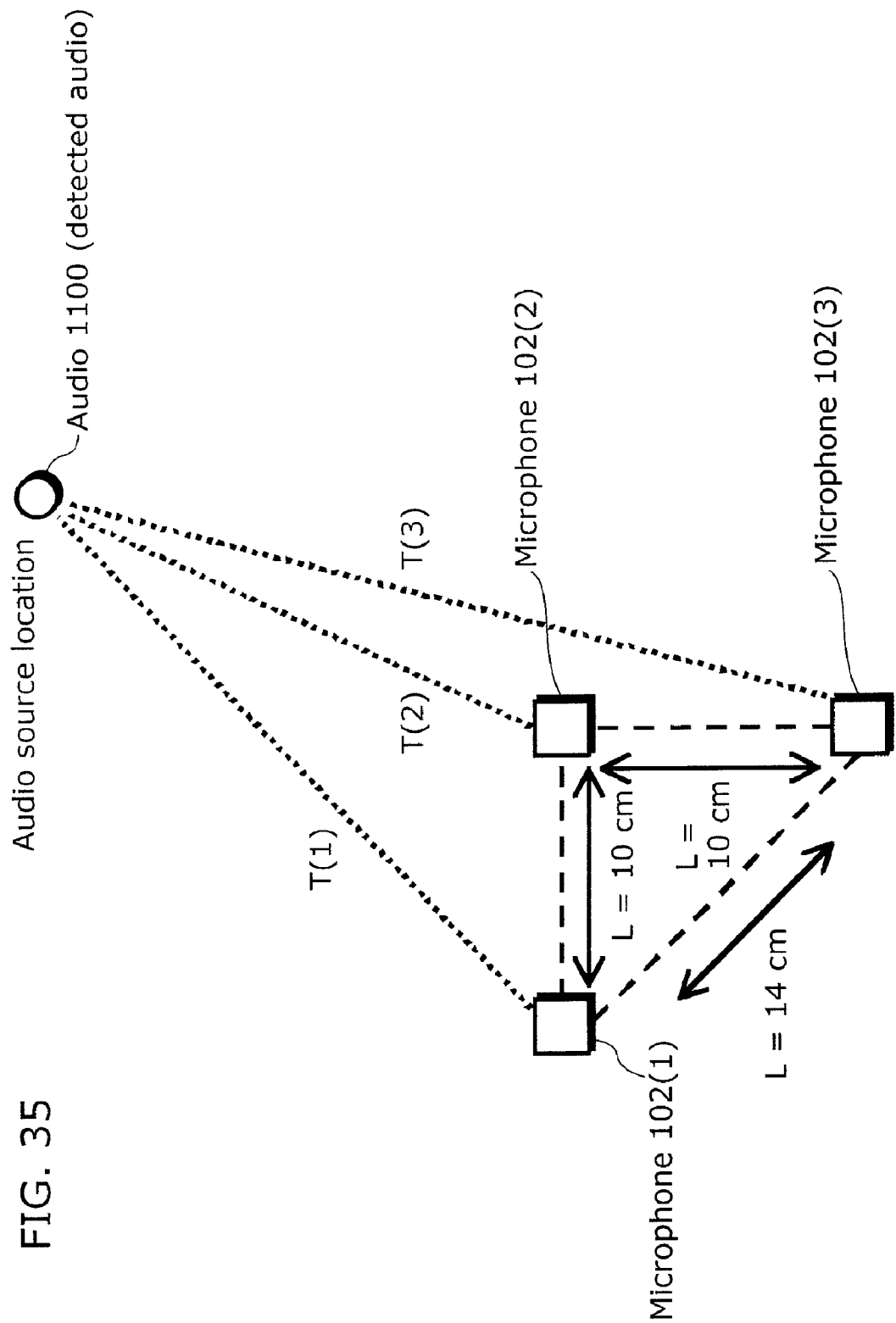
FIG. 35 is a diagram illustrating an exemplary method for calculating an audio source location using three microphones.
Figure 36:
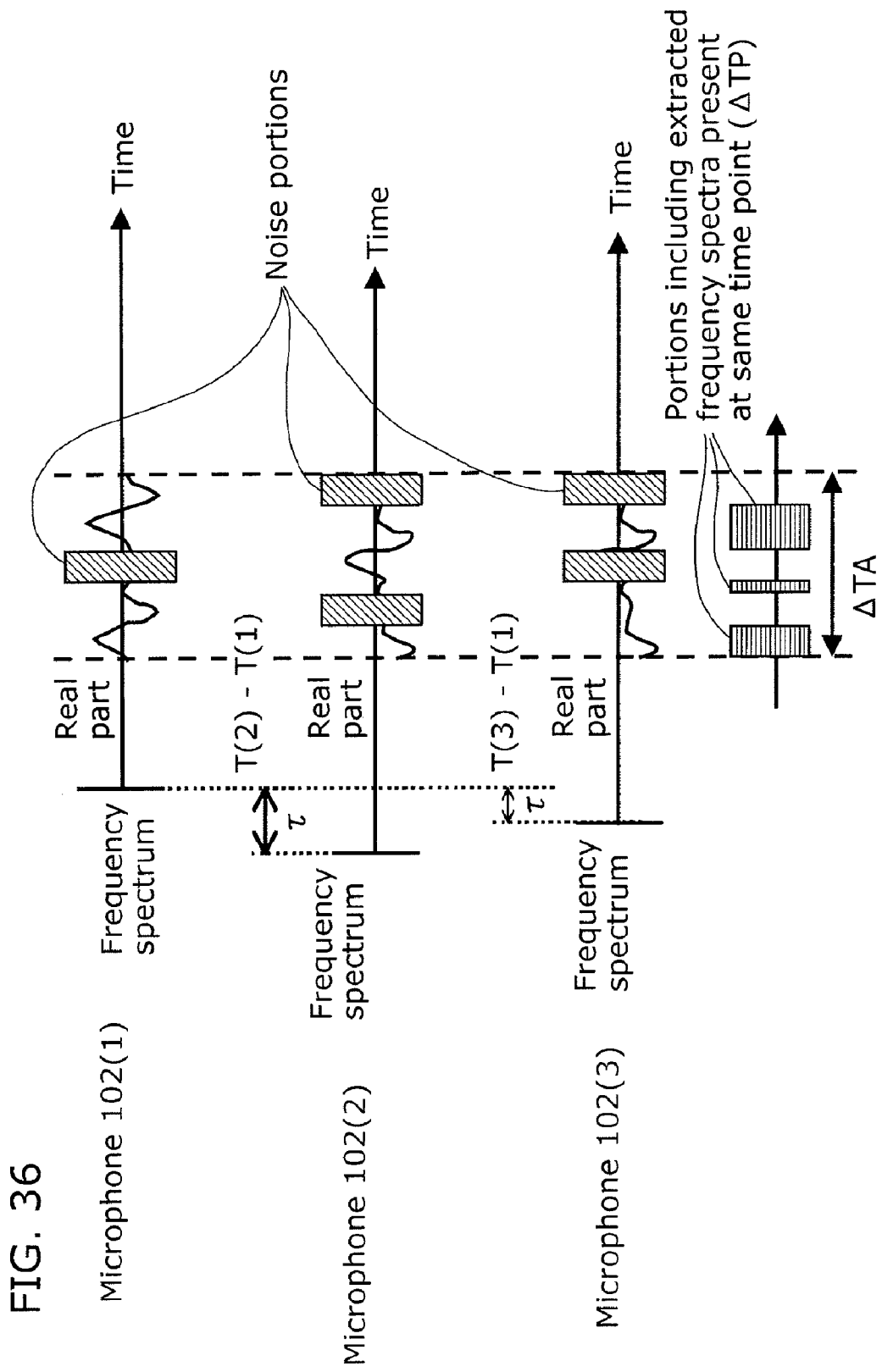
FIG. 36 is a diagram illustrating an exemplary method for calculating percentages of same time-point portions of frequency spectra with respect to a time segment using the three microphones.

In this example, an audio source location is calculated in the three audio source directions based on the three possible pairs of the three microphones, but an audio source location may be calculated using the combination of the three microphones. FIG. 35 shows a method for calculating an audio source location using the three microphones. Arrival time points (time points T(1) to T(3)) of the audio 1100 (detected audio) at the microphone 102(1) to microphone 102(3) vary depending on the audio source location. For this, it is possible to calculate the audio source location based on (i) each of the possible arrival time differences between T(1), T(2), and T(3) and (ii) each of the possible positional relationships between T(1), T(2), and T(3). FIG. 36 shows calculation of the percentages in this example. The display method is similar to that of FIG. 26, and thus the same descriptions are not repeated. It is to be noted that a result of adding all the arrival time differences between these three microphones is shown here. In addition, only the real parts of the frequency spectra are displayed. As shown in FIG. 36, the percentage is calculated by shifting the time axes with respect to the audio source location by the corresponding ones of the arrival time differences. The audio source locations that yield a percentage (obtained by (ΔTP/ΔTA)×100%) smaller than the second threshold are excluded from candidate audio source locations of the detected audios. Further, it is also good not to determine any candidate audio source locations of the detected audios when one of the percentages of all the candidate audio source locations is less than the predetermined threshold value.

The following describes a variation of the audio source direction detecting device shown in the first embodiment.

The audio source direction detecting device according to this variation has the same structure as the audio source direction detecting device according to the first embodiment described with reference to FIG. 2 to FIG. 6. However, the detected audio determining units 104(k) (k=1 to 3) executes different processing here.

Each of the detected audio determining units 104(k) (k=1 to 3) determines time-point portions of frequency spectra calculated by a corresponding one of the FFT analysis units 103(k) (having the above-mentioned value) of detected audios using detected audio determining units 104(k, j) (k=1 to 3, j=1 to M) for each of the frequency bands j (j=1 to M). The following describes a case where the j-th frequency band is f (for example, the center frequency is f).

Each of the detected audio determining units 104(k, j) calculates a space of degrees of similarity by generating a histogram of phase components of frequency spectra at plural time points selected from among time points of the time interval 1/f. Each of the detected audio determining units 104(k, j) determines, as frequency spectra of the detected audio, a group of frequency spectra having a degree of similarity equal to or greater than a threshold value.

A degree-of-similarity calculating units 301(k, j) calculates a space of degrees of similarity by generating a histogram of phase components of the frequency spectra determined by the frequency spectrum determining units 300(k, j). A detected audio determining units 302(k, j) determines, as time-point portions of the detected audio, time points of the frequency spectra that yield a degree of similarity equal to or greater than the threshold value in the space of degrees of similarity calculated by the degree-of-similarity calculating units 301(k, j).

The following describes operations performed by the audio source direction detecting device 101 structured like this. Procedures of operations performed by the audio source direction detecting device 101 are the same as those in the first embodiment, and indicated in the flowcharts in FIG. 8 to FIG. 12.

The following describes only processing executed by the detected audio determining units 104(k) (k=1 to 3) in the audio source direction detecting device 101. Processing executed by the other processing units is the same as in the first embodiment, and thus the same descriptions are not repeated.

Each of the detected audio determining units 104(k) (k=1 to 3) causes detected audio determining units 104(k, j) (k=1 to 3, j=1 to M) to determine, for each of the frequency bands j (j=1 to M), time-point portions of frequency spectra calculated by a corresponding one of the FFT analysis units 103(k) (having the above-mentioned value) of the detected audio (Step S601(k), Step S601(k, j) (k=1 to 3, j=1 to M). The following descriptions are given of j-th frequency band only. In this example, the frequency of the j-th frequency band is f.

Each of the detected audio determining units 104(k, j) calculates a space of degrees of similarity by generating a histogram of phase components of frequency spectra at plural time points selected from among time points of the time interval 1/f. Each of the detected audio determining units 104(k, j) determines, as frequency spectra of the detected audio, a group of frequency spectra having a degree of similarity equal to or greater than a threshold value (Step S601(K, j)).

Each of the degree-of-similarity calculating units 301(k, j) calculates a space of degrees of similarity by generating a histogram of phase components of frequency spectra determined by a corresponding one of the frequency spectrum determining units 300(k, j) (Step S801(k, j)). The following describes a method for calculating a space of degrees of similarity.

It is assumed that the frequency spectra determined by the frequency spectrum determining units 300(k, j) are represented by Expression 1 and Expression 2. Here, the phase components are extracted using Expressions 21.

$$\theta_k = \arctan(y_k/x_k) \ (k=-K, \ldots, -2, -1, 0, 1, 2, \ldots, K)$$ [Expression 21]

Figure 37:
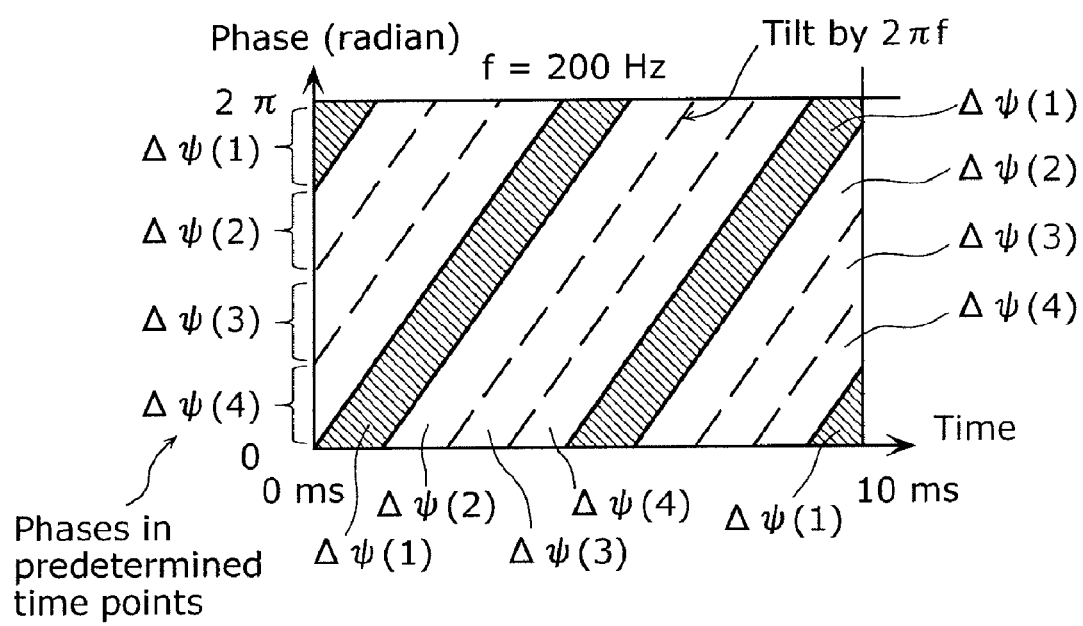
FIG. 37 is a diagram illustrating an exemplary method for generating a histogram of phase components of segmented frequency spectra.

FIG. 37 shows an example of a method for generating a histogram of phase components of frequency spectra. Here, assuming that phase segments are Δψ(i) (i=1 to 4), the histogram is generated by calculating the numbers of times of appearance of frequency spectra in a predetermined time width in frequency bands of which phases tilt by 2πf with respect to time. The shaded portions in FIG. 37 are Δψ(i) areas. Since phases are represented within 0 to 2π, these areas are apart from each other. Here, it is possible to generate a histogram by counting the number of the frequency spectra in the respective areas of Δψ(i) (i=1 to 4) included in the areas.

Figure 38A:
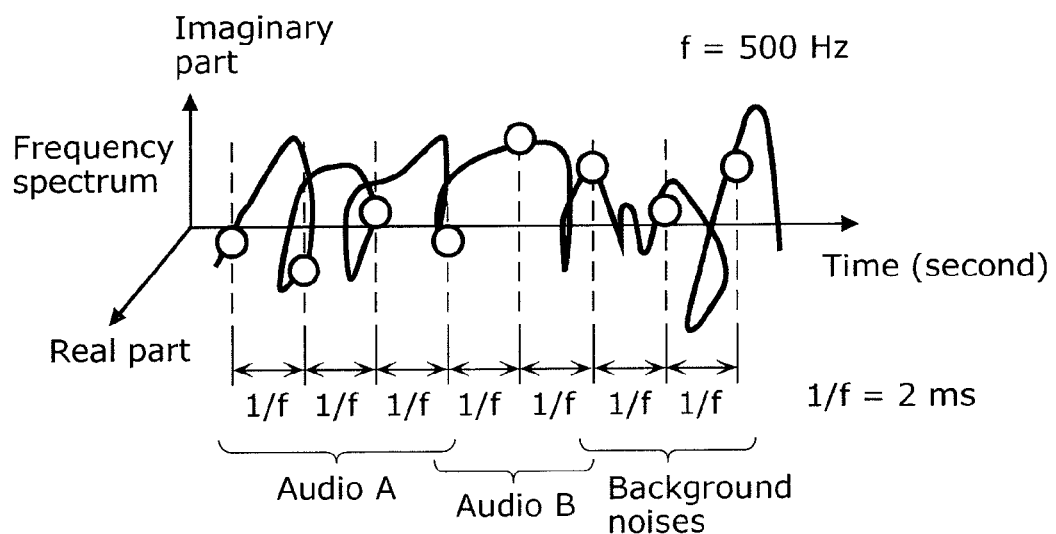
FIG. 38A is a diagram illustrating an example of frequency spectra determined by a frequency spectrum determining unit 300(k, j).
Figure 38B:
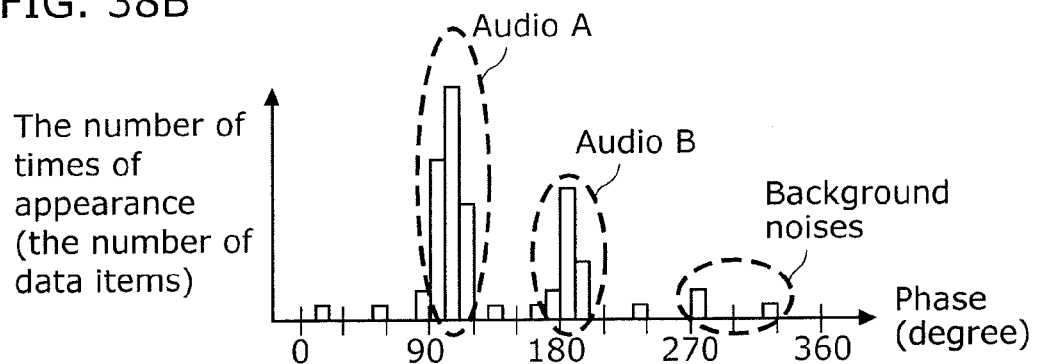
FIG. 38B is a diagram showing an example of a histogram of the phase components of the frequency spectra determined by the frequency spectrum determining unit 300(k, j).

FIG. 38A shows an example of frequency spectra determined by the frequency spectrum determining units 300(k, j). FIG. 38B shows an exemplary histogram of phase components of the determined frequency spectra.

FIG. 38A shows the determined frequency spectra. The display method of FIG. 38A is the same as that of FIG. 16(b), and thus the same descriptions are not repeated. In this example, the determined frequency spectra includes frequency spectra of an audio A (corresponding to a detected audio), an audio B (corresponding to a detected audio), and background audios (corresponding to noises).

FIG. 38B schematically shows an exemplary histogram of phase components of the frequency spectra. The group of frequency spectra of the audio A has similar phases (around 100 degrees in this example). The group of frequency spectra of the audio B has similar phases (around 190 degrees in this example). Thus, the histogram shows a peak around 100 degrees and a peak around 190 degrees. In addition, the frequency spectra of each of the background audios have different phases, and thus no peak representing the background audio is shown in the histogram.

Lastly, each of the detected audio determining units 302(*k, j*) determines, as frequency spectra of the detected audio, the group of frequency spectra that yields a degree of similarity equal to or greater than the threshold value in the space (histogram) of degrees of similarity calculated by the corresponding one of the degree-of-similarity calculating units 301(*k, j*) (Step S802(*k, j*)).

Figure 39:
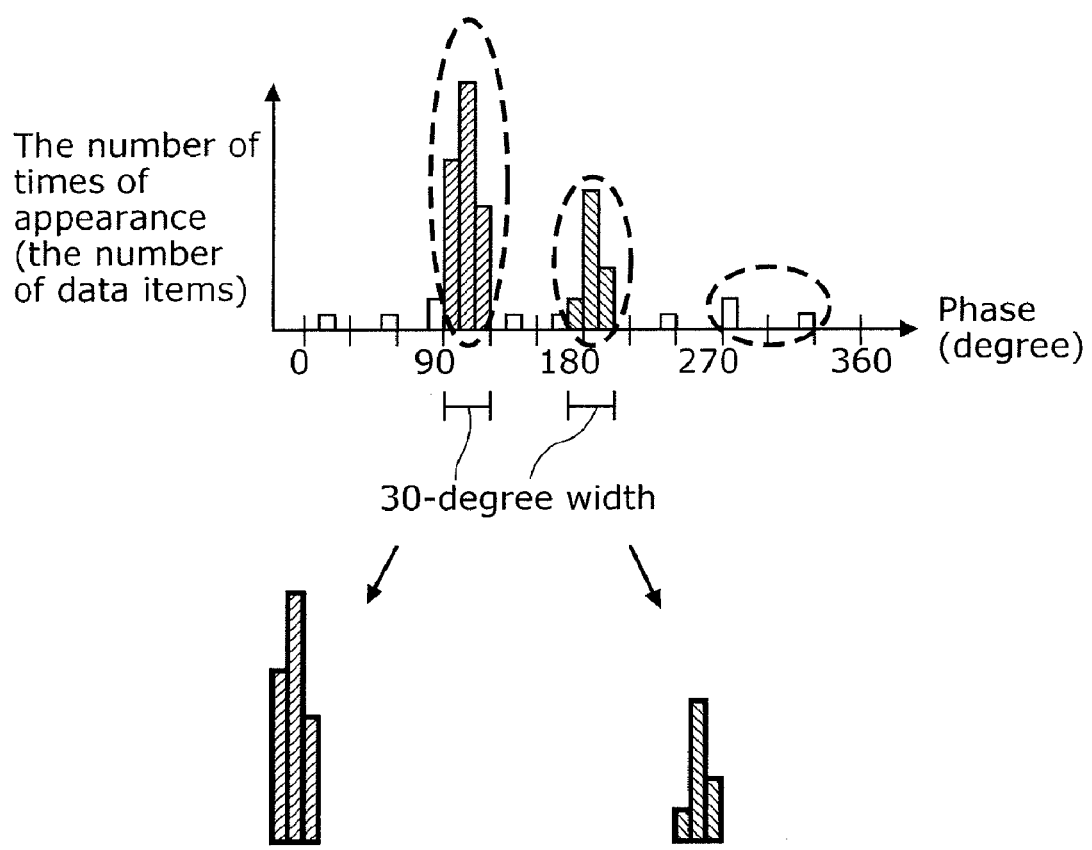
FIG. 39 is a diagram showing an exemplary method for determining a group of frequency spectra each having a degree of similarity equal to or greater than a threshold value in a space of degrees of similarity.

FIG. 39 shows an exemplary method for determining, as frequency spectra of the detected audio, a group of frequency spectra that yield a degree of similarity equal to or greater than the threshold value in the space of degrees of similarity. The display method of FIG. 39 is the same as that of FIG. 38B, the same descriptions are not repeated. In the histogram of FIG. 39, the group of frequency spectra that yields a degree of similarity equal to or greater than the threshold value (the frequency spectra of which phase differences are within 30 degrees in this example) is determined as the frequency spectra of the detected audio. In this example, the group of frequency spectra having a phase around 100 degrees and the group of frequency spectra having a phase around 190 degrees are determined as the frequency spectra of the detected audio. These groups correspond to the audio A and the audio B, respectively. Since the frequency spectra of background audios have different phases, the degrees of similarity are less than the threshold value.

In this way, it is possible to separately extract the audio A and the audio B by removing the background audios even when plural groups of frequency spectra having different phases such as the audio A and the audio B are included.

With the structure, it is possible to calculate a space of degrees of similarity by generating a histogram of phase components of frequency spectra, and determine, as frequency spectra of the detected audio, the group of frequency spectra that yields a degree of similarity equal to or greater than the threshold value. This provides an advantageous effect of separating the audio A and the audio B by removing the background audios even when plural groups of frequency spectra having different phases such as the audio A and the audio B are included, and determining the frequency spectra of the detected audio. In other words, as described in the first embodiment, in the exemplary case where the frequency spectra of the audio A and the audio B are mixed in time durations having a time width of 20 msec which is an analysis target, calculation of degrees of similarity yields small degrees of similarity which may be associated with noises. This occurs because a judgment on whether or not a current audio is a noise is made based on portions of the audios. However, the method is intended to make a judgment using a histogram of phase components of frequency spectra, instead of making a judgment based on such portions. For this, it is possible to determine, as frequency spectra of the detected audio, the frequency spectra of the audio A and the audio B even in the same situation. Therefore, it is possible to accurately determine an audio source direction.

Second Embodiment

Next, a description is given of an audio source direction detecting device according to a second embodiment. Unlike the audio source direction detecting device according to the first embodiment, the audio source direction detecting device according to the second embodiment modifies phase components of frequency spectra of acoustic signals, and determines an audio source direction using the frequency spectra with modified phases.

Figure 40:
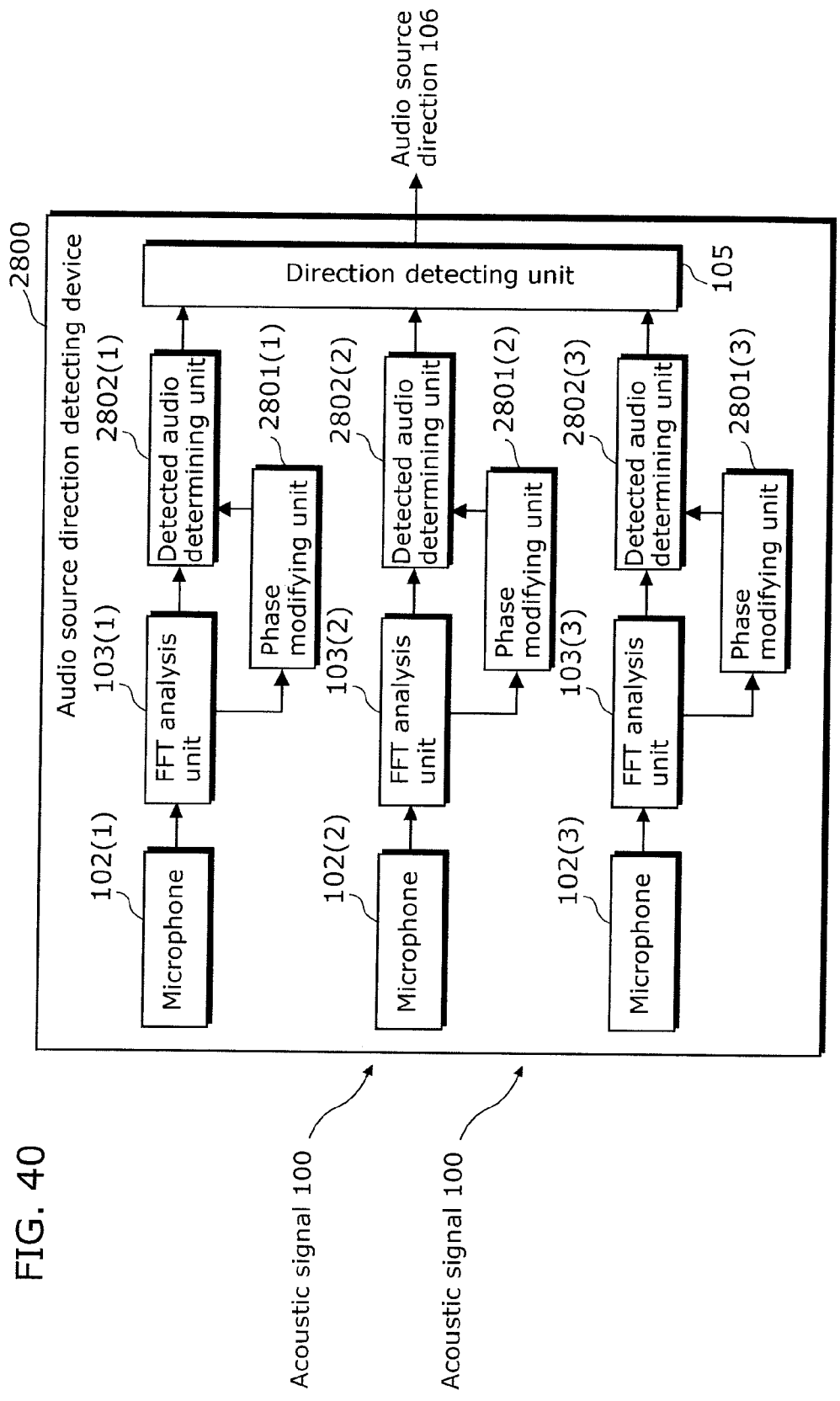
FIG. 40 is a block diagram showing the overall structure of the audio source direction detecting device in a second embodiment of the present invention.
Figure 41:
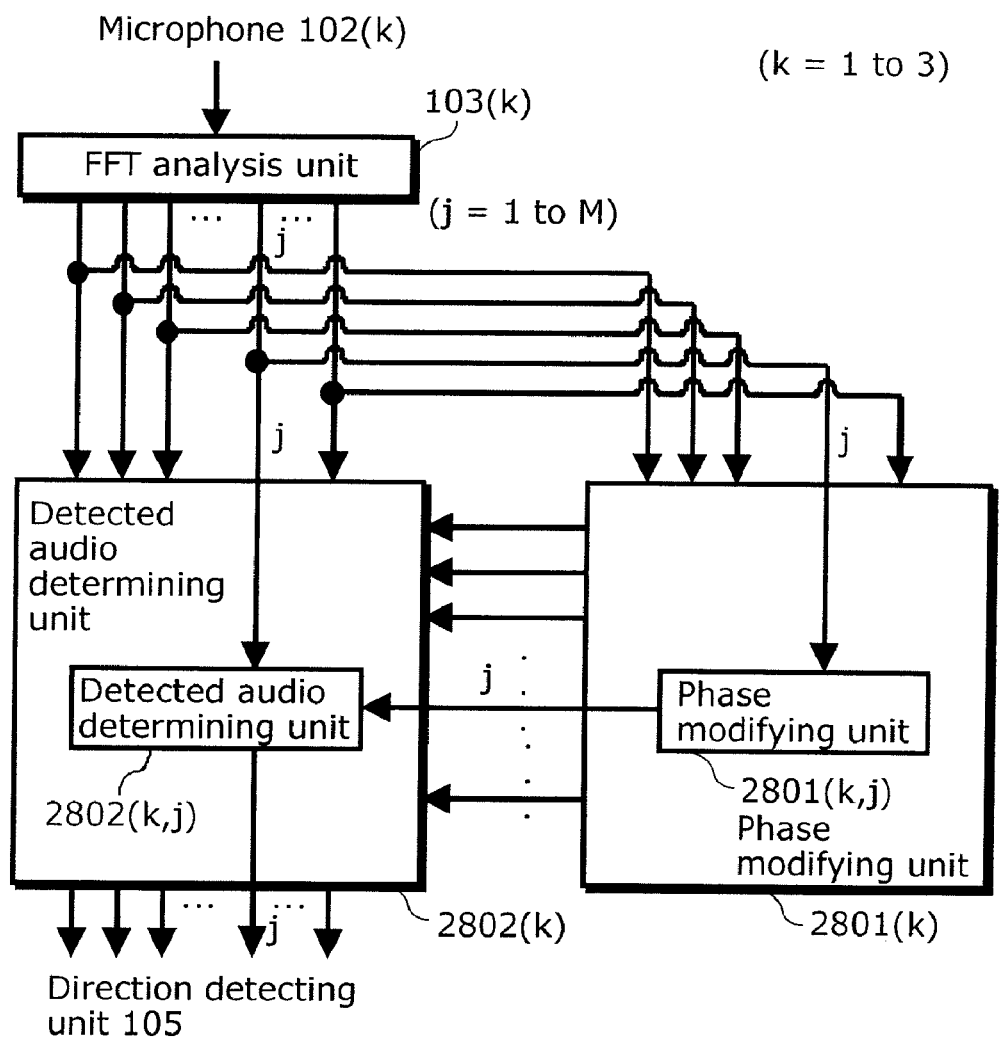
FIG. 41 is a block diagram showing a phase modifying unit 2801(k) and a detected audio determining unit 2802(k) in the audio source direction detecting device in the second embodiment of the present invention.
Figure 42:
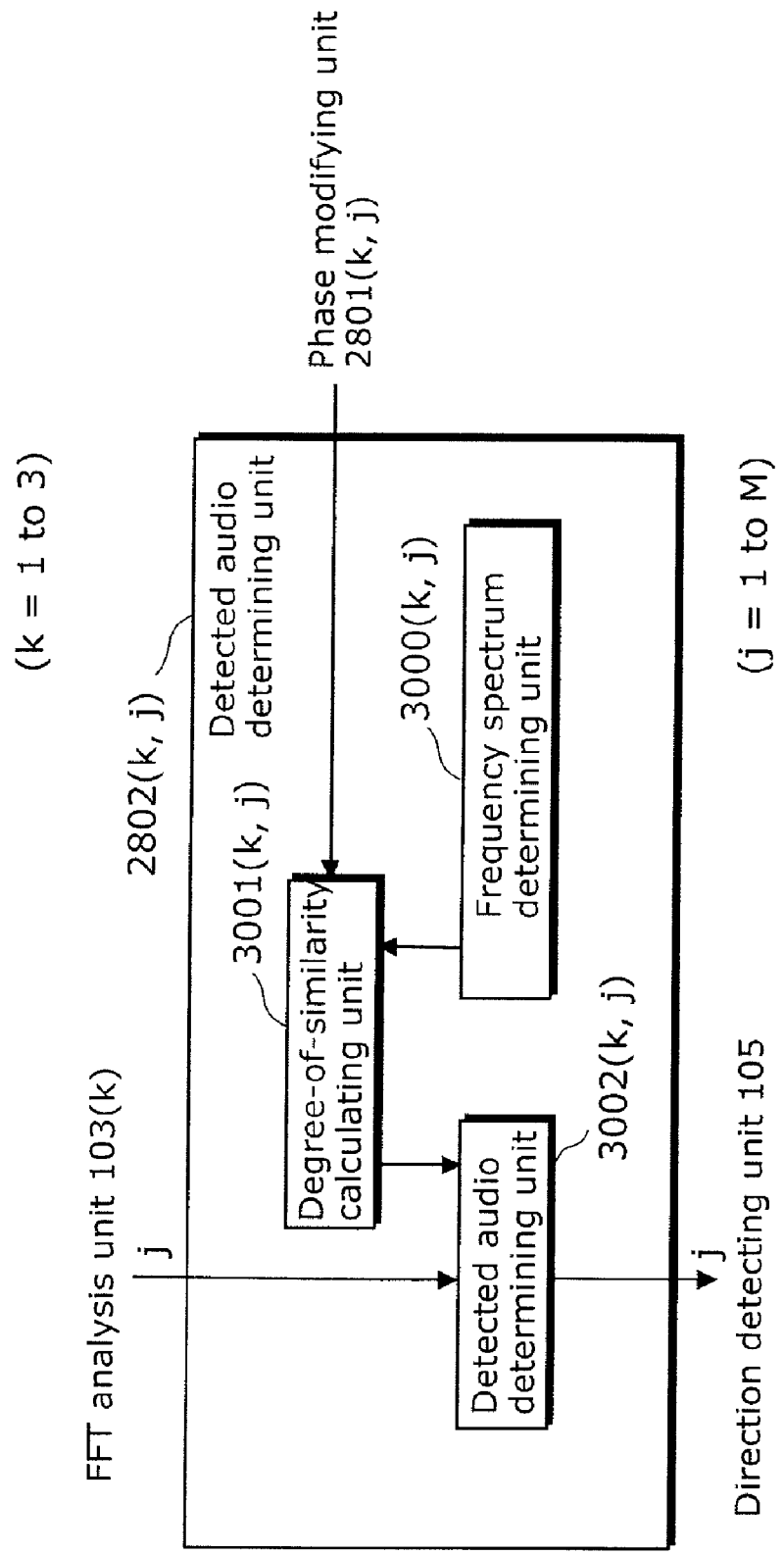
FIG. 42 is a block diagram showing a detected audio determining unit 2802(k, j) of the audio source direction detecting device in the second embodiment of the present invention.

Each of FIG. 40 to FIG. 42 is a block diagram showing the structure of the audio source direction detecting device in the second embodiment of the present invention. The same structural elements as those in FIG. 2 are assigned with the same numerical references as those in FIG. 2, and the same descriptions are not repeated.

In FIG. 40, an audio source direction detecting device 2800 is structured with three microphones 102(*k*) (k=1 to 3), three FFT analysis units 103(*k*) (k=1 to 3) (corresponding to analysis units) associated with the respective microphones, three phase modifying units 2801(*k*) (k=1 to 3) associated with the respective microphones, three detected audio determining units 2802(*k*) (k=1 to 3) (corresponding to the detected audio determining units) associated with the respective microphones, and a direction detecting unit 105 (corresponding to the detecting unit).

Each of the microphones 102(*k*) (k=1 to 3) receives an input of an acoustic signal 100.

Each of the FFT analysis units 103(*k*) (k=1 to 3) executes fast Fourier transform on the acoustic signal 100 inputted through the corresponding one of the microphones (having the above-mentioned value) to calculate a frequency spectrum (corresponding to a frequency signal) including phase components of the acoustic signal 100. Hereinafter, it is assumed that the number of frequency bands of the frequency spectra obtained by the FFT analysis units 103(*k*) (k=1 to 3) is M, and that the numbers specifying the corresponding ones of these frequency bands are represented as symbols j (j=1 to M). The following describes a case where the j-th frequency band is f (for example, the center frequency is f). Processing here is the same as in the first embodiment.

Each of the phase modifying units 2801(*k*) (k=1 to 3) causes the phase modifying units 2801(*k, j*) (K=1 to 3, j=1 to M) to modify, for each of frequency bands j (k=1 to M), time-dependent phase shifts of frequency spectra at plural time points in the frequency spectra calculated by the corresponding one of the FFT analysis units 103(*k*) (having the above-mentioned value) on condition that the phases rotates by 360 degrees per time interval 1/f at a constant velocity (See FIG. 41). In other words, a phase ψ(t) (radian) of a frequency spectrum at time t is modified to a phase ψ(t)−(2πft).

Each of the detected audio determining units 2802(*k*) (k=1 to 3) causes the detected audio determining units 2802(*k, j*) (k=1 to 3, j=1 to M) to calculate, for each of the frequency bands j (j=1 to M), the sum of degrees of similarity between the frequency spectrum having a modified phase at the time point as an analysis target and frequency spectra having modified phases at time points different from the target time point, based on the frequency spectra calculated by the corresponding one of the FFT analysis units 103(*k*) (having the above-mentioned value) and the frequency spectra having phases modified by the corresponding one of the FFT analysis units 103(*k*) (having the above-mentioned value). In addition, each of the detected audio determining units 2802(*k*) (k=1 to 3) calculates a time point as an analysis target that yields the sum of degrees of similarity equal to or greater than the first threshold value. The detected audio determining units 2802 (*k*) (k=1 to 3) removes noises by determining, as frequency spectra of detected audio, the frequency spectra calculated by the FFT analysis units 103(*k*) at time points that yield the sum of degrees of similarity equal to or greater than the first threshold value (See FIG. 41).

The direction detecting unit 105 calculates the degrees of similarity (values of cross-correlation) between the time-point portions, which are present at the same time points of the respective frequency spectra, determined in association with all the possible pairs of the three microphones (microphone 102(1) and microphone 102(2), microphone 102(2) and microphone 102(3), and microphone 102(1) and microphone 102(3)) based on the frequency spectra of the detected audios determined by the detected audio determining units 2802(k) (k=1 to 3)). The direction detecting unit 105 calculates arrival time differences based on the local maximum value in the cross-correlation values for the respective pairs of these microphones, and calculates an audio source direction based on the calculated arrival time differences and intervals between the microphones. For each of all the possible pairs of the microphones, the direction detecting unit 105 (i) adjusts the time axes of the frequency spectra of the acoustic signals received by the at least two microphones such that the arrival time difference becomes zero, (ii) calculates the percentage of the same time-point portions determined for one of the at least two microphones and present at the time points at which the same time-point portions determined for the other microphone are present respectively with respect to the time segment used to determine an audio source direction, and (iii) outputs information indicating an audio source direction 106 when the percentage is greater than a predetermined threshold (Step S602). Here, the same time-point portions are included in the time-point portions determined by the detected audio determining unit. As another method, the direction detecting unit 105 may calculate an audio source direction using the audio source direction calculated by one or some of the direction detecting units. In addition, the direction detecting unit 105 may calculate an audio source direction based on the audio source direction calculated by at least one of the direction detecting units even when all the audio source directions have not been calculated.

In this example, cross-correlation values are used as degrees of similarity, but differential errors between frequency spectra may be used as degrees of similarity. In addition, in this example, the arrival time differences are calculated based on the local maximum value in the cross-correlation values. However, arrival time differences may be calculated based on the maximum value in the cross-correlation values, the local maximum value or the maximum value in cross-correlation values equal to or greater than a threshold value, the minimum value in differential errors, or the local minimum value or the minimum value in differential errors less than a threshold value.

FIG. 42 is a block diagram showing the structure of one of the detected audio determining units 2802(k, j) (k=1 to 3, j=1 to M) having the same structure. Each of the detected audio determining units 2802(k, j) is structured with a corresponding one of: frequency spectrum determining units 3000(k, j) (k=1 to 3, j=1 to M); degree-of-similarity calculating units 3001(k, j) (k=1 to 3, j=1 to M); and detected audio determining units 3002(k, j) (k=1 to 3, j=1 to M).

Each of the frequency spectrum determining units 3000(k, j) determines frequency spectra that the corresponding one of the degree-of-similarity calculating units 3001(k, j) uses to calculate the sum of degrees of similarity, from among the frequency spectra having phases modified by the corresponding one of the phase modifying units 2801(k, j).

Each of the degree-of-similarity calculating units 3001(k, j) calculates the sum of degrees of similarity using the frequency spectra with modified phases determined by the corresponding one of the frequency spectrum determining units 3000(k, j).

Each of the detected audio determining units 3002(k, j) determines frequency spectra at time points that yield the sum of degrees of similarity, which has been calculated by the degree-of-similarity calculating units 3001(k, j), equal to or greater than the first threshold value, from among the frequency spectra calculated by the FFT analysis units 103(K).

The following describes operations performed by the audio source direction detecting device 2800 structured like this.

Figure 43:
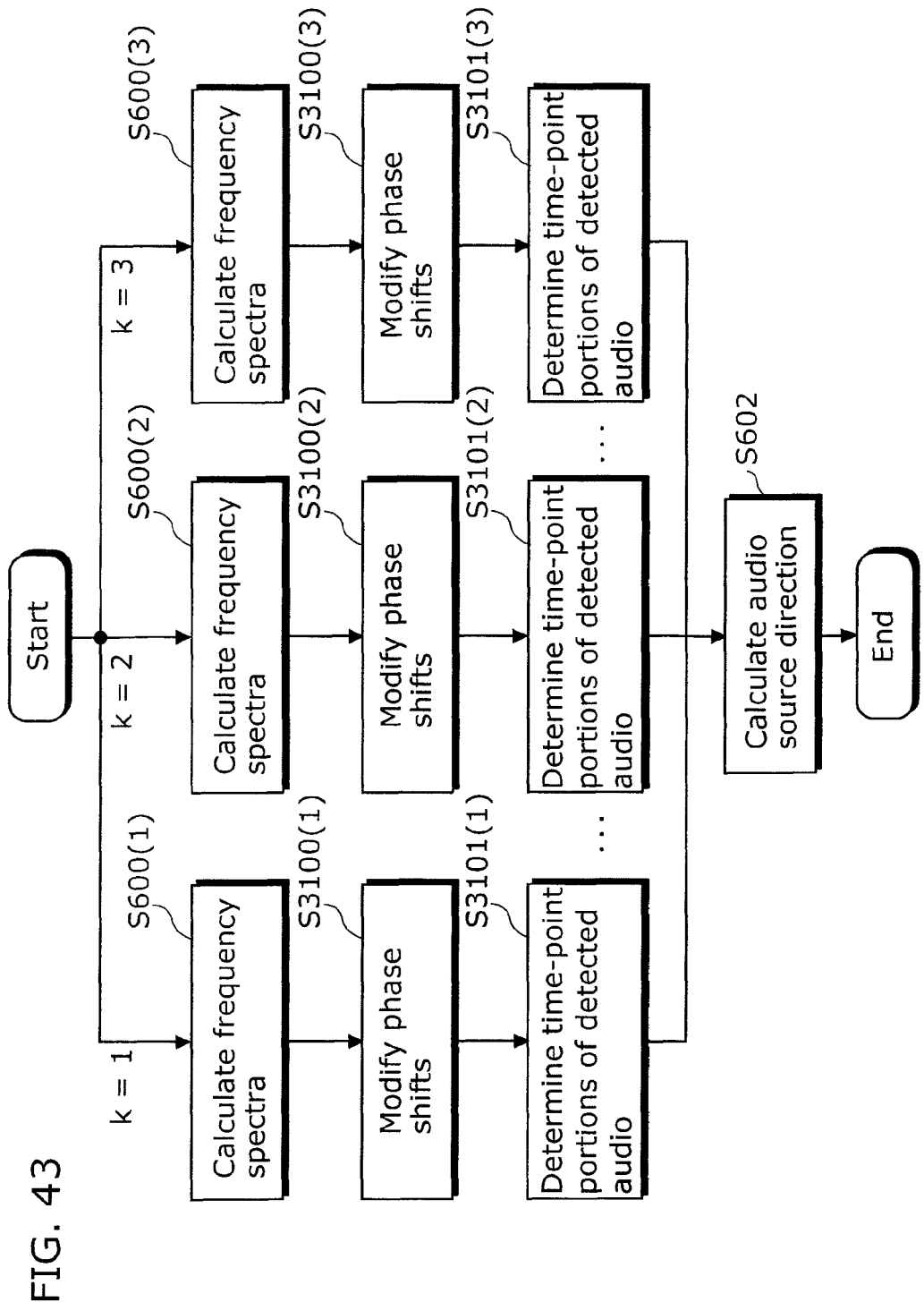
FIG. 43 is a flowchart of a procedure of an operation performed by the audio source direction detecting device in the second embodiment of the present invention.
Figure 44:
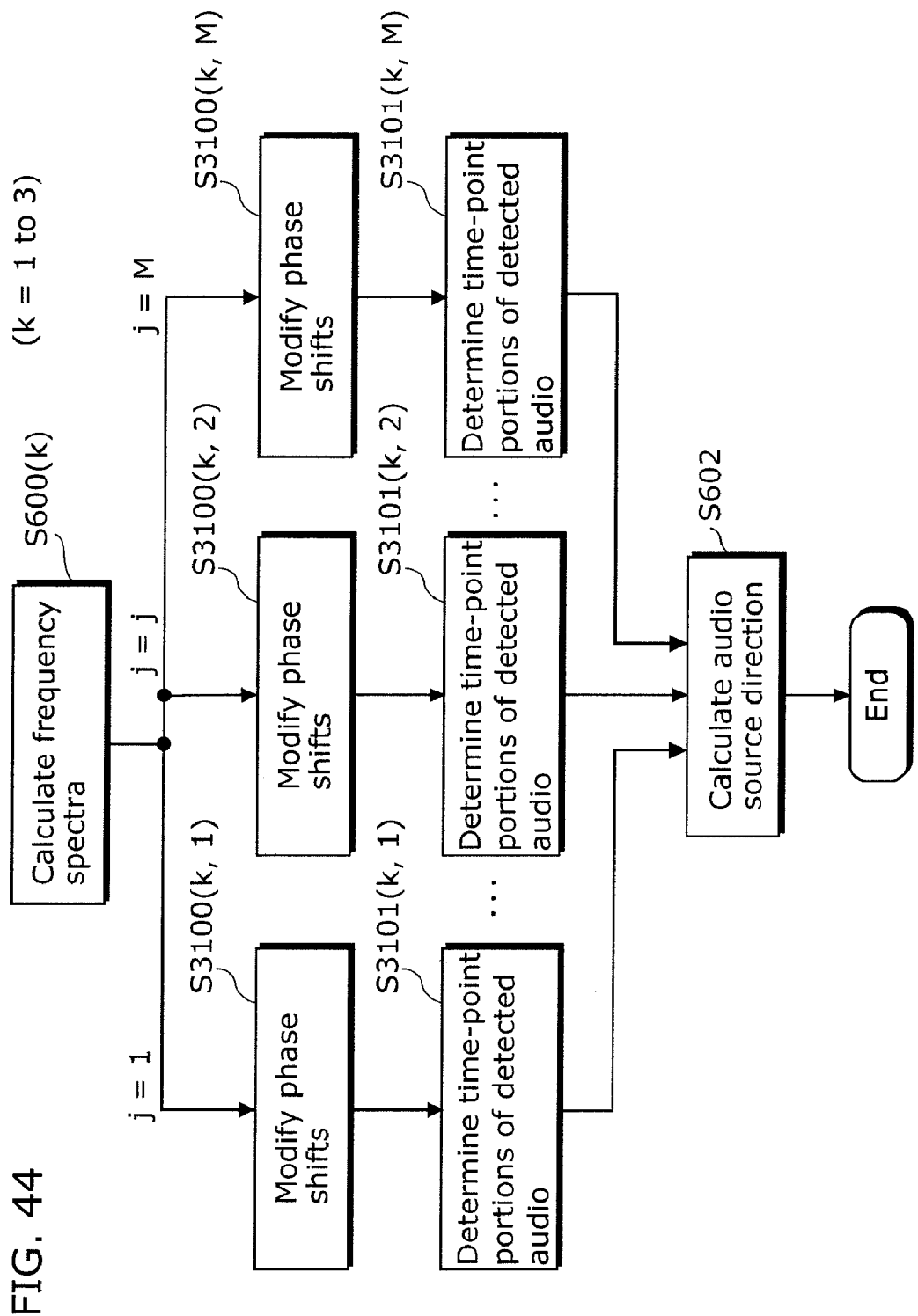
FIG. 44 is a flowchart of an operation procedure of Step S3100(k, j) of modifying phase shifts and an operation procedure of Step S3101(k, j) of determining time-point portions of a detected audio. Both the procedures are performed by the audio source direction detecting device in the second embodiment of the present invention.
Figure 45:
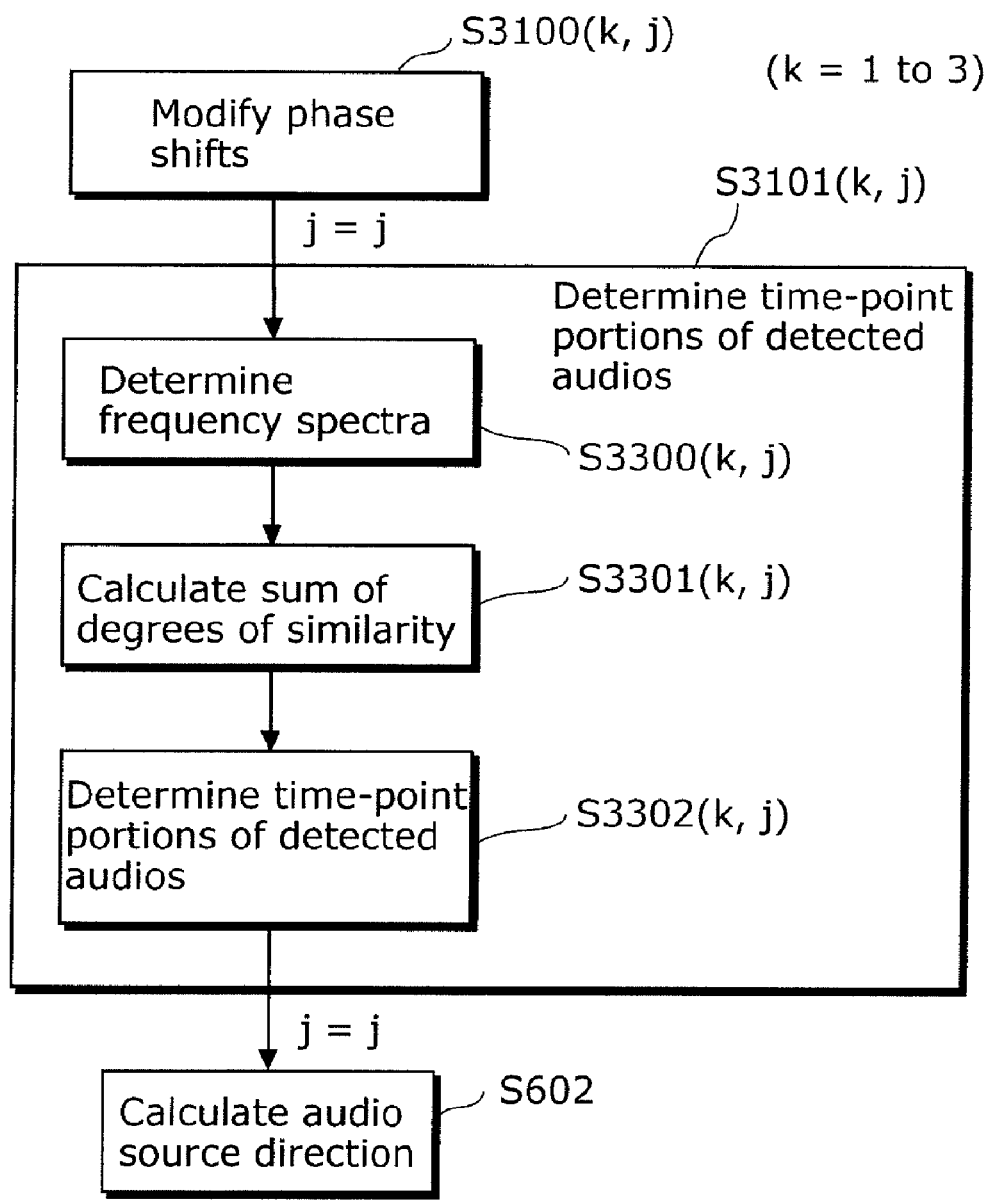
FIG. 45 is a flowchart of an operation procedure of Step S3101(k, j) of determining time-point portions of a detected audio. The procedure is performed by the audio source direction detecting device in the second embodiment of the present invention.

Each of FIGS. 43 to 45 is a flowchart indicating a procedure of an operation performed by the audio source direction detecting device 2800.

First, each of the FFT analysis units 103(k) (k=1 to 3) performs fast Fourier transform on the acoustic signal 100 inputted by the corresponding microphone 102(k) (having the above-mentioned value), and calculates frequency spectra including phase components of the acoustic signal 100 (Step S600(k) (k=1 to 3)). Here, frequency spectra are calculated according to the same method as in the first embodiment.

Next, each of the phase modifying units 2801(k) (k=1 to 3) modifies time-dependent phase shifts of frequency spectra at plural time points in the frequency spectra (having a frequency f) calculated by the corresponding one of the FFT analysis units 103(k) (having the above-mentioned value) on condition that the phases rotate by 360 degrees per time interval 1/f at a constant velocity (Step S3100(k), Step S3100 (k, j) (k=1 to 3, j=1 to M)).

Figure 46:
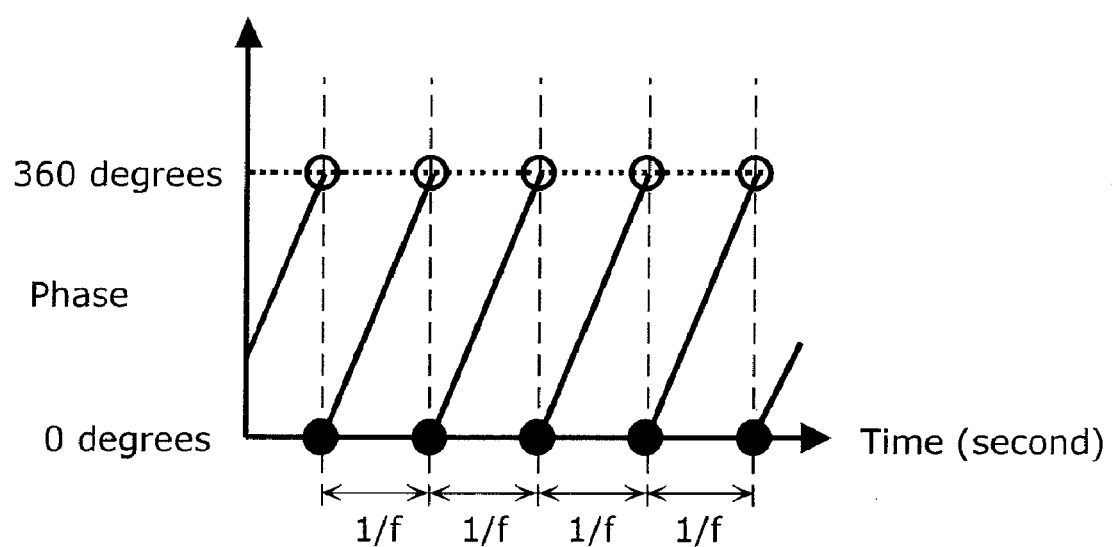
FIG. 46 is a diagram illustrating a condition that phases are rotated by 360 degrees per time interval 1/f at a constant velocity.
Figure 47:
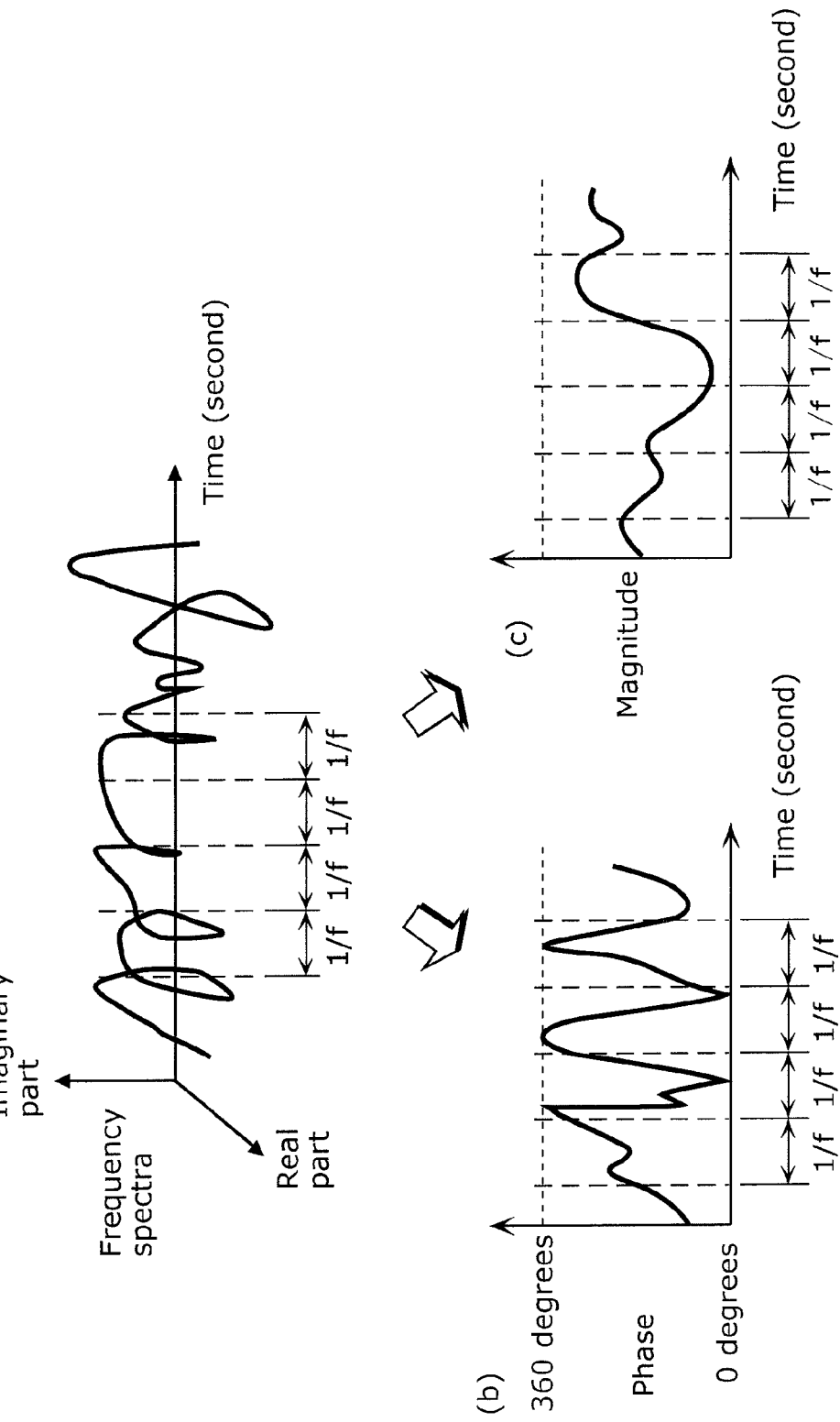
FIG. 47 is a diagram illustrating an exemplary method for modifying time-dependent phase shifts.
Figure 48:
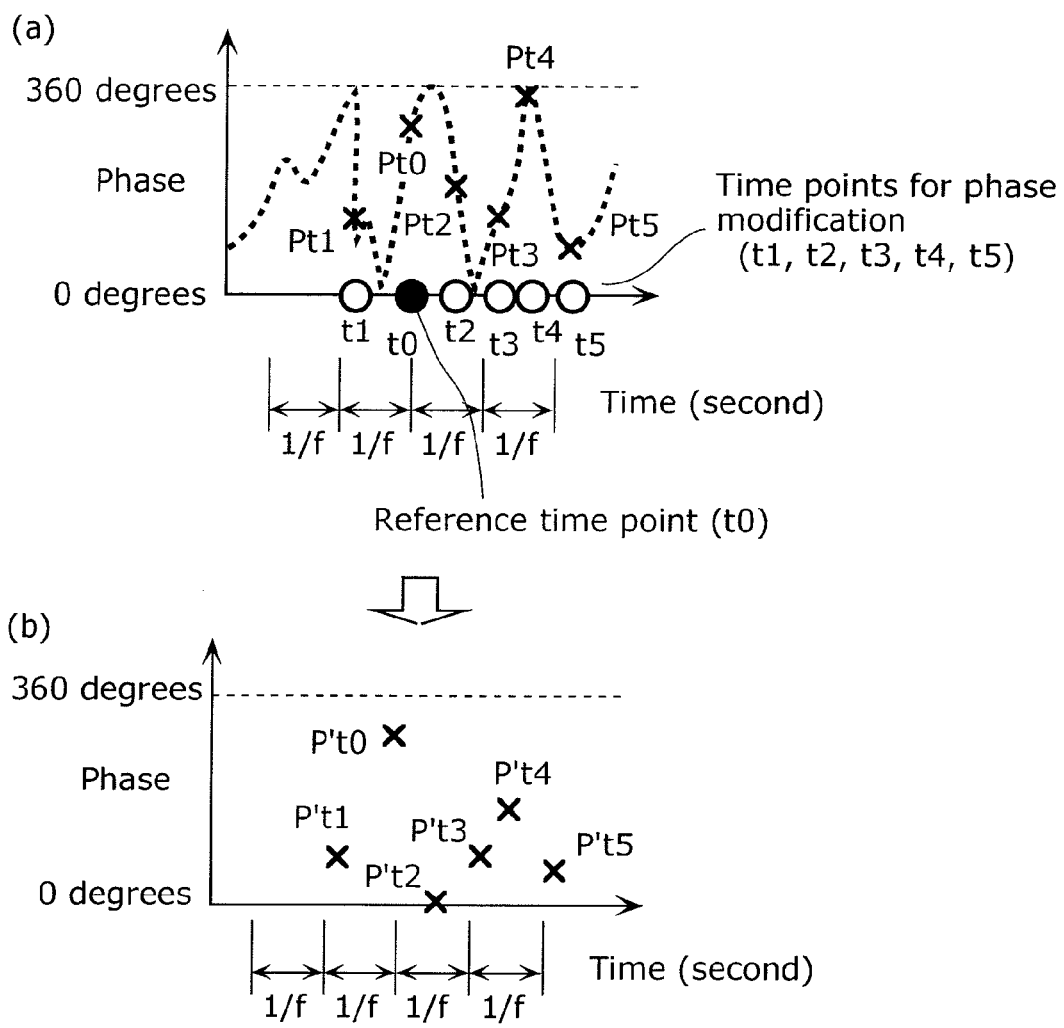
FIG. 48 is a diagram illustrating an exemplary method for modifying time-dependent phase shifts.

Here, a description is given of a condition that a phase rotates by 360 degrees per time interval 1/f at a constant velocity. The horizontal axis represents the time axis (second), and the vertical axis represents the phase (degree). As shown in FIG. 46, the aforementioned condition defines that the phases linearly change from 0 to 360 degrees per time interval 1/f (second), and the same phase shifts (linear change from 0 to 360 degrees) are repeated per time interval 1/f (second). Here, the unit of frequency f is Hz.

Descriptions are given of an exemplary method for modifying time-dependent phase shifts with reference to FIG. 47 to FIG. 50. FIG. 47(a) schematically shows frequency spectra calculated by the FFT analysis units 103(k). FIG. 47(b) schematically shows phase components of frequency spectra separated from the frequency spectra in FIG. 47(a). FIG. 47(c) schematically shows magnitude components of frequency spectra separated from the frequency spectra in FIG. 47(a). The horizontal axes of FIG. 47(a), FIG. 47(b), and FIG. 47(c) are time axes (second). The display method of FIG. 47(a) is the same as that of FIG. 16(b), and thus the same descriptions are not repeated. The vertical axis of FIG. 47(b) represents phases of frequency spectra, and the phases are represented as values indicating 0 to 360 degrees. The vertical axis of FIG. 47(c) represents the magnitudes of frequency spectra. When the real part of a frequency spectrum is Expression 22 and the imaginary part of the frequency spectrum is Expression 23, the phases P and the magnitudes L of the frequency spectrum can be derived according to Expression 24 and Expression 25.

$$x_t \qquad \text{Expression [22]}$$

$$y_t \qquad \text{[Expression 23]}$$

$$P_t = \arctan(y_t/x_t) \qquad \text{[Expression 24]}$$

$$L_t = \sqrt{x_t^2 + y_t^2} \qquad \text{[Expression 25]}$$

Here, a symbol t represents a time point of a frequency spectrum.

Here, time-dependent phase shifts are modified using phase components of frequency spectra shown in FIG. 47(b).

First, a reference time point is decided. FIG. 48(a) shows the same frequency spectra as in FIG. 47(b). In this example, the time t0 marked with a black circle in FIG. 48(a) is decided as the reference time point.

Next, plural time points of frequency spectra of which phases are modified are determined. In this example, five time points marked with white circles (t1, t2, t3, t4, and t5) in FIG. 48(a) are determined as the time points of the frequency spectra of which phases are modified.

Here, it is assumed that the phase of the frequency spectrum at the reference time point is derived from Expression 26, and that the phases of the frequency spectra of which phases are modified at the respective five time points are derived from Expression 27.

$$P_{t_0} = \arctan(y_{t_0}/x_{t_0}) \quad \text{[Expression 26]}$$

$$P_{t_j} = \arctan(y_{t_j}/x_{t_j}) \ (i=1,2,3,4,5) \quad \text{[Expression 27]}$$

Phases to be modified are marked with X in FIG. 48(a). In addition, the magnitudes L of the frequency spectra at the corresponding time points are derived from Expression 28.

$$L_{t_i} = \sqrt{x_{t_i}^2 + y_{t_i}^2} \ (i=0,1,2,3,4,5) \quad \text{[Expression 28]}$$

Figure 49A:
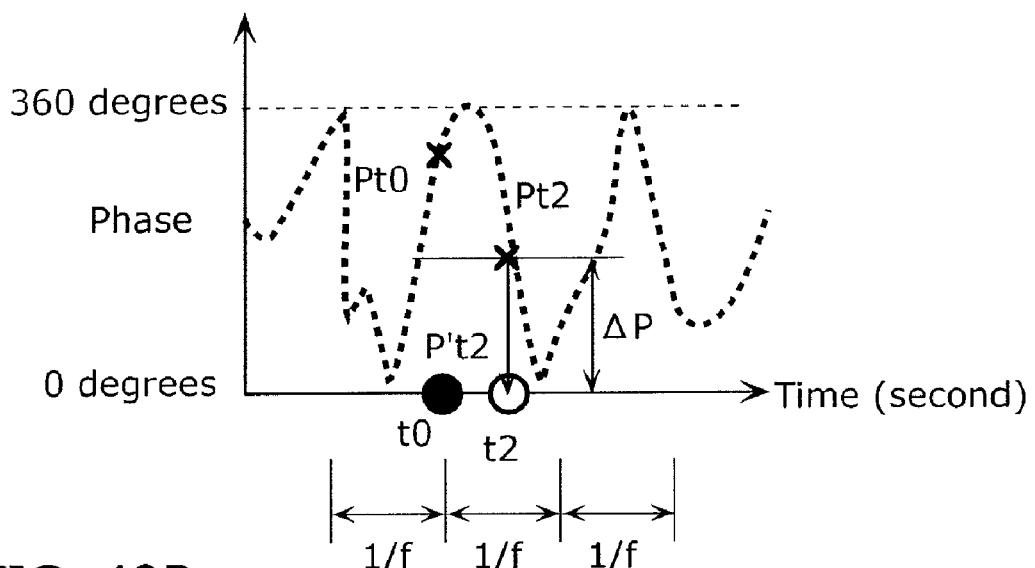
FIG. 49A is a diagram illustrating an exemplary method for modifying time-dependent phase shifts.
Figure 49B:
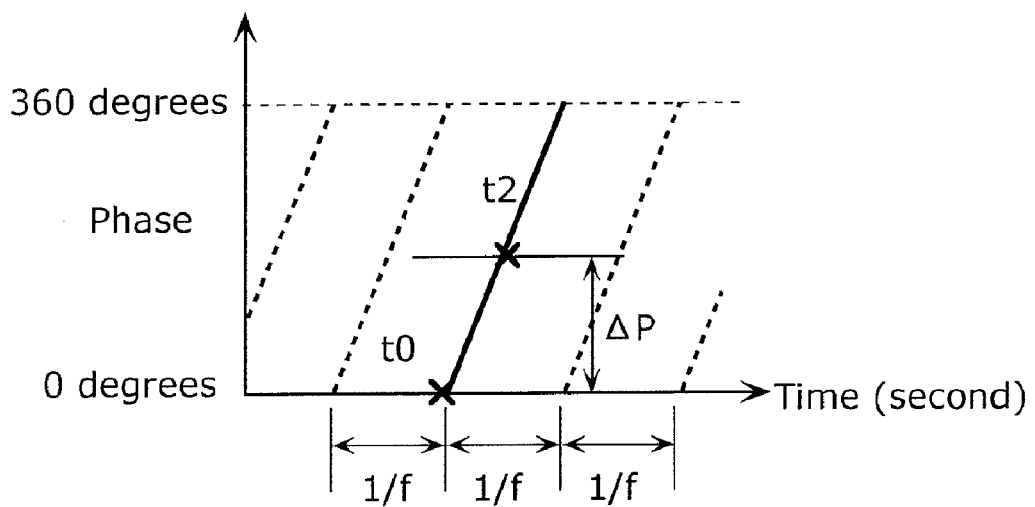
FIG. 49B is a diagram illustrating an exemplary method for modifying time-dependent phase shifts.

Next, each of FIG. 49A and FIG. 49B shows a method for modifying the phase of the frequency spectra at time t2. FIG. 49A and FIG. 48(a) show the same frequency spectra. In addition, FIG. 49B and FIG. 46 show the same frequency spectra, and a condition that phases rotate by 360 degrees per time interval 1/f at a constant velocity. Here, the modified phases are derived from Expression 29.

$$P'_{t_j} (i=0,1,2,3,4,5) \quad \text{[Expression 29]}$$

In FIG. 49B, comparison between the phase shift at the time point t0 corresponding to the reference time point and the phase shift at the time t2 shows that the phase at the time point t2 is greater than the phase at the time point t0 by ΔP. In FIG. 49A, in order to modify the phase shifts due to a time difference between the time point t0 corresponding to the reference time point and the time point Pt0, P't2 is calculated by subtracting ΔP from the phase Pt2 at the time point t2. This is the modified phase at the time point t2. In addition, since the phase at the time point t0 is the phase at the reference time point, the modified phase has the same value. More specifically, the modified phase is calculated according to Expression 30 and Expression 31.

$$P'_{t_0} = P_{t_0} \quad \text{[Expression 30]}$$

$$P'_{t_j} = P_{t_j} - ((t_j - t_0) \bmod (1/f))/360 \ (i=1,2,3,4,5) \quad \text{[Expression 31]}$$

An adjustment is made such that the modified phase is within a range of 0 to 360 degrees. Assuming that the phases before the modification rotate by 360 degrees per time interval 1/f, all the modified phases are Pt0.

The modified phases of the frequency spectra are marked with X in FIG. 48(b). The display method of FIG. 48(b) is the same as that of FIG. 48(a), and thus the same descriptions are not repeated.

Lastly, a phase-modified frequency spectrum is calculated using the phase P' of the phase-modified frequency spectrum and the magnitude L of a pre-modification frequency spectrum. Here, it is assumed that the real part of the phase-modified frequency spectrum is derived from Expression 32, and that the imaginary part of the phase-modified frequency spectrum is derived from Expression 33.

$$x'_{t_j} (i=0,1,2,3,4,5) \quad \text{[Expression 32]}$$

$$y'_{t_j} (i=0,1,2,3,4,5) \quad \text{[Expression 33]}$$

Figure 50:
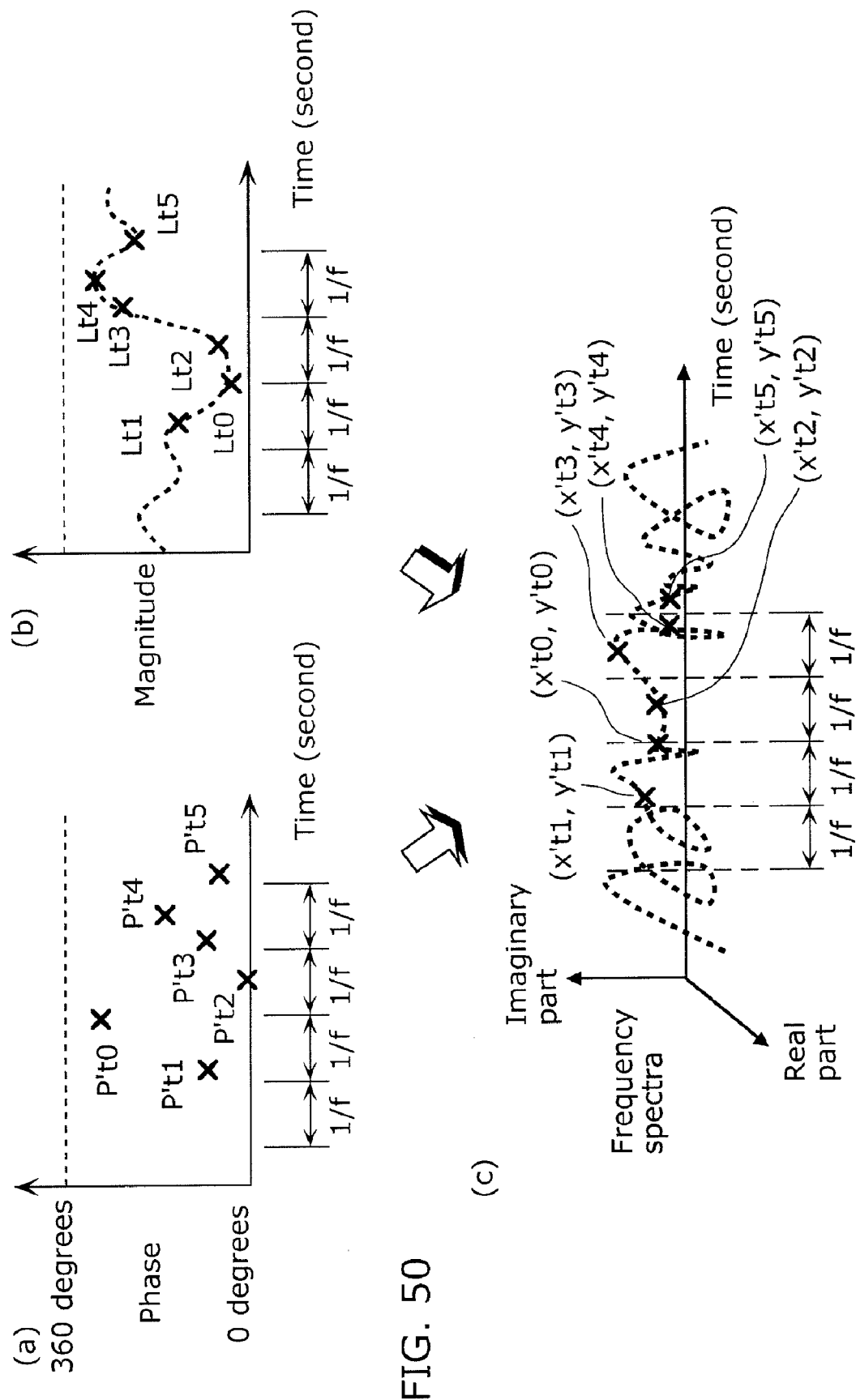
FIG. 50 is a diagram illustrating an exemplary method for modifying time-dependent phase shifts.

FIG. 50 shows an exemplary method for calculating a phase-modified frequency spectrum. FIG. 50(a) and FIG. 48(b) show the same frequency spectra. FIG. 50(b) and FIG. 47(c) show the same frequency spectra, and in the diagrams, the magnitudes of the pre-modification frequency spectra at time points t0, t1, t2, t3, t4, and t5 are marked with X. Phase-modified frequency spectra are calculated according to Expression 34 and Expression 35 using the phases P' of the phase-modified frequency spectra and the magnitudes L of the pre-modification frequency spectra.

$$x'_{t_j} = L_{t_j} \cos(P'_{t_j}) \ (i=0,1,2,3,4,5) \quad \text{[Expression 34]}$$

$$y'_{t_j} = L_{t_j} \sin(P'_{t_j}) \ (i=0,1,2,3,4,5) \quad \text{[Expression 35]}$$

In FIG. 50(c), phase-modified frequency spectra are marked with X. The display method of FIG. 50(c) is the same as that of FIG. 47(a), and thus the same descriptions are not repeated. The phase-modified frequency spectra are frequency spectra for which time-dependent phase shifts have been modified on condition that the phases rotate by 360 degrees per time interval 1/f at a constant velocity.

Next, each of the detected audio determining units 2802(k) (k=1 to 3) causes the detected audio determining units 2802(k, j) (k=1 to 3, j=1 to M) to calculate, for each of the frequency bands j (j=1 to M), the sum of degrees of similarity between the frequency spectrum having a modified phase at the time point as the analysis target and frequency spectra having modified phases at time points different from the target time point, based on the frequency spectra calculated by the corresponding FFT analysis units 103(k) (having the above-mentioned value) and the frequency spectra having phases modified by the corresponding FFT analysis unit 103(k) (having the above-mentioned value). The detected audio determining units 2802(k) (k=1 to 3) calculates the time point as the analysis target that yields the sum of degrees of similarity equal to or greater than the first threshold value, and removes noises by determining, as frequency spectra at the time points of the detected audios, the frequency spectra calculated by the FFT analysis units 103(k) at time points that yield the sum of degrees of similarity equal to or greater than the first threshold value (Step S3101(k), Step S3101(k, j) (k=1 to 3, j=1 to M)).

First, each of the frequency spectrum determining units 3000(k, j) (k=1 to 3, j=1 to M) determines frequency spectra that a corresponding one of the degree-of-similarity calculating units 3001(k, j) (k=1 to 3, j=1 to M) uses to calculate the sum of degrees of similarity, based on the phase-modified frequency spectra calculated by a corresponding one of the phase modifying units 2801(k, j) (k=1 to 3, j=1 to M) (Step S3300(k, j) (k=1 to 3, j=1 to M)). Here, it is assumed that the time point as the analysis target is t0, and the time points of phase-modified frequency spectra of which the sum of degrees of similarity to the phase-modified frequency spectrum as the analysis target are t1, t2, t3, t4, and t5. The time points and time widths of the phase-modified frequency spectra used to calculate the sum of degrees of similarity are determined based on the characteristics of the audio to be extracted.

Next, each of the degree-of-similarity calculating units 3001(k, j) (k=1 to 3, j=1 to M) calculates the sum of degrees of similarity using the phase-modified frequency spectra determined by the corresponding one of the frequency spectrum determining units 3000(k, j) (k=1 to 3, j=1 to M) (Step S3301(k, j) (k=1 to 3, j=1 to M)). The following describes a method for calculating the sum of degrees of similarity. In this example, it is assumed that the time point as the analysis target is t0, and that the time points of the phase-modified frequency spectra of which the sum of degrees of similarity to the phase-modified frequency spectrum as the analysis target are time points t1, t2, t3, t4, and t5. Here, cross-correlation values are used as the degrees of similarity. The sum of degrees of similarity S is calculated using Expression 36.

$$H = \sum_{i=1}^{i=5} \left( x'_{t_0} \times x'_{t_i} + y'_{t_0} \times y'_{t_i} \right)$$ [Expression 36]

The following describe methods each of which is for calculating the sum of degrees of similarity S. One of the methods is a method for normalizing the degrees of similarity using the number of summed degrees of similarity in the calculation of cross-correlation values according to Expression 37.

$$S = \frac{1}{5} \left( \sum_{i=1}^{i=5} \left( x'_{t_0} \times x'_{t_i} + y'_{t_0} \times y'_{t_i} \right) \right)$$ [Expression 37]

One of the methods is a method for adding the degrees of similarity to the frequency spectrum at the time point as the analysis target according to Expression 38.

$$S = \sum_{i=0}^{i=5} \left( x'_{t_0} \times x'_{t_i} + y'_{t_0} \times y'_{t_i} \right)$$ [Expression 38]

One of the methods is a method for using cross-correlation values normalized using the magnitudes of frequency spectra according to Expression 39.

$$S = \sum_{i=1}^{i=5} \frac{\left( x'_{t_0} \times x'_{t_i} + y'_{t_0} \times y'_{t_i} \right)}{\sqrt{x'^2_{t_0} + y'^2_{t_0}} \sqrt{x'^2_{t_i} + y'^2_{t_i}}}$$ [Expression 39]

One of the methods is a method for using inverse numbers of the distances between frequency spectra according to Expression 40.

$$S = 1 \Big/ \left( \sum_{i=1}^{i=5} \sqrt{(x'_{t_0} - x'_{t_i})^2 + (y'_{t_0} - y'_{t_i})^2} + \alpha \right)$$ [Expression 40]

One of the methods is a method for using inverse numbers of the distances between phase components according to Expression 41.

$$S = 1 \Big/ \left( \sum_{i=1}^{i=5} \sqrt{\left( \arctan(y'_{t_0}/x'_{t_0}) - \arctan(y'_{t_i}/x'_{t_i}) \right)^2} + \alpha \right)$$ [Expression 41]

$$= 1 \Big/ \left( \sum_{i=1}^{5} \sqrt{(P'_{t_0} - P'_{t_i})^2} + \alpha \right)$$

Here, Expression 42 is a predetermined small value used to prevent infinite divergence of S.

$$\alpha$$ [Expression 42]

In addition, the following is an example of the sum of degrees of similarity assuming that the time point as an analysis target is t2, and that the time points of the phase-modified frequency spectra of which the sum of degrees of similarity to the phase-modified frequency spectrum as the analysis target are time points t0, t1, t2, t3, t4, and t5.

$$S = \sum_{i=0}^{i=1} \left( x'_{t_2} \times x'_{t_i} + y'_{t_2} \times y'_{t_i} \right) + \sum_{i=3}^{i=5} \left( x'_{t_2} \times x'_{t_i} + y'_{t_2} \times y'_{t_i} \right)$$ [Expression 43]

In this example, each of the frequency spectrum determining units $3000(k, j)$ determines frequency spectra that the corresponding one of the degree-of-similarity calculating units $3001(k, j)$ uses to calculate the sum of degrees of similarity, based on the phase-modified frequency spectra calculated by the corresponding one of the phase modifying units $2801(k, j)$. However, as another method, it is also good that each of the frequency spectrum determining units $3000(k, j)$ determines in advance frequency spectra having phases to be modified by the corresponding one of the phase modifying units $2801(k, j)$, and the corresponding one of the degree-of-similarity calculating units $3001(k, j)$ calculates the sum of degrees of similarity using the phase-modified frequency spectra determined by the phase modifying units $2801(k, j)$.

Next, each of the detected audio determining units $3002(k, j)$ (k=1 to 3, j=1 to M) determines, as frequency spectra present at the same time points of the detected audios, the frequency spectra which are present at the time points that yield the sum of degrees of similarity S equal to or greater than the first threshold value and which have been calculated by the corresponding FFT analysis unit 103(K) (having the above-mentioned value) (Step S3302(k, j)) (k=1 to 3, j=1 to M)).

When the first threshold value is represented as A, frequency spectra at time points that satisfy the following condition is determined from among the frequency spectra calculated by the corresponding FFT analysis unit $103(k)$ (having the above-mentioned value).

$$S \geq A$$ [Expression 44]

Lastly, the direction detecting unit 105 calculates values of cross-correlation between the time-point portions, which are present at the same time points of the frequency spectra, determined in association with the respective possible pairs of the three microphones, based on the frequency spectra determined by the detected audio determining units $2802(k)$ (k=1 to 3) (the possible pairs are the microphone 102(1) and microphone 102(2), the microphone 102(2) and the microphone 102(3), and the microphone 102(1) and the microphone 102 (3)). The direction detecting unit 105 calculates arrival time differences based on the local maximum value in the cross-correlation values, determines an audio source direction based on the calculated arrival time differences and the intervals between the microphones, and outputs the information indicating the audio source direction 106 (Step S602). In this case, the arrival time differences are calculated based on the local maximum value in the cross-correlation values. However, arrival time differences may be calculated based on the maximum value in the cross-correlation values, the local maximum value in cross-correlation values equal to or greater than a threshold value, the local minimum value in differential errors, the minimum value in the differential errors, or the minimum value in differential errors less than a threshold value.

With the above-described structure, each of the percentage determining units 500(1, *j*) determines an audio source direction only when the percentages with respect to the cross-correlation values corresponding to all the audio source directions are equal to or greater than the second threshold value. For this, it is possible to prevent determination of an erroneous audio source direction even when cross-correlation values corresponding to the actual audio source direction cannot be calculated due to influence of noises.

In addition, the detected audio determining units 2802(*k*) can accurately determine time-point portions of the detected audio by determining noise portions with distorted phase components (portions of white noises such as background noises, or noise portions distorted due to a mixed audio).

In addition, the phase modifying unit 2801(*k*) can modify phase shifts due to time shifts in the determination of time-point portions of the detected audios. For this, it is not always necessary to use frequency spectra at time points of the time interval 1/f that prevents time-dependent phase shifts. This provides an advantageous effect of determining noises even in the case of an acoustic signal having frequency segmented in association with a time interval shorter than the time interval 1/f.

In addition, when the percentage of the time-point portions, which are present at the same time points of frequency spectra of acoustic signals, determined in association with the microphones with respect to the time segment used to calculate values of cross-correlation between the frequency spectra is less than the second threshold value, the direction detecting unit eliminates the direction corresponding to the cross-correlation value from candidate audio source directions This makes it possible to determine an audio source direction after eliminating such candidates corresponding to an erroneous audio source direction.

In addition, cross-correlation values are used as degrees of similarity in determination of time-point portions of the detected audios. This makes it possible to determine phase shifts without focusing on a difference in magnitude of the frequency spectra. This provides an advantageous effect of determining noise portions with distorted phase components of even acoustic signals including frequency spectra each having a small amplitude. In addition, the audio source direction is in conformity with the cross-correlation values in the direction detecting unit.

The concept relating to determination of noise portions according to the present invention is based on an idea that noise portions distorted due to white noises such as background noises or a mixed audio contain distorted phase components, and thus the sum S of degrees of similarity is less than the first threshold value.

In this embodiment, three microphones, and three FFT analysis units and three detected audio determining units associated with the respective microphones are prepared. However, it is to be noted that each of the microphones processes an inputted acoustic signal using a single FFT analysis unit and detected audio determining unit shared by the microphones.

In this embodiment, an audio source direction is determined for each time point and frequency. However, it is also good to prepare a histogram of audio source directions in the time-axis direction, and determine, as an audio source direction, the audio source direction which takes the maximum value. It is also good to average the audio source directions in the time-axis direction to determine an audio source direction.

In this embodiment, audio source directions are determined for each time point and frequency. However, it is also good to determine an audio source direction by preparing a histogram of audio source directions in the frequency-axis direction and takes the local maximum value. Further, it is also good to determine an audio source direction by averaging the audio source directions in the frequency-axis direction.

Further, the number of microphones is three in this embodiment, but the number is any as long as it is 2 or more.

Further, it is also good to use DFT, cosine transform, wavelet transform, or band-pass filters, instead of FFT performed by the FFT analysis units.

In this embodiment, an audio source direction is determined by removing noises of frequency spectra in all of (M) frequency bands calculated by the FFT analysis unit 103(*k*) using the phase modifying unit 2801(*k*) and the detected audio determining unit 1802(*k*). However, it is also good to select some of the frequency bands and determine an audio source direction by removing noises from the selected frequency bands.

The FFT analysis units may calculate the frequency spectra from the acoustic signal on which a time window having a width of $\Delta T$ is applied. The detected audio determining unit may determine time-point portions of the detected audio based on the sum of degrees of similarity between the frequency spectrum of the time-point portion as the analysis target and the frequency spectra of the nearby time-point portions including plural time points apart by a time interval greater than the time interval $\Delta T$. With this structure, it is possible to remove noises (distortions) due to frequency leakage of surrounding frequencies due to influence of fine segmentation of temporal resolution ($\Delta T$) by using the sum of degrees of similarity with the frequency spectra at the plural time points including the time points apart by the time interval greater than the time interval $\Delta T$ (which is the width of the time window used to calculate the frequency spectra).

Variation of Second Embodiment

Next, a description is given of a variation of an audio source direction detecting device shown in the second embodiment.

The audio source direction detecting device according to this variation has the same structure as the audio source direction detecting device according to the second embodiment described with reference to FIG. 40 to FIG. 42. However, the detected audio determining units 2802(*k*) (k=1 to 3) execute different processing.

Each of the detected audio determining units 2802(*k*) (k=1 to 3) calculates a space of degrees of similarity by generating a histogram of phase components of the frequency spectra selectively using the detected audio determining units 2802 (*k, j*) for each of frequency bands j (j=1 to M), based on the frequency spectra calculated by a corresponding one of the FFT analysis units 103(*k*) (having the above-mentioned value) and the frequency spectra having the phases modified by the corresponding one of the phase modifying units 2801 (*k*) (having the above-mentioned value). Each of the detected audio determining units 2802(*k*) (k=1 to 3) determines, as frequency spectra of the detected audios, a group of frequency spectra having a degree of similarity equal to or greater than a threshold value.

Each of the degree-of-similarity calculating units 3001(*k, j*) calculates a space of degrees of similarity by generating a histogram of phase components of the phase-modified frequency spectra determined by the corresponding one of the frequency spectrum determining units 3000(*k, j*). The detected audio determining units 3002(*k, j*) determines, as frequency spectra of the detected audio, a group of frequency spectra determined by the corresponding FFT analysis unit 103(k) as having a degree of similarity equal to or greater than the threshold in the space of degrees of similarity calculated by the corresponding one of the degree-of-similarity calculating units 3001(k, j).

The following describe operations performed by the audio source direction detecting device 2800 structured like this. Procedures of operations performed by the audio source direction detecting device 2800 are the same as those in the second embodiment, and are indicated in the flowcharts of FIG. 43 to FIG. 45.

The following describes only processing executed by the detected audio determining units 2802(k) (k=1 to 3) in the audio source direction detecting device 2800. Processing executed by the other processing units is the same as in the second embodiment, and thus the same descriptions are not repeated.

Each of the detected audio determining units 2802(k, j) calculates a space of degrees of similarity by generating the histogram of phase components of the frequency spectra, based on the phase-modified frequency spectra calculated by the corresponding one of the phase modifying units 2801(k, j). Each of the detected audio determining units 2802(k, j) removes noises by determining, as frequency spectra of the detected audio, a group of frequency spectra determined by the FFT analysis unit 103(k) having a degree of similarity equal to or greater than the threshold value (Step S3101(k), and Step S3101(k, j) (k=1 to 3, j=1 to M)).

Each of the degree-of-similarity calculating units 3001(k, j) (j=1 to M) calculates a space of degrees of similarity by generating a histogram of phase components of the frequency spectra, based on the phase-modified frequency spectra determined by the corresponding one of the frequency spectrum determining units 3000(k, j) (Step S3301(k, j) (j=1 to M)).

It is assumed that the phase components of the phase-modified frequency spectra are derived from Expression 26.

Figure 51:
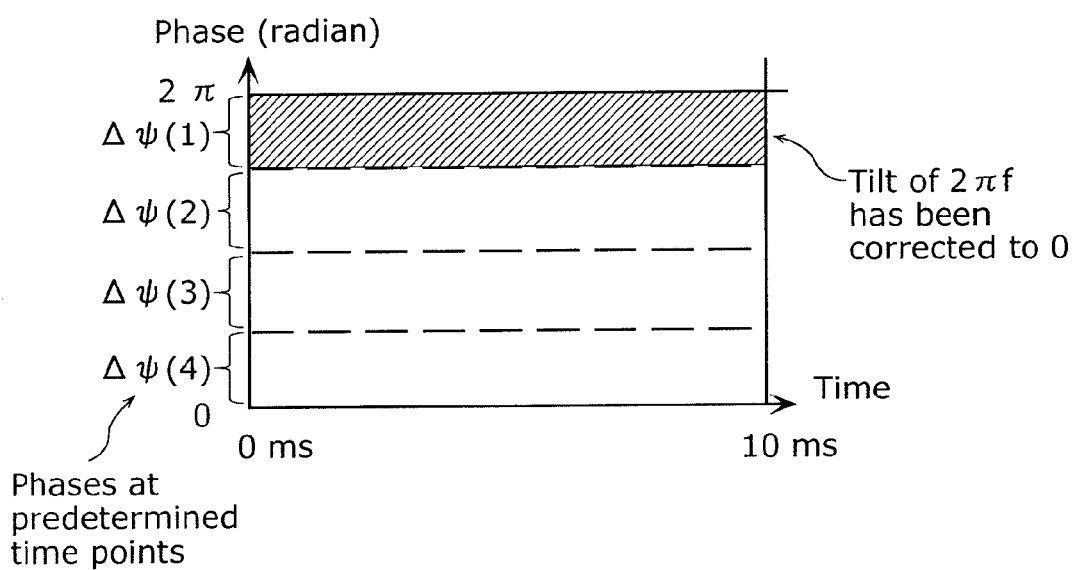
FIG. 51 is a diagram illustrating an exemplary method for generating a histogram of phase components of frequency spectra.

FIG. 51 shows an exemplary method for generating a histogram of phase components of frequency spectra. Here, assuming that phase segments are $\Delta\psi(i)$ (i=1 to 4), the histogram is generated by calculating the numbers of times of appearance of frequency spectra in a predetermined time width in each of frequency bands of which phases tilt by $2\pi f$ with respect to time. The shaded portions in FIG. 51 are $\Delta\psi(i)$ areas. Here, a tilt of $2\pi f$ of the phases of the frequency spectra with respect to time have been modified to zero, and thus the phases are parallel to the horizontal axis. Here, it is possible to generate a histogram by counting, for each of $\Delta\psi(i)$ (i=1 to 4), the numbers of the frequency spectra included in the respective areas.

The subsequent processing is the same as that of the first embodiment, and thus the same descriptions are not repeated (See FIG. 38B and FIG. 39).

This structure provides an advantageous effect of determining the frequency spectra of the detected audio even when an audio A (corresponding to a detected audio) and an audio B (corresponding to a detected audio) having different phases are included, by (i) calculating a space of degrees of similarity by generating a histogram of phase components of frequency spectra, (ii) determining, as frequency spectra of the detected audio, a group of frequency spectra having a degree of similarity equal to or greater than the threshold value, and (iii) separating the audio A and the audio B by removing background audios (corresponding to noises). Therefore, it is possible to accurately determine an audio source direction.

As a detected audio determining unit, the following noise removal device may be used.

The noise removal device includes a spectrum generating unit that generates frequency spectra including phase components in at least one frequency f of an acoustic signal, and a detected audio determining unit that removes, from frequency spectra included in a predetermined time width, the frequency spectrum as the analysis target having degrees of similarity less than a predetermined value with respect to respective possible frequency spectra arbitrarily selected from among the frequency spectra included in the predetermined time width. Here, the degrees of similarity are degrees of similarity in a space defined by $\psi(t)-(2\pi t)$ when the phase of the frequency spectrum at a time point t is $\psi(t)$ (radian).

With this structure, it is possible to accurately determine time-point portions of the detected audios by determining noise portions with distorted phase components (portions of white noises such as background noises, or noise portions distorted due to a mixed audio.

It is preferable that the spectrum generating unit applies a window function of a predetermined time window width on the acoustic signals, and generates the frequency spectra from the acoustic signals after the application of the window function, and that the predetermined time window width is smaller than the predetermined time width.

With this structure, it is possible to calculate degrees of similarity using frequency spectra including time points apart over the predetermined time window width and used in the calculation of the frequency spectra. In this way, it is possible to remove noises (distortions) due to frequency leakage of surrounding frequencies which occur when the frequency spectra has a fine temporal resolution.

This is described below in more detail. Here, a description is given of an exemplary case where a mixed audio of sinusoidal waves of 100 Hz, 200 Hz, and 300 Hz is used as an acoustic signal 2401. This example has an object to remove noises (distortions) due to frequency leakage of sinusoidal waves of 100 Hz and 300 Hz to the sinusoidal wave of 200 Hz in the mixed audio.

Figure 52:
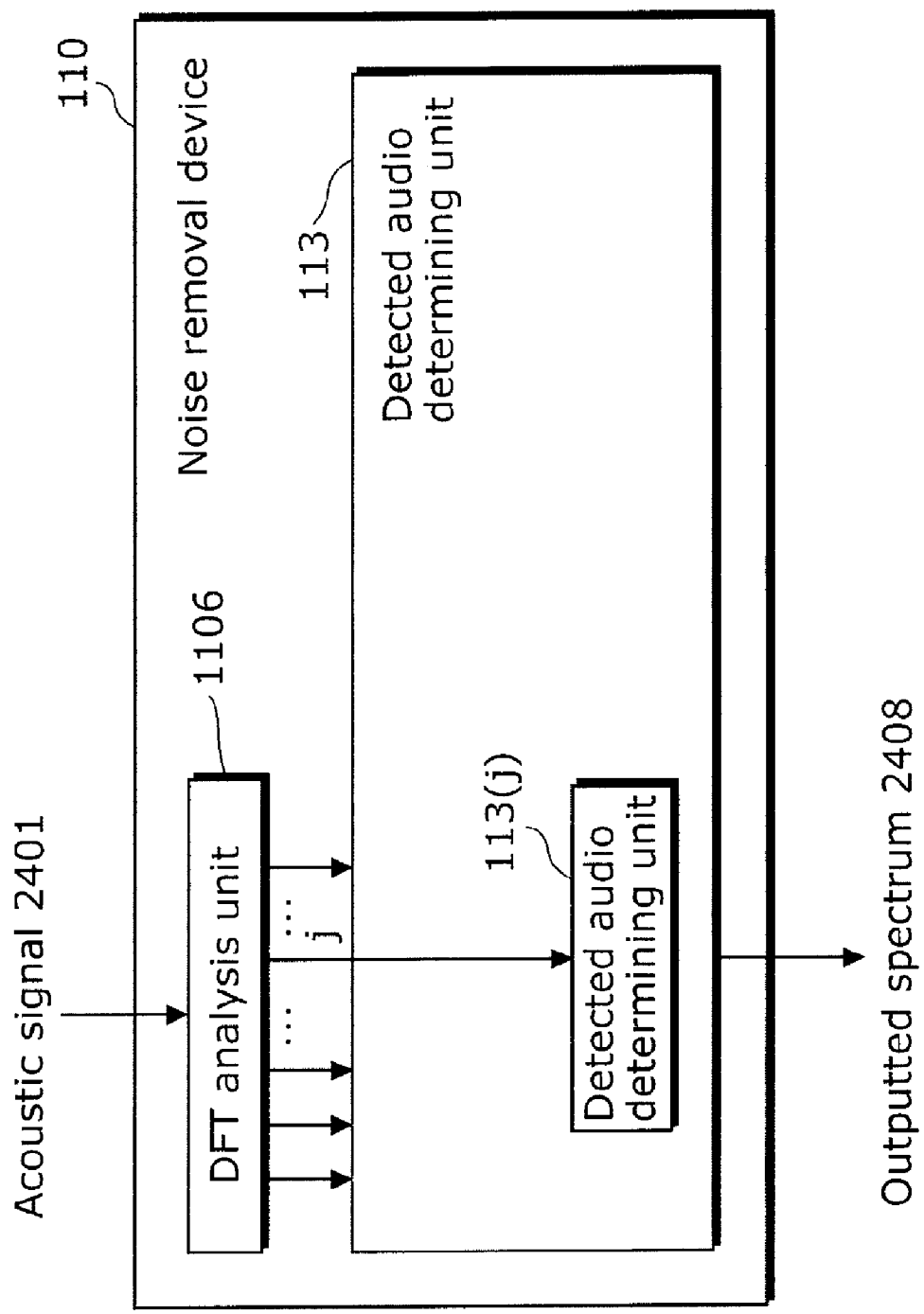
FIG. 52 is a block diagram showing the overall structure of a noise removal device in the first embodiment of the present invention.

FIG. 52 is a block diagram showing the structure of the noise removal device according to this variation.

A noise removal device 110 includes a DFT analysis unit 1106 and a detected audio determining unit 113. The DFT analysis unit 1106 and the detected audio determining unit 113 are implemented by executing a program for implementing the functions of each of processing units on a computer.

The DFT analysis unit 1106 is a processing unit that performs discrete Fourier transform on the inputted acoustic signals 2401, and calculates frequency spectra including phase components of the acoustic signals 2401. Hereinafter, M is assumed to be the number of frequency bands of the frequency spectra calculated by the DFT analysis unit 1106, and the numbers for specifying the respective frequency bands are represented as the symbol j.

The detected audio determining unit 113 includes the detected audio determining units 113(j) (j=1 to M). The detected audio determining unit 113 is a processing unit which removes noises in the frequency spectra calculated by the DFT analysis unit 1106 by selectively using the detected audio determining units 113(j) (j=1 to M) for each of the frequency bands j (j=1 to M).

The following describes a case where the j-th frequency band is f (for example, the center frequency is f). The detected audio determining unit 113(j) calculates the sum of degrees of similarity between the frequency spectrum at the time point as the analysis target among the plural time points and frequency spectra at plural time points different from the target time point, based on the frequency spectra at plural time points selected from among the time points of the time interval 1/f. In addition, the detected audio determining unit 113(j) determines the frequency spectrum at the target time point that yields the sum of degrees of similarity less than the predetermined threshold value, and removes noises by removing the determined frequency spectrum. The detected audio determining unit 113 generates an output spectrum 2408 by grouping the noise-removed frequency spectra in the M frequency bands.

The detected audio determining units 113(j) (j=1 to M) have the same structure as that of the detected audio determining units 2802(k, j).

FIG. 53 shows exemplary time waveforms of frequency spectra of 200 Hz in the case of using a mixed audio of sinusoidal waves of 100 Hz, 200 Hz, and 300 Hz. FIG. 53(a) shows the time waveform in the real part of the frequency spectrum of 200 Hz. FIG. 53(b) shows the imaginary part of the frequency spectrum of 200 Hz. The horizontal axes are the time axes (second), and the vertical axes show the amplitude of the frequency spectra. Each of the time waveforms shown here has a time duration of 50 ms.

FIG. 54 shows time waveforms of frequency spectra in 200 Hz of sinusoidal waves of 200 Hz used in the generation of the acoustic signal 2401 shown in FIG. 53. The display method is the same as that of FIG. 53, and thus the same descriptions are not repeated.

FIG. 53 and FIG. 54 show that the sinusoidal wave of 200 Hz includes noise portions distorted due to influence of frequency leakage from the sinusoidal waves of 100 Hz and 300 Hz in the acoustic signals 2401.

Figure 55:
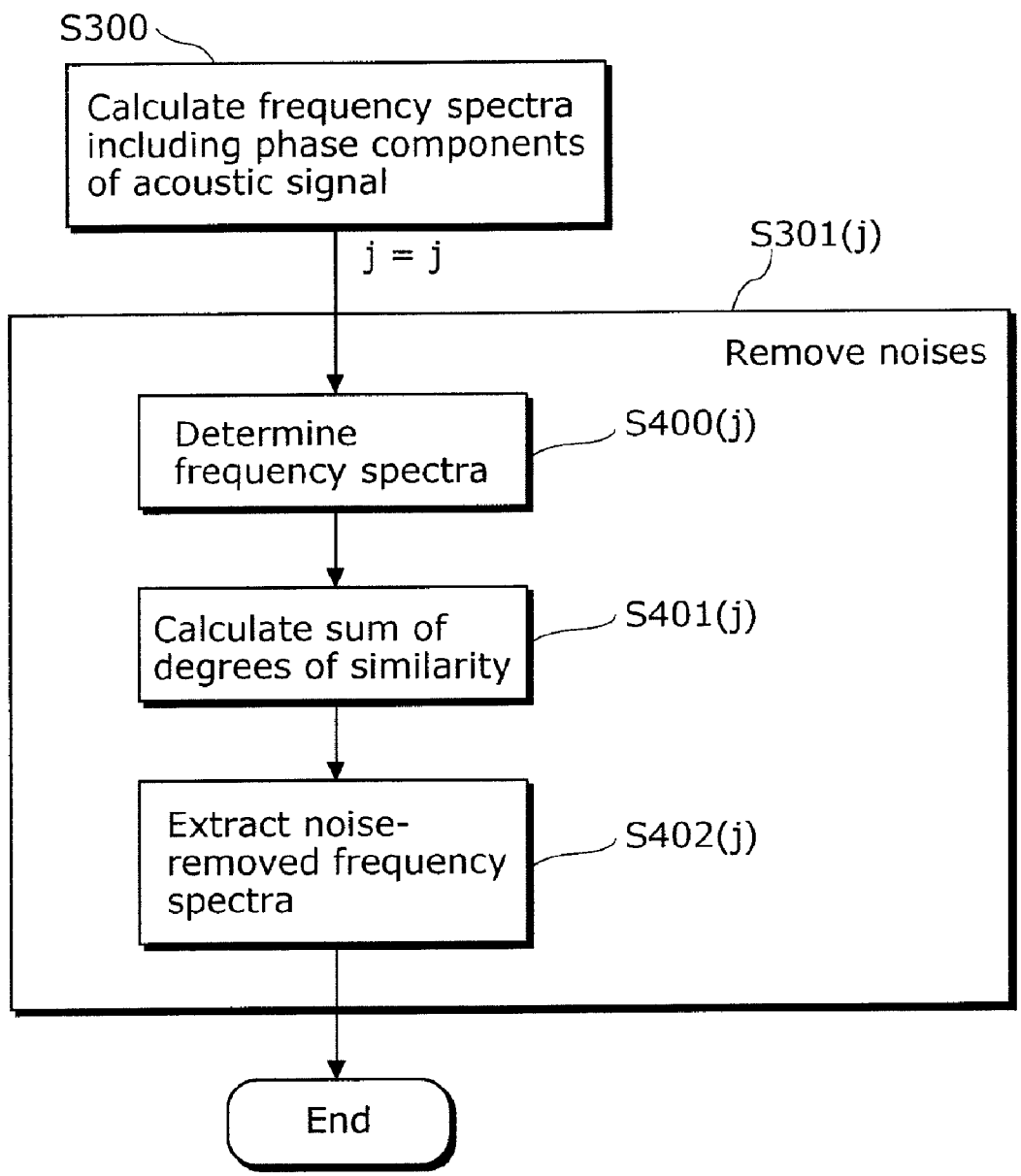
FIG. 55 is a flowchart indicating an operation procedure of Step S301(j) of noise removal performed by the noise removal device in the first embodiment of the present invention.

FIG. 55 is a flowchart showing a procedure of an operation performed by the noise removal device 110.

First, the DFT analysis unit 1106 receives inputs of acoustic signals 2401, performs discrete Fourier transform on the inputted acoustic signals 2401, and calculates frequency spectra including phase components of the acoustic signals 2401 (Step S300). In this example, the discrete Fourier transform is performed on condition that a Hanning window which is a time window having a width of $\Delta T=5$ ms (80 pt) is applied to the acoustic signals 2401 having a sampling frequency of 16000 Hz. In addition, these frequency spectra of plural time points are calculated with time shifts of 1 pt (0.0625 ms) in the time axis direction. FIG. 53 displays the time waveforms of frequency spectra in this processing result.

Next, the detected audio determining unit 113 remove noises from the frequency spectra calculated by the DFT analysis unit 1106 by selectively using the detected audio determining unit 113(j) (j=1 to M) for each of frequency bands j (j=1 to M) (Step S301(j) (j=1 to M)). In this example, M is 1, and the frequency f of the j=1th frequency band is 200 Hz.

The detected audio determining unit 113(1) (j=1) removes noises by determining the frequency spectrum of the time point as the analysis target that yields the sum of degrees of similarity to the frequency spectra at plural time points different from the target time point equal to or less than a predetermined threshold value, based on the frequency spectra at plural time points selected from among the time points of the time interval 1/f (Step S301(1) (j=1)).

First, the frequency spectrum determining unit of the detected audio determining unit 113(1) (j=1) determines frequency spectra at plural time points selected from among the time points of the time interval 1/f in the same manner as in the example shown in the first embodiment (Step S400(1) (j=1)).

Here, the difference from the example shown in the first embodiment is the time range of frequency spectra that the degree-of-similarity calculating unit of the detected audio determining unit 113(1) (j=1) uses to calculate the sum of degrees of similarity. In the example shown in the first embodiment, the time range is 20 ms shorter than the time window having a width of $\Delta T$ (=64 ms) used to calculate the frequency spectra. In this example, the time range is 100 ms longer than the time window having a width of $\Delta T$ (=5 ms) used to calculate the frequency spectra.

Next, the degree-of-similarity calculating unit of the detected audio determining unit 113(1) (j=1) calculates the sum of degrees of similarity using all the frequency spectra determined by the frequency spectrum determining unit of the detected audio determining unit 113(1) (j=1) (Step S401(1) (j=1)). The processing performed here is the same as the processing performed in the example shown in the first embodiment, and thus the same descriptions are not repeated.

Lastly, the detected audio determining unit of the detected audio determining unit 113(1) (J=1) determines the frequency spectrum at the target time point that yields the sum of degrees of similarity S equal to or less than the threshold value and removes noises by removing the determined frequency spectrum (Step S402(1) (j=1)). The processing performed here is the same as the processing performed in the example shown in the first embodiment, and thus the same descriptions are not repeated.

FIG. 56 shows time waveforms of frequency spectra of 200 Hz extracted from the acoustic signals 2401 shown in FIG. 53. The same descriptions of the display method as those of FIG. 53 are not repeated. In FIG. 56, the shaded areas are areas removed as noise portions. Comparison of FIG. 56 with FIG. 53 and FIG. 54 shows that noises (distortions) due to frequency leakage from sinusoidal waves of 100 Hz and 300 Hz are removed and a sinusoidal waveform of 200 Hz is extracted from the acoustic signals 2401.

The structures of the first embodiment and the variation thereof provide an advantageous effect of removing noises (distortions) due to frequency leakage from surrounding frequencies as an influence of refining a temporal resolution ($\Delta T$) using the sum of degrees of similarity between the frequency spectrum at the target time point as the reference time point and the frequency spectra at the nearby time points including time points distant over the time interval $\Delta T$ (the width of the time window used in the calculation of frequency spectra).

It is preferable that the detected audio determining unit determines frequency spectra at time points of the time interval 1/f from frequency spectra including the predetermined time width, and calculates degrees of similarity using the determined frequency spectra.

This structure makes it possible to calculate the degrees of similarity of phases in a space defined by $\psi(t)-(2\pi f t)$, which simplifies the method for calculating degrees of similarity. Thus, it becomes possible to reduce the amount of calculation for modifying phases.

It is preferable that the noise removal device further includes a phase modifying unit which modifies the phases $\psi(t)$ (radian) of the frequency spectra at time points t to $\psi(t)-(2\pi f t)$, and the detected audio determining unit calculates the degrees of similarity using the frequency spectra with the modified phases.

With this structure, it is possible to analyze acoustic signals in detail at a time interval shorter than the time interval 1/f. In this way, it is possible to remove noises from acoustic signals shorter than the time interval 1/f.

It is preferable that the sum of degrees of similarity is the sum of degrees of similarity between the target frequency spectrum and the respective frequency spectra constituting the combinations of the frequency spectra.

With this structure, it is possible to calculate accurate degrees of similarity between the respective frequency spectra constituting the combinations of frequency spectra.

It is further preferable that the degrees of similarity are the number of times of appearance of frequency spectra included in the predetermined time width in each of phase segments in the space defined by $\psi(t)-(2\pi ft)$ when the phases of the frequency spectra at time point t are $\psi(t)$ (radian). It is further preferable that the sum of degrees of similarity is calculated assuming that the degrees of similarity of all the frequency spectra of which the numbers of times of appearance are calculated with respect to the target frequency spectrum is "1" when two frequency spectra of which a degree of similarity is calculated are present in the same phase segments, and assuming that the degrees of similarity of the same is "0" when two frequency spectra is calculated are present in different phase segments.

With this structure, it is possible to separate and extract the frequency spectra of plural audios by removing noise portions with distorted phase components even when plural audios (detected audios) are included in the phases of each acoustic signal.

Figure 57:
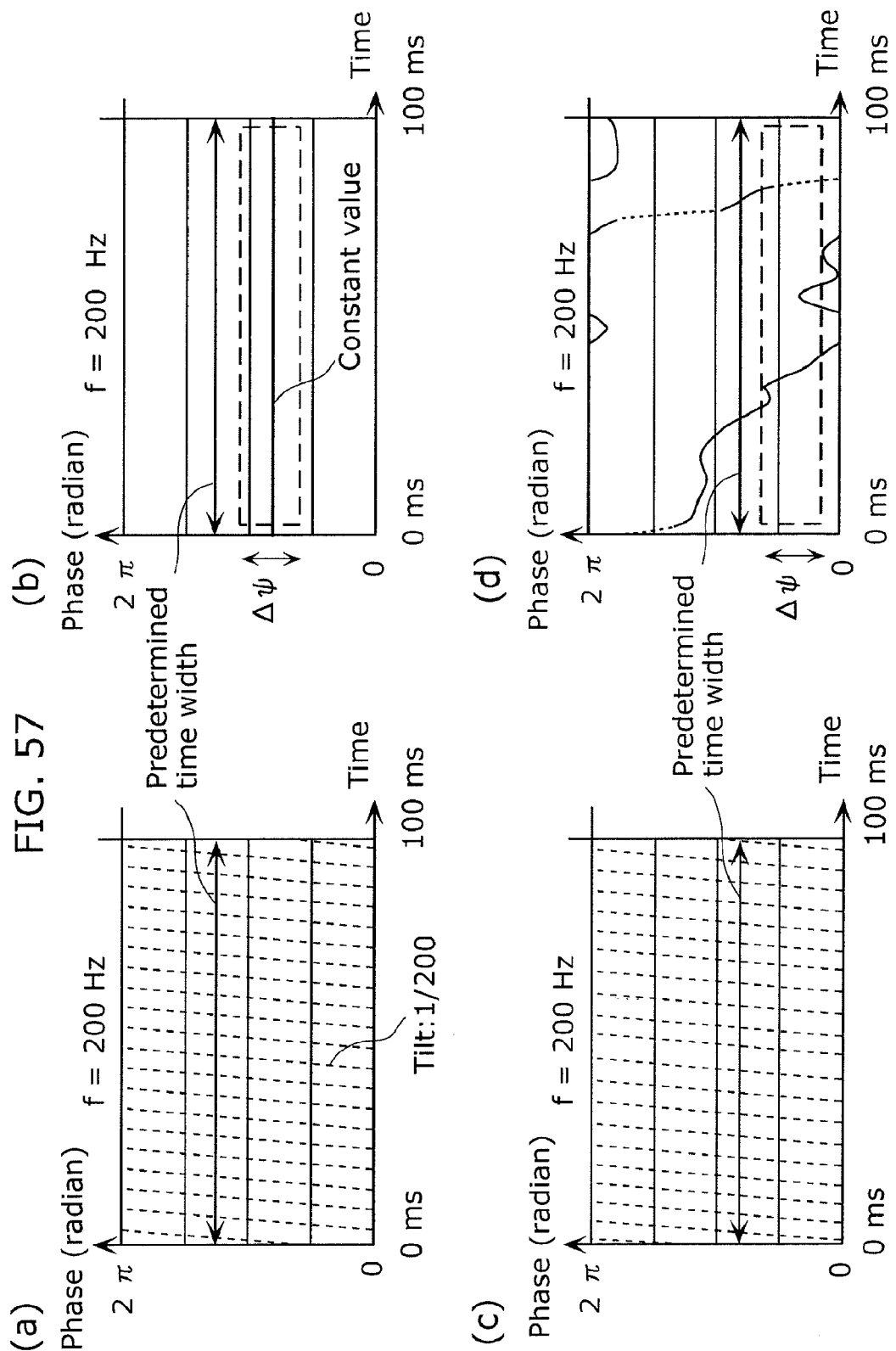
FIG. 57 is a diagram used to review the result of analysis of the acoustic signals.
Figure 58:
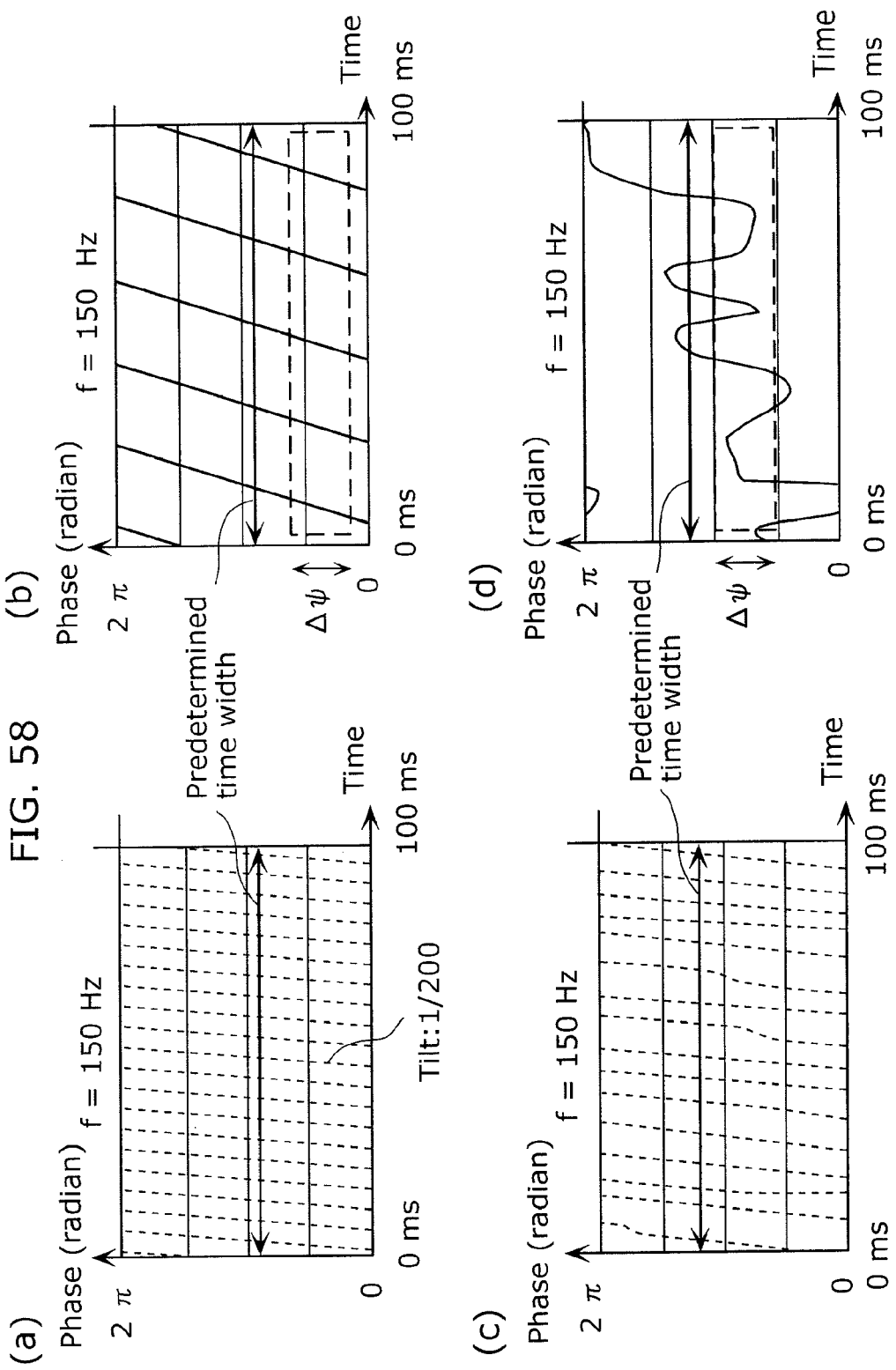
FIG. 58 is a diagram used to review the result of analysis of the acoustic signals.

Here, the results of other analyses of acoustic signals are considered. FIG. 57 shows the result of an analysis of a frequency f of 200 Hz. FIG. 58 shows the result of an analysis of a frequency f of 150 Hz. Each of FIG. 57 and FIG. 58 shows the result of analysis performed using a sinusoidal wave of 200 Hz and white noises.

FIG. 57($a$) is the result of a phase analysis using the sinusoidal wave of 200 Hz as an acoustic signal. Here, no phase modification is performed. The result shows that the phases are shifted with a tilt of $2\pi \times 200$ with respect to time in a predetermined time width. Here, the analysis is performed on the frequency of 200 Hz. The analysis shows increases in the degrees of similarity between (i) the straight line representing the phases shifting with a tilt of $2\pi \times 200$ as time shifts and (ii) the phases of the acoustic signal in the predetermined time width. The degrees of similarity of a predetermined number or more of acoustic signals (all the acoustic signals in the predetermined time width) are greater than a predetermined constant value For this reason, the sinusoidal wave of 200 Hz which is an acoustic signal can be extracted without being removed. The degrees of similarity here can be calculated, for example, taking inverse numbers of differences between the straight line and phases of an acoustic signal in a predetermined time width (the differences are calculated considering that the phases are in a torus and thus 0 degrees and 360 degrees are in the same position.)

FIG. 57($b$) is the result of analysis of phases using the sinusoidal wave of 200 Hz as an acoustic signal. Here, phase modification is performed. The result shows that the phases have a predetermined constant value ($\pi/2$ in this example) in the predetermined time width $\Delta\psi$ with respect to time. This increases the degrees of similarity, in the predetermined time width, between the straight line without tilt obtained by modifying the phases represented by the straight line with a tilt of $2\pi \times 200$ with respect to time and the modified phases of the acoustic signal. The degrees of similarity of a predetermined number or more of acoustic signals (all the acoustic signals in the predetermined time widths) are greater than the predetermined constant value. For this reason, the sinusoidal wave of 200 Hz which is an acoustic signal can be extracted without being removed.

FIG. 57($c$) is the result of analysis of phases using white noises as an acoustic signal. The analysis conditions such as the time width used for the analysis, the lower-limit value of the number of frequency spectra of which degrees of similarity are calculated, the threshold value for the degrees of similarity are the same as in FIG. 57($a$). Here, no phase modification is performed. The result shows that the phases are shifted not with a tilt of $2\pi \times 200$ with respect to time in the predetermined time width. Here, the analysis is performed on the frequency of 200 Hz. The degrees of similarity of the straight line representing the phases shifting with a tilt of $2\pi \times 200$ with respect to time and the phases of the acoustic signal are small in the predetermined time width. The degrees of similarity of a predetermined number or more of acoustic signals (all the acoustic signals in the predetermined time width) are less than the constant value. For this, white noises can be removed. When the result of FIG. 57($a$) is combined, it is possible to remove white noises by extracting the sinusoidal wave of 200 Hz.

FIG. 57($d$) is the result of analysis of phases using white noises as an acoustic signal. The analysis conditions such as the time width used for the analysis, the lower-limit value of the number of frequency spectra of which degrees of similarity are calculated, the threshold value for the degrees of similarity are the same as in FIG. 57($b$). Here, phase modification is performed. The result shows that the phases do not have a constant value ($\pi/2$ in this example) in a predetermined time width $\Delta\psi$ with respect to time. For this, the degrees of similarity of a predetermined number or more of acoustic signals (all the acoustic signals in the predetermined time width) are equal to or less than the constant value, thereby removing white noises. When the result of FIG. 57($b$) is combined, it is possible to remove white noises by extracting the sinusoidal wave of 200 Hz. It is to be noted that white noises can be removed even when the width of $\Delta\psi$ is reduced to $\pi/3$ or $\pi/4$ in the extraction of the sinusoidal wave of 200 Hz.

FIG. 58($a$) is the result of analysis of phases using the sinusoidal wave of 200 Hz as an acoustic signal. The analysis conditions such as the time width used for the analysis, the lower-limit value of the number of frequency spectra of which degrees of similarity are calculated, the threshold value for the degrees of similarity are the same as in FIG. 57($a$). Here, no phase modification is performed. The result shows that the phases are shifted with a tilt of $2\pi \times 200$ with respect to time in the predetermined time width. Here, the analysis is performed on the frequency of 150 Hz. The degrees of similarity of the straight line representing the phases shifting with a tilt of $2\pi \times 150$ with respect to time and the phases of the acoustic signal are small in the predetermined time width. The degrees of similarity of a predetermined number or more of acoustic signals (all the acoustic signals in the predetermined time width) are less than the constant value. For this, it is possible to prevent frequency leakage of the sinusoidal wave of 200 Hz which is an acoustic signal to the frequency band of 150 Hz.

As another advantageous effect, since the frequency analysis is performed assuming that the center frequency is 150 Hz, the frequencies including a frequency of 200 Hz are analyzed. At this time, it is possible to extract a frequency spectrum of 200 Hz by calculating, for the center frequency spectrum of 150 Hz, the degrees of similarity of the straight line representing the phases which shift with a tilt of $2\pi \times 200$ with respect to time and phases of the acoustic signal in the predetermined time width, and extracting the frequency spectra having a degree of similarity greater than the constant value. In addition, it is possible to check whether or not a frequency spectrum of 200 Hz is included in the acoustic signal, based on the frequency spectrum having the center frequency of 150 Hz.

FIG. 58($b$) is the result of analysis of phases using the sinusoidal wave of 200 Hz as an acoustic signal. The analysis conditions such as the time width used for the analysis, the lower-limit value of the number of frequency spectra of which degrees of similarity are calculated, the threshold value for the degrees of similarity are the same as in FIG. 57(b). Here, phase modification is performed. Here, a frequency of 150 Hz is analyzed. The result shows that the phases do not have a constant value ($\pi/2$ in this example) in the predetermined time width $\Delta\psi$ with respect to time. For this, the degrees of similarity of a predetermined number or more of acoustic signals (all the acoustic signals in the predetermined time width) are equal to or less than the constant value. For this, it is possible to prevent frequency leakage of the sinusoidal wave of 200 Hz which is an acoustic signal to the frequency band of 150 Hz.

FIG. 58(c) is the result of analysis of phases using white noises as an acoustic signal. The analysis conditions such as the time width used for the analysis, the lower-limit value of the number of frequency spectra of which degrees of similarity are calculated, the threshold value for the degrees of similarity are the same as in FIG. 57(a). Here, no phase modification is performed. The result shows that the phases are shifted not with a tilt of $2\pi\times150$ with respect to time in the predetermined time width. For this, the degrees of similarity between phases of the acoustic signal are less than the constant value, thereby removing white noises.

FIG. 58(d) is the result of analysis of phases using white noises as an acoustic signal. Here, phase modification is performed. The result shows that the phases do not have a constant value ($\pi/2$ in this example) in the predetermined time width $\Delta\psi$ with respect to time. For this, the degrees of similarity of a predetermined number or more of acoustic signals (all the acoustic signals in the predetermined time width) are equal to or less than the constant value, thereby removing white noises.

FIG. 59 shows the result of analysis of an audio form an autobicycle. FIG. 59(a) shows a spectrogram of the audio from the autobicycle, and the black portions represent the audio from the autobicycle. A Doppler shift representing passage of the autobicycle is observed. Each of FIGS. 59(b), 59(c), 59(d) shows the time-dependent phase shifts at the time when phase modification is performed. The analysis conditions such as the time width used for the analysis, the lower-limit value of the number of frequency spectra of which degrees of similarity are calculated, the threshold value for the degrees of similarity are the same as in FIG. 57(d) and FIG. 58(d).

FIG. 59(b) is the result of analyzing the frequency band of 120 Hz corresponding to the frequency spectrum of the audio from the autobicycle, which shows that the phases have predetermined values ($\pi/2$ in this example) in the width of $\Delta\psi$ with respect to time This increases the degrees of similarity, in the predetermined time width, between the straight line without tilt obtained by modifying the phases represented by the straight line with a tilt of $2\pi\times120$ with respect to time and the modified phases of the acoustic signal. When the results of FIG. 57(b) and FIG. 58(d) are combined, it is possible to determine the frequency spectra of the audio from the autobicycle, thereby removing white noises.

FIG. 59(c) shows the result of analyzing the frequency band of 140 Hz corresponding to other frequency spectra of the audio from the autobicycle, which shows that the phases have predetermined values ($\pi/2$ in this example) in a width of $\Delta\psi$ with respect to time. This increases the degrees of similarity, in the predetermined time width, between the straight line without tilt obtained by modifying the phases represented by the straight line with a tilt of $2\pi\times140$ with respect to time and the modified phases of the acoustic signal. When the results of FIG. 57(b) and FIG. 58(d) are combined, it is possible to determine the frequency spectra of the audio from the autobicycle, thereby removing white noises.

FIG. 59(d) is the result of analyzing the frequency band of 80 Hz corresponding to the frequency spectra of noises, which shows that the phases do not have predetermined values ($\pi/2$ in this example) in a width of $\Delta\psi$ with respect to time. This decreases the degrees of similarity, in the predetermined time width, between the straight line without tilt obtained by modifying the phases represented by the straight line with a tilt of $2\pi\times80$ with respect to time and the modified phases of the acoustic signal. For this, the frequency spectra of noises can be removed.

The width of $\Delta\psi$ here is empirically calculated based on time characteristics of phases of the autobicycle audio to be extracted. In this example, the same value of $\pi/2$ is used as the width of $\Delta\psi$ for both a portion causing a Doppler shift of the autobicycle audio and another portion of the autobicycle audio. In addition, the results of FIG. 57(d) and FIG. 58(d) show that it is possible to remove white noises even when the width of $\Delta\psi$ is increased to $2\pi/3$ because the phases of white noises do not have a predetermined constant value.

Figure 60A:
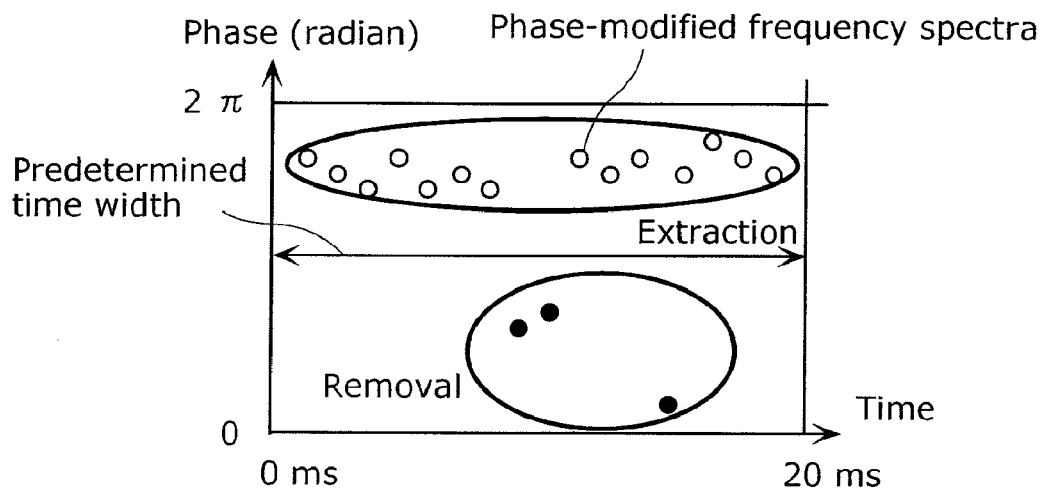
FIG. 60A is a schematic diagram of the phases of an acoustic signal in a predetermined time width.
Figure 60B:
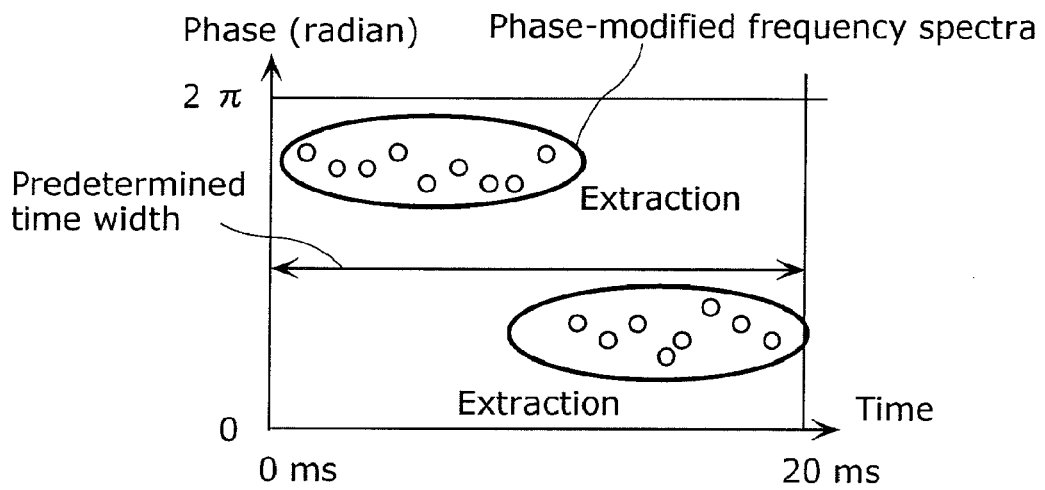
FIG. 60B is a diagram of the phases of acoustic signals in a predetermined time width.

Descriptions are given of the frequency spectra to be removed as noises here and typical patterns of the frequency spectra to be extracted without being removed. Each of FIGS. 60A and 60B schematically shows the phases of an acoustic signal in a predetermined time width. The horizontal axis represents time, and the vertical axis represents phases. Circles show modified phases of the frequency spectra of the acoustic signal. Each of frequency spectra enclosed by a solid line belongs to a corresponding one of clusters as groups of frequency spectra having degrees of similarity greater than the predetermined values. These clusters can also be calculated according to multivariate analysis. The frequency spectra in the cluster including a predetermined number or more of frequency spectra are extracted without being removed, and the frequency spectra in the cluster including frequency spectra less than the predetermined number are removed as noises because the degrees of similarity to the predetermined number of frequency spectra are not more than the predetermined values. As shown in FIG. 60A, when noise portions are included only in a portion in the predetermined time width, it is possible to remove only the noises in the portions. For example, as shown in FIG. 60B, when there are two audios desired to be extracted, it is possible to extract these two audios by determining frequency spectra having degrees of similarity to frequency spectra corresponding to 40% (here, seven or more frequency spectra) in the predetermined time width (the determination is made on removal of frequency spectra having degrees of similarity less than the predetermined value.

In the first embodiment and the second embodiment, it is also good to use a conventional noise removal unit as a detected audio determining unit. For example, it is also good to use the noise removal unit disclosed in Non-patent Reference 1.

The embodiments disclosed here are illustrative only in all respects, and should not be considered as limiting the scope of the present invention. The scope of the present invention is defined not by the above descriptions but by the Claims. The present invention is intended to include all modifications and alternatives equivalent to the Claims and within the scope of the Claims.

INDUSTRIAL APPLICABILITY

An audio source direction detecting device according to the present invention can prevent output of an erroneous direction due to influence of noises. For this, incorporation of the audio source direction detecting device according to the present invention into a car device which detects an audio from a vehicle located at a dead angle (for example, an autobicycle located at an intersection which is a dead angle makes it possible to determine the direction of the vehicle in a noisy real environment and notify a car driver of the presence of the autobicycle dangerous to the car driver. As another example, incorporation of the audio source direction detecting device according to the present invention into a television conference device makes it possible to determine the direction of a speaker in a noisy real environment, and record the speech of the speaker by directing a microphone and a camera to the speaker. In addition, incorporation of the audio source direction detecting device according to the present invention into a security camera makes it possible to determine the direction of a scream or an abnormal audio in a noisy environment and direct a camera toward the direction.

The invention claimed is:

1. An audio source direction detecting device comprising:
    a generating unit configured to generate a first frequency spectrum that is a frequency spectrum in at least one frequency band of a first acoustic signal of a sound received by a first microphone and a second frequency spectrum that is a frequency spectrum in at least one frequency band of a second acoustic signal of the sound received by a second microphone spaced apart from the first microphone at a distance, the first acoustic signal including a first detected audio and a first noise, the second acoustic signal including a second detected audio and a second noise, and the first detected audio and the second detected audio being emitted from an audio source;
    a detected audio determining unit configured to (i) determine, from the first frequency spectrum, a first time-point portion that is a time-point portion in a frequency spectrum of the first detected audio, and (ii) determine, from the second frequency spectrum, a second time-point portion that is a time-point portion in a frequency spectrum of the second detected audio; and
    a detecting unit configured to:
    (i-a) calculate candidate arrival time differences each of which is a time difference between an arrival time of the sound to the first microphone and an arrival time of the sound to the second microphone, and (i-b) adjust, for each of the candidate arrival time differences, a time axis of the second frequency spectrum with respect to a time axis of the first frequency spectrum such that the arrival time difference becomes zero;
    (ii-a) determine, for each of the candidate arrival time differences, whether or not a percentage of an overlap time with respect to a unit of time is greater than a predetermined threshold, the unit of time being a unit of time for detecting an audio source direction that is a direction in which the sound is emitted, and the overlap time being a time period which is in the unit of time and during which the first time-point portion of the first frequency spectrum of the first acoustic signal is overlapped with the second time-point portion of the second frequency spectrum of the second acoustic signal having the adjusted time axis, and (ii-b) calculate a cross-correlation value between the first frequency spectrum and the second frequency spectrum, only when the percentage is determined to be greater than the predetermined threshold; and
    (iii-a) detect the audio source direction based on the arrival time difference at a time when the cross-correlation value is a local maximum, the distance between the first microphone and the second microphone, and an acoustic velocity, and (iii-b) output the detected audio source direction.

2. The audio source direction detecting device according to claim 1,
    wherein said detecting unit is configured to output the detected audio source direction only when the percentage calculated for each of all the candidate arrival time differences is determined to be greater than the predetermined threshold.

3. An audio source direction detecting method comprising:
    a generating step of generating a first frequency spectrum that is a frequency spectrum in at least one frequency band of a first acoustic signal of a sound received by a first microphone and a second frequency spectrum that is a frequency spectrum in at least one frequency band of a second acoustic signal of the sound received by a second microphone spaced apart from the first microphone at a distance, the first acoustic signal including a first detected audio and a first noise, the second acoustic signal including a second detected audio and a second noise, and the first detected audio and the second detected audio being emitted from an audio source;
    a detected audio determining step of (i) determining from the first frequency spectrum, a first time-point portion that is a time-point portion in a frequency spectrum of the first detected audio, and (ii) determining, from the second frequency spectrum, a second time-point portion that is a time-point portion in a frequency spectrum of the second detected audio; and
    a detecting step of:
    (i-a) calculating candidate arrival time differences each of which is a time difference between an arrival time of the sound to the first microphone and an arrival time of the sound to the second microphone, and (i-b) adjusting, for each of the candidate arrival time differences, a time axis of the second frequency spectrum with respect to a time axis of the first frequency spectrum such that the arrival time difference becomes zero;
    (ii-a) determining, for each of the candidate arrival time differences, whether or not a percentage of an overlap time with respect to a unit of time is greater than a predetermined threshold, the unit of time being a unit of time for detecting an audio source direction that is a direction in which the sound is emitted, and the overlap time being a time period which is in the unit of time and during which the first time-point portion of the first frequency spectrum of the first acoustic signal is overlapped with the second time-point portion of the second frequency spectrum of the second acoustic signal having the adjusted time axis, and (ii-b) calculating a cross-correlation value between the first frequency spectrum and the second frequency spectrum, only when the percentage is determined to be greater than the predetermined threshold; and
    (iii-a) detecting the audio source direction based on the arrival time difference at a time when the cross-correlation value is a local maximum, the distance between the first microphone and the second microphone, and an acoustic velocity, and (iii-b) outputting the detected audio source direction.

4. The audio source direction detecting method according to claim 3,
    wherein said detecting further comprises outputting the detected audio source direction only when the percentage calculated for each of all the candidate arrival time differences is determined to be greater than the predetermined threshold.

5. A non-transitory computer-readable medium having a program stored thereon, wherein the program, when executed by a computer, causes the computer to perform an audio source direction detecting method comprising:

a generating step of generating a first frequency spectrum that is a frequency spectrum in at least one frequency band of a first acoustic signal of a sound received by a first microphone and a second frequency spectrum that is a frequency spectrum in at least one frequency band of a second acoustic signal of the sound received by a second microphone spaced apart from the first microphone at a distance, the first acoustic signal including a first detected audio and a first noise, the second acoustic signal including a second detected audio and a second noise, and the first detected audio and the second detected audio being emitted from an audio source;

a detected audio determining step of (i) determining from the first frequency spectrum, a first time-point portion that is a time-point portion in a frequency spectrum of the first detected audio, and (ii) determining, from the second frequency spectrum, a second time-point portion that is a time-point portion in a frequency spectrum of the second detected audio; and a detecting step of:

(i-a) calculating candidate arrival time differences each of which is a time difference between an arrival time of the sound to the first microphone and an arrival time of the sound to the second microphone, and (i-b) adjusting, for each of the candidate arrival time differences, a time axis of the second frequency spectrum with respect to a time axis of the first frequency spectrum such that the arrival time difference becomes zero;

(ii-a) determining, for each of the candidate arrival time differences, whether or not a percentage of an overlap time with respect to a unit of time is greater than a predetermined threshold, the unit of time being a unit of time for detecting an audio source direction that is a direction in which the sound is emitted, and the overlap time being a time period which is in the unit of time and during which the first time-point portion of the first frequency spectrum of the first acoustic signal is overlapped with the second time-point portion of the second frequency spectrum of the second acoustic signal having the adjusted time axis, and (ii-b) calculating a cross-correlation value between the first frequency spectrum and the second frequency spectrum, only when the percentage is determined to be greater than the predetermined threshold; and (iii-a) detecting the audio source direction based on the arrival time difference at a time when the cross-correlation value is a local maximum, the distance between the first microphone and the second microphone, and an acoustic velocity, and (iii-b) outputting the detected audio source direction.

6. The non-transitory computer-readable medium according to claim 5, wherein said detecting further comprises outputting the detected audio source direction only when the percentage calculated for each of all the candidate arrival time differences is determined to be greater than the predetermined threshold.

* * * * *